United States Patent
Shiba et al.

(10) Patent No.: US 10,053,526 B2
(45) Date of Patent: Aug. 21, 2018

(54) CATALYST FOR CONJUGATED DIENE POLYMERIZATION, CONJUGATED DIENE POLYMER, MODIFIED CONJUGATED DIENE POLYMER, POLYBUTADIENE, AND COMPOSITIONS COMPRISING FOREGOING

(71) Applicant: UBE INDUSTRIES, LTD., Ube-shi, Yamaguchi (JP)

(72) Inventors: Koji Shiba, Ube (JP); Yuta Yamada, Ube (JP); Suguru Fukazawa, Ube (JP); Naomi Okamoto, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 0 days.

(21) Appl. No.: 15/324,398

(22) PCT Filed: Jul. 9, 2015

(86) PCT No.: PCT/JP2015/069801
§ 371 (c)(1),
(2) Date: Jan. 6, 2017

(87) PCT Pub. No.: WO2016/006665
PCT Pub. Date: Jan. 14, 2016

(65) Prior Publication Data
US 2017/0158786 A1    Jun. 8, 2017

(30) Foreign Application Priority Data

| Jul. 9, 2014 | (JP) | 2014-140986 |
| Aug. 4, 2014 | (JP) | 2014-158373 |
| Aug. 29, 2014 | (JP) | 2014-174790 |
| Aug. 29, 2014 | (JP) | 2014-174797 |
| Aug. 29, 2014 | (JP) | 2014-174805 |
| Aug. 29, 2014 | (JP) | 2014-174813 |
| Aug. 29, 2014 | (JP) | 2014-174820 |
| Sep. 5, 2014 | (JP) | 2014-181053 |
| Sep. 5, 2014 | (JP) | 2014-181067 |
| Sep. 5, 2014 | (JP) | 2014-181082 |
| Sep. 9, 2014 | (JP) | 2014-183420 |
| Sep. 9, 2014 | (JP) | 2014-183428 |
| Sep. 9, 2014 | (JP) | 2014-183435 |
| Sep. 11, 2014 | (JP) | 2014-185299 |
| Sep. 11, 2014 | (JP) | 2014-185319 |
| Sep. 11, 2014 | (JP) | 2014-185332 |
| Sep. 11, 2014 | (JP) | 2014-185348 |
| Sep. 11, 2014 | (JP) | 2014-185357 |
| Sep. 11, 2014 | (JP) | 2014-185454 |
| Sep. 11, 2014 | (JP) | 2014-185694 |
| Sep. 12, 2014 | (JP) | 2014-185976 |
| Dec. 10, 2014 | (JP) | 2014-249758 |
| Jan. 15, 2015 | (JP) | 2015-005470 |

(51) Int. Cl.
*C08F 4/44*     (2006.01)
*C08F 136/06*   (2006.01)
*C08L 47/00*    (2006.01)
*C08L 9/06*     (2006.01)
*C08L 7/00*     (2006.01)

(52) U.S. Cl.
CPC ............ *C08F 136/06* (2013.01); *C08L 7/00* (2013.01); *C08L 9/06* (2013.01); *C08L 47/00* (2013.01)

(58) Field of Classification Search
CPC .... B01J 31/0208; B01J 31/26; B01J 2531/37; B01J 2531/38; C08F 4/44; C08F 4/60058; C08F 4/61908; C08F 136/06
See application file for complete search history.

(56) References Cited

U.S. PATENT DOCUMENTS

| 4,340,685 | A |   | 7/1982  | Takeuchi et al. |
| 4,619,982 | A |   | 10/1986 | Jenkins |
| 4,885,338 | A |   | 12/1989 | Takao et al. |
| 4,957,976 | A |   | 9/1990  | Takao et al. |
| 5,610,114 | A |   | 3/1997  | Robert et al. |
| 5,627,119 | A |   | 5/1997  | Biagini et al. |
| 5,844,050 | A |   | 12/1998 | Fukahori et al. |
| 6,294,624 | B1 | * | 9/2001 | Inoue ............... B60C 1/0016 524/262 |
| 6,653,430 | B1 |   | 11/2003 | Soga et al. |

(Continued)

FOREIGN PATENT DOCUMENTS

| GB | 1372399 A    | 10/1974 |
| JP | B-S49-17666  | 5/1974  |

(Continued)

OTHER PUBLICATIONS

JP 11-172044 A (Jun. 29, 1999); machine translation.*
Macromolecules, vol. 15, No. 2, p. 230-233(1982).
Polymer Preprints, Japan, vol. 38, No. 2,p. 170 ( 1989).
International Preliminary Report on Patentability in International Application No. PCT/JP2015/069801, dated Jan. 12, 2017.

*Primary Examiner* — Rip A Lee
(74) *Attorney, Agent, or Firm* — Knobbe Martens Olson & Bear LLP

(57) ABSTRACT

A catalyst for a conjugated diene polymerization including a metal compound (A) containing terbium, lanthanum, dysprosium, praseodymium, holmium, erbium, thulium, or gadolinium, an ionic compound (B) consisting of a non-coordinating anion and a cation, and an organic metal compound (C) of an element selected from the groups 2, 12 and 13 of the periodic table; a process for producing a conjugated diene polymer and a modified conjugated diene polymer using the same; a conjugated diene polymer; and a modified conjugated diene polymer.

13 Claims, 1 Drawing Sheet

(56) References Cited

U.S. PATENT DOCUMENTS

| | | | |
|---|---|---|---|
| 6,838,526 B1 | 1/2005 | Sone et al. | |
| 7,799,725 B2 * | 9/2010 | Suzuki | B60C 1/00 502/171 |
| 7,868,103 B2 * | 1/2011 | Shiba | C08C 19/10 526/136 |
| 2005/0009979 A1 | 1/2005 | Tanaka et al. | |
| 2006/0142145 A1 | 6/2006 | Thiele | |
| 2009/0105401 A1 | 4/2009 | Suzuki et al. | |
| 2011/0319519 A1 | 12/2011 | Sone et al. | |
| 2015/0183904 A1 | 7/2015 | Tamaki et al. | |
| 2016/0009835 A1 * | 1/2016 | Shiba | C08K 3/36 524/526 |

FOREIGN PATENT DOCUMENTS

| | | | | |
|---|---|---|---|---|
| JP | B-S49-17667 | 5/1974 | | |
| JP | A-S59-001508 | 1/1984 | | |
| JP | B-S63-001324 | 1/1988 | | |
| JP | B-H02-062123 | 12/1990 | | |
| JP | B-H04-048815 | 8/1992 | | |
| JP | B-H06-53766 | 7/1994 | | |
| JP | A-H06-228221 | 8/1994 | | |
| JP | B-H06-57769 | 8/1994 | | |
| JP | B-H06-78450 | 10/1994 | | |
| JP | A-H07-268013 | 10/1995 | | |
| JP | A-H11-080222 | 3/1999 | | |
| JP | 11-172044 A * | 6/1999 | | C08L 9/00 |
| JP | A-2000-044633 | 2/2000 | | |
| JP | A-2000-86719 | 3/2000 | | |
| JP | A-2001-139633 | 5/2001 | | |
| JP | A-2001-139634 | 5/2001 | | |
| JP | A-2001-302703 | 10/2001 | | |
| JP | A-2002-030110 | 1/2002 | | |
| JP | A-2004-346220 | 12/2004 | | |
| JP | A-2005-008870 | 1/2005 | | |
| JP | A-2007-161799 | 6/2007 | | |
| JP | A-2007-161921 | 6/2007 | | |
| JP | A-2007-230266 | 9/2007 | | |
| JP | A-2007-308653 | 11/2007 | | |
| JP | A-2009-120757 | 6/2009 | | |
| JP | A-2010-209256 | 9/2010 | | |
| JP | A-2011-093934 | 5/2011 | | |
| JP | A-2011-132530 | 7/2011 | | |
| JP | A-2012-180475 | 9/2012 | | |
| JP | A-2013-129693 | 7/2013 | | |
| JP | A-2013-194100 | 9/2013 | | |
| WO | WO 95/004090 | 2/1995 | | |
| WO | WO 2014/006830 | 1/2014 | | |
| WO | WO 2014/142274 | 9/2014 | | |

* cited by examiner

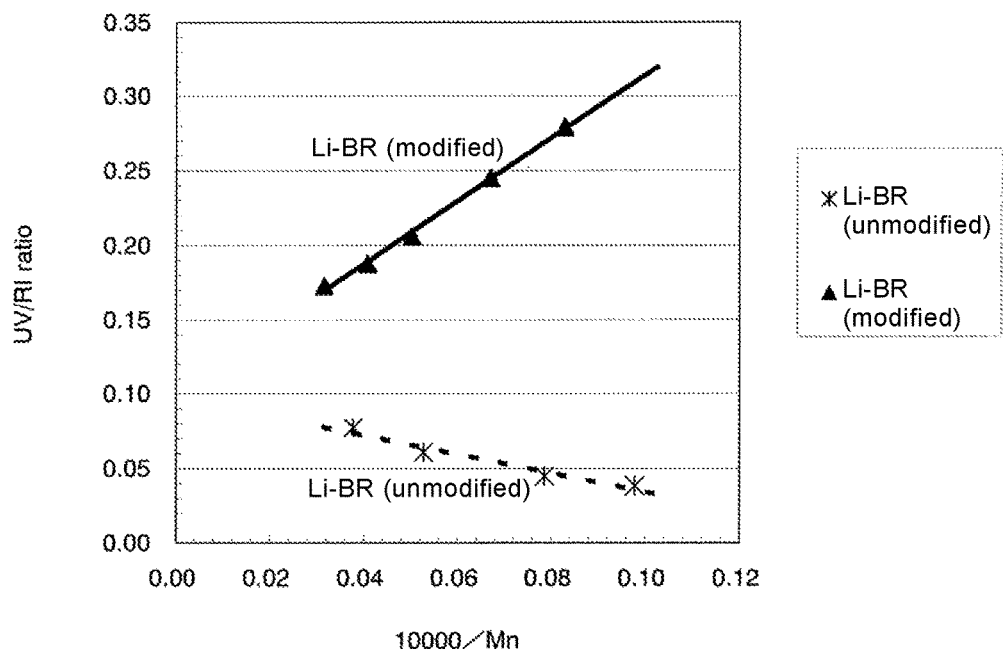

CATALYST FOR CONJUGATED DIENE POLYMERIZATION, CONJUGATED DIENE POLYMER, MODIFIED CONJUGATED DIENE POLYMER, POLYBUTADIENE, AND COMPOSITIONS COMPRISING FOREGOING

This application is the U.S. National Phase under 35 U.S.C. § 371 of International Application No. PCT/JP2015/069801, filed Jul. 9, 2015, designating the U.S., and published in Japanese as WO 2016/006665on Jan. 14, 2016, which claims priority to Japanese Patent Application No. 2014-140986, filed Jul. 9, 2014; Japanese Patent Application No. 2014-158373, filed Aug. 4, 2014; Japanese Patent Application No. 2014-174790, filed Aug. 29, 2014; Japanese Patent Application No. 2014-174797, filed Aug. 29, 2014; Japanese Patent Application No. 2014-174805, filed Aug. 29, 2014; Japanese Patent Application No. 2014-174813, filed Aug. 29, 2014; Japanese Patent Application No. 2014-174820, filed Aug.29, 2014; Japanese Patent Application No. 2014-181053, filed Sep. 5, 2014; Japanese Patent Application No. 2014-181067, filed Sept. 5, 2014; Japanese Patent Application No. 2014-181082, filed Sep. 5, 2014; Japanese Patent Application No. 2014-183420, filed Sep. 9, 2014; Japanese Patent Application No. 2014-183428, filed Sep. 9, 2014; Japanese Patent Application No. 2014-183435, filed Sep. 9, 2014; Japanese Patent Application No. 2014-185299, filed Sep. 11, 2014; Japanese Patent Application No. 2014-185319, filed Sep. 11, 2014; Japanese Patent Application No. 2014-185332, filed Sep. 11, 2014; Japanese Patent Application No. 2014-185348, filed Sep. 11, 2014; Japanese Patent Application No. 2014-185357, filed Sep. 11, 2014; Japanese Patent Application No. 2014-185454, filed Sep. 11, 2014; Japanese Patent Application No. 2014-185694, filed Sep. 11, 2014; Japanese Patent Application No. 2014-185976, filed Sep. 12, 2014; Japanese Patent Application No. 2014-249758, filed Dec.10, 2014; and Japanese Patent Application No. 2015-005470, filed Jan. 15, 2015, the entire contents of which are incorporated herein by reference.

TECHNICAL FIELD

The present invention relates to a catalyst for a conjugated diene polymerization; a process for producing a conjugated diene polymer and a modified conjugated diene polymer using the same; a conjugated diene polymer; a modified conjugated diene polymer; a conjugated diene polymer composition; a modified conjugated diene polymer composition; and so on. The present invention also relates to a process for producing a polybutadiene (VCR) in which a polybutadiene (BR) having a high proportion of cis-1,4-structure is reinforced with a crystalline polybutadiene consisting mainly of syndiotactic-1,2-structure using the catalyst for a polymerization; a polybutadiene; and a polybutadiene composition.

BACKGROUND ART

With regard to a catalyst for a polymerization of a conjugated diene such as 1,3-butadiene and isoprene, many proposals have been made in the past, and some of them have been industrialized practically. For example, a combination of a compound of titanium, cobalt, nickel, neodymium, or the like, and an organic aluminum compound is often used in a process for producing a conjugated diene polymer having a high proportion of cis-1,4-structure.

Meanwhile, a polymerization of a conjugated diene using an element of the group 3 of the periodic table as the catalyst is also known, and various polymerization processes have been proposed in the past. For example, Patent Literature 1 discloses a catalyst system comprising a salt of a rare-earth metal, an organic metal compound of an element of the groups I to III of the periodic table, and a fluorine-containing organic boron compound. Patent Literature 2 discloses a polymerization catalyst comprising a compound of a metal of the group IIIB of the periodic table, an ionic compound of a non-coordinating anion and a cation, and an organic metal compound of an element of the groups I to III of the periodic table. Patent Literature 3 discloses a process for producing a conjugated diene polymer, wherein a conjugated diene compound is polymerized using a catalyst obtained from a compound of a metal with an atomic number of 57 to 71 having a bulky ligand, an ionic compound consisting of a non-coordinating anion and a cation, and an organic metal compound of an element selected from the groups 2, 12 and 13 of the periodic table. As for the catalysts described in Patent Literatures 1 to 3, however, catalysts which have proved to have the effect in the Examples are mainly neodymium-based catalysts. In addition, Patent Literature 4 discloses a carrier-supported solid catalyst for a (co)polymerization of a conjugated diene, in which at least one compound of a rare-earth metal (specifically, neodymium) from among metals with an atomic number of 57 to 71 or 92 is supported on a carrier.

Non Patent Literature 1 describes the results of polymerizations of diene monomers such as BD (butadiene) using $Ln(acac)_3 \cdot nH_2O$ (Ln: La—Lu) as the catalyst and $Et_3Al/Et_2AlCl$ as the promoter, which revealed that the polymer was obtained nearly quantitatively with Pr in the polymerization of BD. Non Patent Literature 2 describes the results of polymerizations of butadiene and the results of polymerizations of isoprene using the catalyst system of $LnCl_3$ (Ln: Nd, Pr, Gd).2THF—$AlEt_3$, which revealed that the reactivity was Nd>Pr>Gd.

Meanwhile, a rubber composition comprising a polybutadiene rubber (BR) or a styrene-butadiene rubber (SBR) as the main component, and natural rubber or the like in addition thereto has conventionally been industrially produced and used, in the main, as a material for a tire (rubber for an automobile tire), a crawler of a crawler type traveling device, an industrial rubber belt, and the like, while taking advantage of its characteristics (Patent Literatures 5 to 7). In these applications, characteristics such as low heat build-up and low fuel consumption may be required.

As for a material for a tire, the requirement for the lower fuel consumption of an automobile and the requirement for the safety of driving on snow and ice have increased in recent years, and therefore there is need for the development of a rubber material having a low rolling resistance (i.e., a low tan δ) and a great road surface grip on snow and ice (i.e., wet skid resistance).

However, a rubber having a low rolling resistance such as a polybutadiene rubber (BR) tends to have a low wet skid resistance, while a styrene-butadiene rubber (SBR) has the problem that it has a high wet skid resistance but has a high rolling resistance also. As a method for solving the problems as described above, many technological developments of modified rubbers have been made. Among others, many processes in which a low-cis diene rubber is chemically modified with a modifying agent (for example, a modifying agent containing a functional group to interact with a filler for a rubber composition for a tire, including silica and carbon black) in the presence of a lithium-based catalyst have been proposed.

As an example of a modification of a high-cis diene rubber, Patent Literature 8 discloses a process in which a cis-1,4-polybutadiene is produced using a titanium compound having a cyclopentadienyl skeleton as the catalyst, and then the product is reacted with 4,4'-bis(diethylamino) benzophenone to modify it. However, the ratio (Mw/Mn) of the weight-average molecular weight (Mw) to the number-average molecular weight (Mn) is less than 1.5, which is extremely low, and therefore the modified rubber has the problem with processability.

Patent Literatures 9 to 11 disclose that a rubber having an excellent rebound resilience and a low low-temperature hardness can be obtained by reacting a diene rubber having an active alkali metal terminal with a nitroamino compound, a nitro compound, a nitroalkyl compound, or the like. Patent Literatures 12 and 13 disclose processes in which a low-cis BR and SBR are modified with an alkoxysilane compound.

However, a low-cis BR has an insufficient abrasion resistance, and the problem cannot be solved even by the modification. Meanwhile, a SBR has a low rebound resilience, and the drawback cannot be sufficiently resolved even after the modification.

Patent Literatures 14 and 15 disclose Examples in which a high-cis BR obtained by a neodymium catalyst is modified with an alkoxysilane compound. However, the process for producing a modified conjugated diene polymer described in Patent Literature 14 involves the catalyst aging and the synthesis of the intermediate polymer, and therefore the operation is complicated. Meanwhile, the modified polymer described in Patent Literature 15 has a significantly increased Mooney viscosity, and therefore gelation is a matter of concern.

Patent Literatures 16 to 18 disclose processes in which a cis-1,4-polybutadiene is produced using a compound containing a rare-earth element corresponding to the atomic number 57 to 71 of the periodic table as the catalyst, and then the product is reacted with an amine compound, an imide compound, a quinone compound, a thiazole compound, a sulfenamide compound, or the like, to modify it. However, specific examples (Examples) of the process for polymerizing 1,3-butadiene are limited to processes in which a neodymium-containing catalyst is used.

Meanwhile, it is known that polybutadienes having various micro-structures may be obtained depending on the type of the polymerization catalyst, and a polybutadiene which is synthesized using a cobalt compound or a nickel compound and an organic aluminum compound has a high proportion of cis-form (high-cis BR), and therefore is suitably used as a material for a tire. A vinyl-cis polybutadiene (VCR) in which a syndiotactic-1,2-polybutadiene (SPB) is dispersed in a high-cis BR is known as a BR having more highly functional (higher performance) characteristics, while taking advantage of the characteristics of the high-cis BR. The VCR is known as a material which facilitates higher hardness, higher elastic modulus, and improved processability of the product, as compared with a conventional cis-1,4-polybutadiene rubber.

As a process for producing the VCR as described above, Patent Literatures 19 and 20, for example, disclose processes for producing a SPB-containing high-cis BR composite (VCR) using a cobalt catalyst. Patent Literature 21 discloses a process for producing a SPB-containing high-cis BR composite (VCR) using a nickel catalyst. Patent Literatures 22 and 23 also disclose processes for producing a VCR in a similar manner.

In addition, Patent Literature 24 discloses a process for producing a VCR in an inert organic solvent comprising a $C_4$ fraction such as n-butane, cis-2-butene, trans-2-butene, and 1-butene as the main component, wherein a soluble cobalt compound is used as the catalyst for the cis-1,4-polymerization.

CITATION LIST

Patent Literature

Patent Literature 1: JP-A-H07-268013
Patent Literature 2: JP-A-H11-80222
Patent Literature 3: JP-A-2007-161921
Patent Literature 4: JP-A-H06-228221
Patent Literature 5: JP-A-2007-230266
Patent Literature 6: JP-A-2012-180475
Patent Literature 7: JP-A-2004-346220
Patent Literature 8: JP-A-2000-86719
Patent Literature 9: JP-B-H06-53766
Patent Literature 10: JP-B-H06-57769
Patent Literature 11: JP-B-H06-78450
Patent Literature 12: JP-A-2010-209256
Patent Literature 13: JP-A-2013-129693
Patent Literature 14: JP-A-2007-308653
Patent Literature 15: JP-A-2005-8870
Patent Literature 16: JP-A-2001-139633
Patent Literature 17: JP-A-2001-139634
Patent Literature 18: JP-A-2002-30110
Patent Literature 19: JP-B-S49-17666
Patent Literature 20: JP-B-S49-17667
Patent Literature 21: JP-B-S63-1324
Patent Literature 22: JP-B-H02-62123
Patent Literature 23: JP-B-H04-48815
Patent Literature 24: JP-A-2000-44633

Non Patent Literature

Non Patent Literature 1: Polymer Preprints, Japan, Vol. 38, No. 2, p. 170 (1989)
Non Patent Literature 2: Macromolecules, Vol. 15, No. 2, p. 230-233 (1982)

SUMMARY OF INVENTION

Technical Problem

The present invention was made in view of the problems as described above, and an object thereof is to provide a catalyst for a conjugated diene polymerization, with which a conjugated diene polymer having a high content (proportion) of cis-1,4-structure may be produced with high activity; and a process for producing a conjugated diene polymer, a process for producing a modified conjugated diene polymer, and a process for producing a cis-1,4-polybutadiene containing a syndiotactic-1,2-polybutadiene (SPB) (vinyl-cis polybutadiene, VCR) using the same.

In addition, another object of the present invention is also to provide a conjugated diene polymer and a modified conjugated diene polymer which have a high content of cis-1,4-structure; and to provide a conjugated diene polymer composition or a modified conjugated diene polymer composition comprising a conjugated diene polymer or a modified conjugated diene polymer, wherein the polymers have a high content of cis-1,4-structure, and a conjugated diene polymer composition or a modified conjugated diene polymer composition having the effect of low fuel consumption, which is required for a tire, or the like, and so on.

Furthermore, another object of the present invention is also to provide a vinyl-cis polybutadiene (VCR) containing a syndiotactic-1,2-polybutadiene (SPB) in a polybutadiene having a high content of cis-1,4-structure (high-cis BR); and a polybutadiene composition comprising the same, and a polybutadiene composition having excellent fatigue resistance and abrasion resistance.

Solution to Problem

The present invention relates to the following items.

[1] A catalyst for a conjugated diene polymerization, comprising
a metal compound (A1) containing terbium, lanthanum, dysprosium, holmium, erbium, or thulium;
an ionic compound (B) consisting of a non-coordinating anion and a cation; and
an organic metal compound (C) of an element selected from the groups 2, 12 and 13 of the periodic table.

[2] The catalyst for a conjugated diene polymerization as described in [1], wherein the metal compound (A1) is a non-metallocene type metal compound represented by the following general formula (1-1):

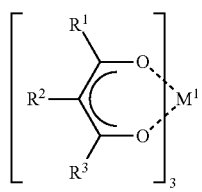

(1-1)

wherein
$R^1$, $R^2$, and $R^3$ each represent a hydrogen atom, or a substituent containing 1 to 12 carbon atoms;
O represents an oxygen atom; and
$M^1$ represents a terbium atom (Tb), a lanthanum atom (La), a dysprosium atom (Dy), a holmium atom (Ho), an erbium atom (Er), or a thulium atom (Tm).

[3] The catalyst for a conjugated diene polymerization as described in [1] or [2], wherein the organic metal compound (C) is an organic aluminum.

[4] The catalyst for a conjugated diene polymerization as described in any one of [1] to [3], wherein the ionic compound (B) is a boron-containing compound.

[5] A process for producing a conjugated diene polymer, comprising
polymerizing a conjugated diene compound using the catalyst for a conjugated diene polymerization as described in any one of [1] to [4].

[6] The process for producing a conjugated diene polymer as described in [5], wherein the conjugated diene compound is polymerized using a compound selected from the group consisting of (1) hydrogen, (2) a metal hydride compound, and (3) an organic metal hydride compound as a molecular weight regulator.

[7] The process for producing a conjugated diene polymer as described in [5] or [6], wherein the conjugated diene compound is 1,3-butadiene.

[8] A conjugated diene polymer produced by the process for producing a conjugated diene polymer as described in any one of [5] to [7].

[9] A conjugated diene polymer composition, comprising
a conjugated diene polymer (α) obtained by polymerizing a conjugated diene compound using a catalyst for a conjugated diene polymerization which comprises
a non-metallocene type metal compound (A2) represented by the following general formula (1-2);

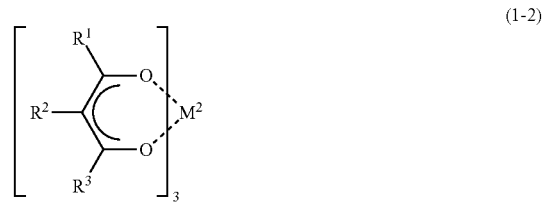

(1-2)

wherein $R^1$, $R^2$, and $R^3$ each represent a hydrogen atom, or a substituent containing 1 to 12 carbon atoms;

O represents an oxygen atom; and $M^2$ represents a terbium atom (Tb), a lanthanum atom (La), a dysprosium atom (Dy), a praseodymium atom (Pr), a holmium atom (Ho), an erbium atom (Er), or a thulium atom (Tm), an ionic compound (B) consisting of a non-coordinating anion and a cation, and an organic metal compound (C) of an element selected from the groups 2, 12 and 13 of the periodic table;

a diene polymer (β) other than (α); and a rubber reinforcing agent (γ).

[10] The conjugated diene polymer composition as described in [9], wherein the rubber reinforcing agent (γ) is carbon black and/or silica.

[11] The conjugated diene polymer composition as described in any one of [9] to [10], wherein the conjugated diene compound is 1,3-butadiene.

[12] A process for producing a modified conjugated diene polymer, comprising
polymerizing a conjugated diene compound using a catalyst which comprises
a metal compound (A2) containing terbium, lanthanum, dysprosium, praseodymium, holmium, erbium, or thulium,
an ionic compound (B) consisting of a non-coordinating anion and a cation, and
an organic metal compound (C) of an element selected from the groups 2, 12 and 13 of the periodic table; and then
modifying the obtained conjugated diene polymer with a modifying agent.

[13] The process for producing a modified conjugated diene polymer as described in [12], wherein the metal compound (A2) is a non-metallocene type metal compound represented by the following general formula (1-2);

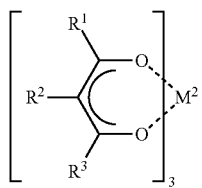

(1-2)

wherein
R$^1$, R$^2$, and R$^3$ each represent a hydrogen atom, or a substituent containing 1 to 12 carbon atoms;
O represents an oxygen atom; and
M$^2$ represents a terbium atom (Tb), a lanthanum atom (La), a dysprosium atom (Dy), a praseodymium atom (Pr), a holmium atom (Ho), an erbium atom (Er), or a thulium atom (Tm).

[14] The process for producing a modified conjugated diene polymer as described in [12] or [13], wherein the modifying agent is an aromatic compound having a polar functional group.

[15] The process for producing a modified conjugated diene polymer as described in [14], wherein the aromatic compound having a polar functional group is at least one selected from the group consisting of a halogenated benzyl compound, an aromatic aldehyde compound, and an aromatic carbonyl compound.

[16] The process for producing a modified conjugated diene polymer as described in any one of [12] to [15], wherein the conjugated diene polymer is a polybutadiene having cis-1,4-structure in an amount of 90% or more.

[17] A process for producing a modified conjugated diene polymer, comprising
polymerizing a conjugated diene compound using a catalyst which comprises
a metal compound (A) containing terbium, lanthanum, dysprosium, praseodymium, holmium, erbium, thulium, or gadolinium,
an ionic compound (B) consisting of a non-coordinating anion and a cation, and
an organic metal compound (C) of an element selected from the groups 2, 12 and 13 of the periodic table; and then
modifying the obtained conjugated diene polymer with an organosilicon compound having an alkoxy group.

[18] The process for producing a modified conjugated diene polymer as described in [17], wherein the metal compound (A) is a non-metallocene type metal compound represented by the following general formula (1):

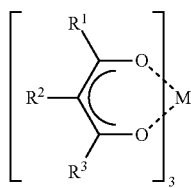

(1)

wherein
R$^1$, R$^2$, and R$^3$ each represent a hydrogen atom, or a substituent containing 1 to 12 carbon atoms;
O represents an oxygen atom; and
M represents a terbium atom (Tb), a lanthanum atom (La), a dysprosium atom (Dy), a praseodymium atom (Pr), a holmium atom (Ho), an erbium atom (Er), a thulium atom (Tm), or a gadolinium atom (Gd).

[19] The process for producing a modified conjugated diene polymer as described in [17] or [18], wherein the organosilicon compound having an alkoxy group is an alkoxysilane compound containing a cyclic ether.

[20] The process for producing a modified conjugated diene polymer as described in any one of [17] to [19], wherein the conjugated diene polymer is a polybutadiene having cis-1,4-structure in an amount of 90% or more.

[21] The process for producing a modified conjugated diene polymer as described in any one of [17] to [20], wherein the amount of the organosilicon compound having an alkoxy group to be added is less than 10 equivalents relative to the metal compound (A).

[22] A modified conjugated diene polymer produced by the process for producing a modified conjugated diene polymer as described in any one of [12] to [21].

[23] A modified conjugated diene polymer composition, comprising
a modified conjugated diene polymer (α') as described in [22];
a diene polymer (β) other than (α'); and
a rubber reinforcing agent (γ).

[24] The modified conjugated diene polymer composition as described in [23], wherein the rubber reinforcing agent (γ) is carbon black and/or silica.

[25] A tire obtained using the conjugated diene polymer composition as described in any one of [9] to [11], or the modified conjugated diene polymer composition as described in [23] or [24].

[26] A rubber belt obtained using the conjugated diene polymer composition as described in any one of [9] to [11], or the modified conjugated diene polymer composition as described in [23] or [24].

[27] A process for producing a polybutadiene, comprising
performing cis-1,4-polymerization of 1,3-butadiene; and then
performing syndiotactic-1,2-polymerization in the polymerization system,
wherein a catalyst which comprises
a metal compound (A2) containing terbium, lanthanum, dysprosium, praseodymium, holmium, erbium, or thulium;
an ionic compound (B) consisting of a non-coordinating anion and a cation; and
an organic metal compound (C) of an element selected from the groups 2, 12 and 13 of the periodic table
is used as the catalyst for the cis-1,4-polymerization.

[28] The process for producing a polybutadiene as described in [27], wherein the metal compound (A2) is a non-metallocene type metal compound represented by the following general formula (1-2):

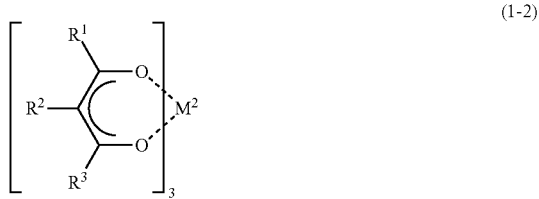

(1-2)

wherein
$R^1$, $R^2$, and $R^3$ each represent a hydrogen atom, or a substituent containing 1 to 12 carbon atoms;
O represents an oxygen atom; and
$M^2$ represents a terbium atom (Tb), a lanthanum atom (La), a dysprosium atom (Dy), a praseodymium atom (Pr), a holmium atom (Ho), an erbium atom (Er), or a thulium atom (Tm).

[29] The process for producing a polybutadiene as described in [27] or [28], wherein the catalyst for the syndiotactic-1,2-polymerization is a catalyst system comprising a sulfur compound.

[30] A polybutadiene produced by the process for producing a polybutadiene as described in any one of [27] to [29].

[31] A polybutadiene composition, comprising
a vinyl-cis polybutadiene (α");
a diene polymer (β) other than (α"); and
a rubber reinforcing agent (γ),
wherein the vinyl-cis polybutadiene (α") is a polybutadiene obtained by
performing cis-1,4-polymerization of 1,3-butadiene; and then
performing syndiotactic-1,2-polymerization in the polymerization system,
wherein the polybutadiene is produced using a catalyst which comprises
a non-metallocene type metal compound (A) represented by the following general formula (1);

(1)

wherein
$R^1$, $R^2$, and $R^3$ each represent a hydrogen atom, or a substituent containing 1 to 12 carbon atoms,
O represents an oxygen atom, and
M represents a terbium atom (Tb), a lanthanum atom (La), a dysprosium atom (Dy), a praseodymium atom (Pr), a holmium atom (Ho), an erbium atom (Er), a thulium atom (Tm), or a gadolinium atom (Gd);
an ionic compound (B) consisting of a non-coordinating anion and a cation; and
an organic metal compound (C) of an element selected from the groups 2, 12 and 13 of the periodic table as the catalyst for the cis-1,4-polymerization.

[32] The polybutadiene composition as described in [31], wherein the rubber reinforcing agent (γ) is carbon black and/or silica.

Advantageous Effects of Invention

According to the present invention, there may be provided a catalyst for a conjugated diene polymerization, with which a conjugated diene polymer having a high content (proportion) of cis-1,4-structure may be produced with high activity; and a process for producing a conjugated diene polymer, a process for producing a modified conjugated diene polymer, and a process for producing a cis-1,4-polybutadiene containing a syndiotactic-1,2-polybutadiene (SPB) (vinyl-cis polybutadiene, VCR) using the same. The catalyst for a conjugated diene polymerization of the present invention is relatively easy to handle.

In addition, according to the present invention, there may be provided a conjugated diene polymer and a modified conjugated diene polymer which have a high content of cis-1,4-structure. There may be also provided a conjugated diene polymer composition or a modified conjugated diene polymer composition comprising a conjugated diene polymer or a modified conjugated diene polymer, wherein the polymers have a high content of cis-1,4-structure, and there may be also provided a conjugated diene polymer composition or a modified conjugated diene polymer composition having the effect of low fuel consumption, which is required for a tire, or the like, and so on.

In addition, according to the present invention, there may be provided a vinyl-cis polybutadiene (VCR) containing a syndiotactic-1,2-polybutadiene (SPB) in a polybutadiene having a high content of cis-1,4-structure (high-cis BR), and a polybutadiene composition comprising the same, and there may be also provided a a polybutadiene composition having excellent fatigue resistance and abrasion resistance.

BRIEF DESCRIPTION OF DRAWINGS

FIG. 1 is a graph showing the relationship between the UV/RI value and the $(1/Mn) \times 10^4$, which is for determining the degree of modification of the modified conjugated diene polymer of the present invention. Herein, the UV represents the value of the peak area obtained from the UV absorbance at 274 nm, which is obtained by the GPC measurement of the polymer, and the RI represents the value of the peak area obtained from the differential refractive index. In addition, the Mn represents the number-average molecular weight.

DESCRIPTION OF EMBODIMENTS (Catalyst for a Conjugated Diene Polymerization)

The catalyst for a conjugated diene polymerization of the present invention comprises
a metal compound (A) containing terbium (Tb), lanthanum (La), dysprosium (Dy), praseodymium (Pr), holmium (Ho), erbium (Er), thulium (Tm), or gadolinium (Gd);
an ionic compound (B) consisting of a non-coordinating anion and a cation; and
an organic metal compound (C) of an element selected from the groups 2, 12 and 13 of the periodic table.

In one embodiment, however, a catalyst in which the metal compound (A) is a metal compound containing gadolinium (Gd) may be excluded. In another embodiment, a catalyst in which the metal compound (A) is a metal compound containing praseodymium (Pr) may be also excluded. For convenience, the metal compound (A) in the embodiment where a metal compound containing gadolinium (Gd) and a metal compound containing praseodymium (Pr) are excluded, that is, a metal compound containing terbium (Tb), lanthanum (La), dysprosium (Dy), holmium (Ho), erbium (Er), or thulium (Tm) is sometimes referred to as the metal compound (A1). For convenience, the metal compound (A) in the embodiment where a metal compound containing gadolinium (Gd) is excluded, that is, a metal compound containing terbium (Tb), lanthanum (La), dysprosium (Dy), praseodymium (Pr), holmium (Ho), erbium (Er), or thulium (Tm) is sometimes referred to as the metal compound (A2).

The metal compound (A) may be used alone or in combination of two or more types thereof.

The metal compound (A) may be any compound, on the condition that the compound contains terbium (Tb), lanthanum (La), dysprosium (Dy), praseodymium (Pr), holmium (Ho), erbium (Er), thulium (Tm) or gadolinium (Gd), and is soluble in a nonpolar organic solvent, and may be a metallocene type metal compound or may be a non-metallocene type metal compound. Among them, a non-metallocene type metal compound, which is relatively easy to synthesize, is more preferred than a metallocene type metal compound.

Examples of the metal compound (A) include salts such as terbium salt, lanthanum salt, dysprosium salt, praseodymium salt, holmium salt, erbium salt, thulium salt, and gadolinium salt; halides such as terbium halide, lanthanum halide, dysprosium halide, praseodymium halide, holmium halide, erbium halide, thulium halide, and gadolinium halide; alkoxides such as terbium alkoxide, lanthanum alkoxide, dysprosium alkoxide, praseodymium alkoxide, holmium alkoxide, erbium alkoxide, thulium alkoxide, and gadolinium alkoxide; and non-metallocene type metal complexes such as non-metallocene type terbium complex, non-metallocene type lanthanum complex, non-metallocene type dysprosium complex, non-metallocene type praseodymium complex, non-metallocene type holmium complex, non-metallocene type erbium complex, non-metallocene type thulium complex, and non-metallocene type gadolinium complex.

Examples of the terbium salt include terbium acetate, terbium oxalate, terbium nitrate, and terbium hydroxide. Examples of the lanthanum salt include lanthanum acetate, lanthanum oxalate, lanthanum nitrate, and lanthanum hydroxide. Examples of the dysprosium salt include dysprosium acetate, dysprosium oxalate, dysprosium nitrate, and dysprosium hydroxide. Examples of the praseodymium salt include praseodymium acetate, praseodymium oxalate, praseodymium nitrate, and praseodymium hydroxide. Examples of the holmium salt include holmium acetate, holmium oxalate, holmium nitrate, and holmium hydroxide. Examples of the erbium salt include erbium acetate, erbium oxalate, erbium nitrate, and erbium hydroxide. Examples of the thulium salt include thulium acetate, thulium oxalate, thulium nitrate, and thulium hydroxide. Examples of the gadolinium salt include gadolinium acetate, gadolinium oxalate, gadolinium nitrate, and gadolinium hydroxide.

Examples of the terbium halide include terbium fluoride, terbium chloride, terbium bromide, and terbium iodide. Examples of the lanthanum halide include lanthanum fluoride, lanthanum chloride, lanthanum bromide, and lanthanum iodide. Examples of the dysprosium halide include dysprosium fluoride, dysprosium chloride, dysprosium bromide, and dysprosium iodide. Examples of the praseodymium halide include praseodymium fluoride, praseodymium chloride, praseodymium bromide, and praseodymium iodide. Examples of the holmium halide include holmium fluoride, holmium chloride, holmium bromide, and holmium iodide. Examples of the erbium halide include erbium fluoride, erbium chloride, erbium bromide, and erbium iodide. Examples of the thulium halide include thulium fluoride, thulium chloride, thulium bromide, and thulium iodide. Examples of the gadolinium halide include gadolinium fluoride, gadolinium chloride, gadolinium bromide, and gadolinium iodide.

Examples of the terbium alkoxide include trimethoxy terbium, triethoxy terbium, tripropoxy terbium, triisopropoxy terbium, and tributoxy terbium. Examples of the lanthanum alkoxide include trimethoxy lanthanum, triethoxy lanthanum, tripropoxy lanthanum, triisopropoxy lanthanum, and tributoxy lanthanum. Examples of the dysprosium alkoxide include trimethoxy dysprosium, triethoxy dysprosium, tripropoxy dysprosium, triisopropoxy dysprosium, and tributoxy dysprosium. Examples of the praseodymium alkoxide include trimethoxy praseodymium, triethoxy praseodymium, tripropoxy praseodymium, triisopropoxy praseodymium, and tributoxy praseodymium. Examples of the holmium alkoxide include trimethoxy holmium, triethoxy holmium, tripropoxy holmium, triisopropoxy holmium, and tributoxy holmium. Examples of the erbium alkoxide include trimethoxy erbium, triethoxy erbium, tripropoxy erbium, triisopropoxy erbium, and tributoxy erbium. Examples of the thulium alkoxide include trimethoxy thulium, triethoxy thulium, tripropoxy thulium, triisopropoxy thulium, and tributoxy thulium. Examples of the gadolinium alkoxide include trimethoxy gadolinium, triethoxy gadolinium, tripropoxy gadolinium, triisopropoxy gadolinium, and tributoxy gadolinium.

The metal compound (A) used in the catalyst for a conjugated diene polymerization according to the present invention is particularly preferably a non-metallocene type metal compound represented by the general formula (1) as described below. When the non-metallocene type metal compound represented by the general formula (1) is used, a conjugated diene polymer having a high content of cis-1,4-structure and having various excellent properties may be obtained.

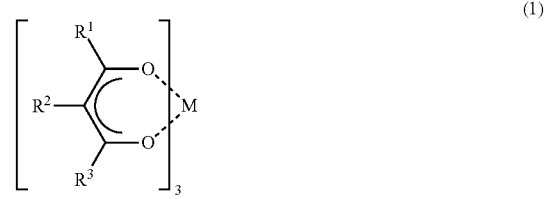

(1)

wherein $R^1$, $R^2$, and $R^3$ each represent a hydrogen atom, or a substituent containing 1 to 12 carbon atoms;

O represents an oxygen atom; and

M represents a terbium atom (Tb), a lanthanum atom (La), a dysprosium atom (Dy), a praseodymium atom (Pr), a holmium atom (Ho), an erbium atom (Er), a thulium atom (Tm), or a gadolinium atom (Gd).

In one embodiment, however, a compound in which M is a gadolinium atom (Gd) may be excluded. In another embodiment, a compound in which M is a praseodymium atom (Pr) may be also excluded. The non-metallocene type metal compound represented by the general formula (1) from which a compound in which M is gadolinium (Gd) and a compound in which M is praseodymium (Pr) are excluded is the non-metallocene type metal compound represented by the general formula (1-1). The non-metallocene type metal compound represented by the general formula (1) from which a compound in which M is gadolinium (Gd) is excluded is the non-metallocene type metal compound represented by the general formula (1-2). The $R^1$ to $R^3$ in the general formula (1-1) and the $R^1$ to $R^3$ in the general formula (1-2) correspond to the $R^1$ to $R^3$ in the general formula (1), respectively, and examples thereof include those listed as the $R^1$ to $R^3$ in the general formula (1) and the preferred ones are also the same as the $R^1$ to $R^3$ in the general formula (1).

Specific examples of the substituent containing 1 to 12 carbon atoms in the $R^1$ to $R^3$ in the general formulas (1), (1-1) and (1-2) include saturated hydrocarbon groups such as methyl, ethyl, n-propyl, isopropyl, n-butyl, s-butyl, isobutyl, t-butyl, n-pentyl, 1-methylbutyl, 2-methylbutyl, 3-methylbutyl, 1,1-dimethylpropyl, 1,2-dimethylpropyl, 2,2-dimethylpropyl, hexyl, heptyl, octyl, nonyl, decyl, undecyl, and dodecyl; unsaturated hydrocarbon groups such as vinyl, 1-propenyl, and allyl; alicyclic hydrocarbon groups such as cyclohexyl, methylcyclohexyl, and ethylcyclohexyl; and aromatic hydrocarbon groups such as phenyl, benzyl, toluyl, and phenethyl. In addition, examples thereof also include groups having hydroxyl, carboxyl, carbomethoxy, carboethoxy, amide, amino, alkoxy, phenoxy, or the like substituted at an arbitrary position in these groups. Among them, a saturated hydrocarbon group containing 1 to 12 carbon atoms is preferred, and a saturated hydrocarbon group containing 1 to 6 carbon atoms is particularly preferred.

As for the $R^1$ to $R^3$ in the general formulas (1), (1-1) and (1-2), it is preferred that $R^2$ is hydrogen or a substituent containing 1 to 12 carbon atoms, and $R^1$ and $R^3$ each are a substituent containing 1 to 12 carbon atoms. It is particularly preferred that $R^2$ is hydrogen or a substituent containing 1 to 6 carbon atoms, and $R^1$ and $R^3$ each are a substituent containing 1 to 6 carbon atoms.

As for the $R^1$ to $R^3$ in the general formulas (1), (1-1) and (1-2), it is also preferred that $R^2$ is hydrogen or a saturated hydrocarbon group containing 1 to 12 carbon atoms, and $R^1$ and $R^3$ each are a saturated hydrocarbon group containing 1 to 12 carbon atoms. It is particularly preferred that $R^2$ is hydrogen or a saturated hydrocarbon group containing 1 to 6 carbon atoms, and $R^1$ and $R^3$ each are a saturated hydrocarbon group containing 1 to 6 carbon atoms.

Specific examples of the non-metallocene type metal compound (A) of the general formula (1) in which M is terbium (Tb) include tris(2,2,6,6-tetramethyl-3,5-heptanedionato)terbium, tris(2,6,6-trimethyl-3,5-heptanedionato)terbium, tris(2,6-dimethyl-3,5-heptanedionato)terbium, tris(3,5-heptanedionato)terbium, tris(2,4-pentanedionato)terbium, tris(2,4-hexanedionato)terbium, tris(1,5-dicyclopentyl-2,4-pentanedionato)terbium, and tris(1,5-dicyclohexyl-2,4-pentanedionato)terbium.

Among them, preferable examples thereof include tris(2,2,6,6-tetramethyl-3,5-heptanedionato)terbium, tris(2,6-dimethyl-3,5-heptanedionato)terbium, and tris(2,4-pentanedionato)terbium. Particularly preferable examples thereof include tris(2,2,6,6-tetramethyl-3,5-heptanedionato)terbium, and tris(2,6-dimethyl-3,5-heptanedionato)terbium.

Specific examples of the non-metallocene type metal compound (A) of the general formula (1) in which M is lanthanum (La) include tris(2,2,6,6-tetramethyl-3,5-heptanedionato)lanthanum, tris(2,6,6-trimethyl-3,5-heptanedionato)lanthanum, tris(2,6-dimethyl-3,5-heptanedionato)lanthanum, tris(3,5-heptanedionato)lanthanum, tris(2,4-pentanedionato)lanthanum, tris(2,4-hexanedionato)lanthanum, tris(1,5-dicyclopentyl-2,4-pentanedionato)lanthanum, and tris(1,5-dicyclohexyl-2,4-pentanedionato)lanthanum.

Among them, preferable examples thereof include tris(2,2,6,6-tetramethyl-3,5-heptanedionato)lanthanum, tris(2,6-dimethyl-3,5-heptanedionato)lanthanum, and tris(2,4-pentanedionato)lanthanum. Particularly preferable examples thereof include tris(2,2,6,6-tetramethyl-3,5-heptanedionato)lanthanum, and tris(2,6-dimethyl-3,5-heptanedionato)lanthanum.

Specific examples of the non-metallocene type metal compound (A) of the general formula (1) in which M is dysprosium (Dy) include tris(2,2,6,6-tetramethyl-3,5-heptanedionato)dysprosium, tris(2,6,6-trimethyl-3,5-heptanedionato)dysprosium, tris(2,6-dimethyl-3,5-heptanedionato)dysprosium, tris(3,5-heptanedionato)dysprosium, tris(2,4-pentanedionato)dysprosium, tris(2,4-hexanedionato)dysprosium, tris(1,5-dicyclopentyl-2,4-pentanedionato)dysprosium, and tris(1,5-dicyclohexyl-2,4-pentanedionato)dysprosium.

Among them, preferable examples thereof include tris(2,2,6,6-tetramethyl-3,5-heptanedionato)dysprosium, tris(2,6-dimethyl-3,5-heptanedionato)dysprosium, and tris(2,4-pentanedionato)dysprosium. Particularly preferable examples thereof include tris(2,2,6,6-tetramethyl-3,5-heptanedionato)dysprosium, and tris(2,6-dimethyl-3,5-heptanedionato)dysprosium.

Specific examples of the non-metallocene type metal compound (A) of the general formula (1) in which M is praseodymium (Pr) include tris(2,2,6,6-tetramethyl-3,5-heptanedionato)praseodymium, tris(2,6,6-trimethyl-3,5-heptanedionato)praseodymium, tris(2,6-dimethyl-3,5-heptanedionato)praseodymium, tris(3,5-heptanedionato)praseodymium, tris(2,4-pentanedionato)praseodymium, tris(2,4-hexanedionato)praseodymium, tris(1,5-dicyclopentyl-2,4-pentanedionato)praseodymium, and tris(1,5-dicyclohexyl-2,4-pentanedionato)praseodymium.

Among them, preferable examples thereof include tris(2,2,6,6-tetramethyl-3,5-heptanedionato)praseodymium, tris(2,6-dimethyl-3,5-heptanedionato)praseodymium, and tris(2,4-pentanedionato)praseodymium. Particularly preferable examples thereof include tris(2,2,6,6-tetramethyl-3,5-heptanedionato)praseodymium, and tris(2,6-dimethyl-3,5-heptanedionato)praseodymium.

Specific examples of the non-metallocene type metal compound (A) of the general formula (1) in which M is holmium (Ho) include tris(2,2,6,6-tetramethyl-3,5-heptanedionato)holmium, tris(2,6,6-trimethyl-3,5-heptanedionato)holmium, tris(2,6-dimethyl-3,5-heptanedionato)holmium, tris(3,5-heptanedionato)holmium, tris(2,4-pentanedionato)holmium, tris(2,4-hexanedionato)holmium, tris(1,5-dicyclopentyl-2,4-pentanedionato)holmium, and tris(1,5-dicyclohexyl-2,4-pentanedionato)holmium.

Among them, preferable examples thereof include tris(2,2,6,6-tetramethyl-3,5-heptanedionato)holmium, tris(2,6-dimethyl-3,5-heptanedionato)holmium, and tris(2,4-pentanedionato)holmium. Particularly preferable examples thereof include tris(2,2,6,6-tetramethyl-3,5-heptanedionato)holmium, and tris(2,6-dimethyl-3,5-heptanedionato)holmium.

Specific examples of the non-metallocene type metal compound (A) of the general formula (1) in which M is erbium (Er) include tris(2,2,6,6-tetramethyl-3,5-heptanedionato)erbium, tris(2,6,6-trimethyl-3,5-heptanedionato)erbium, tris(2,6-dimethyl-3,5-heptanedionato)erbium, tris(3,5-heptanedionato)erbium, tris(2,4-pentanedionato)erbium, tris(2,4-hexanedionato)erbium, tris(1,5-dicyclopentyl-2,4-pentanedionato)erbium, and tris(1,5-dicyclohexyl-2,4-pentanedionato)erbium.

Among them, preferable examples thereof include tris(2,2,6,6-tetramethyl-3,5-heptanedionato)erbium, tris(2,6-dimethyl-3,5-heptanedionato)erbium, and tris(2,4-pentanedionato)erbium. Particularly preferable examples thereof include tris(2,2,6,6-tetramethyl-3,5-heptanedionato)erbium, and tris(2,6-dimethyl-3,5-heptanedionato)erbium.

Specific examples of the non-metallocene type metal compound (A) of the general formula (1) in which M is thulium (Tm) include tris(2,2,6,6-tetramethyl-3,5-heptanedionato)thulium, tris(2,6,6-trimethyl-3,5-heptanedionato)thulium, tris(2,6-dimethyl-3,5-heptanedionato)thulium, tris(3,5-heptanedionato)thulium, tris(2,4-pentanedionato)thulium, tris(2,4-hexanedionato)thulium, tris(1,5-dicyclopentyl-2,4-pentanedionato)thulium, and tris(1,5-dicyclohexyl-2,4-pentanedionato)thulium.

Among them, preferable examples thereof include tris(2,2,6,6-tetramethyl-3,5-heptanedionato)thulium, tris(2,6-dimethyl-3,5-heptanedionato)thulium, and tris(2,4-pentanedionato)thulium. Particularly preferable examples thereof include tris(2,2,6,6-tetramethyl-3,5-heptanedionato)thulium, and tris(2,6-dimethyl-3,5-heptanedionato)thulium.

Specific examples of the non-metallocene type metal compound (A) of the general formula (1) in which M is gadolinium (Gd) include tris(2,2,6,6-tetramethyl-3,5-heptanedionato)gadolinium, tris(2,6,6-trimethyl-3,5-heptanedionato)gadolinium, tris(2,6-dimethyl-3,5-heptanedionato)gadolinium, tris(3,5-heptanedionato)gadolinium, tris(2,4-pentanedionato)gadolinium, tris(2,4-hexanedionato)gadolinium, tris(1,5-dicyclopentyl-2,4-pentanedionato)gadolinium, and tris(1,5-dicyclohexyl-2,4-pentanedionato)gadolinium.

Among them, preferable examples thereof include tris(2,2,6,6-tetramethyl-3,5-heptanedionato)gadolinium, tris(2,6-dimethyl-3,5-heptanedionato)gadolinium, and tris(2,4-pentanedionato)gadolinium. Particularly preferable examples thereof include tris(2,2,6,6-tetramethyl-3,5-heptanedionato)gadolinium, and tris(2,6-dimethyl-3,5-heptanedionato)gadolinium.

The non-metallocene type metal compound (A) may be used alone or in combination of two or more types thereof.

The metal compound (A) may be used as a catalyst for a conjugated diene polymerization when combined with the ionic compound (B) consisting of a non-coordinating anion and a cation, and the organic metal compound (C) of an element selected from the groups 2, 12 and 13 of the periodic table.

As for the ionic compound consisting of a non-coordinating anion and a cation, which is the Component (B), examples of the non-coordinating anion include tetra(phenyl)borate, tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(3,5-bis-trifluoromethylphenyl)borate, tetrakis(tetrafluoromethylphenyl)borate, tetra(tolyl)borate, tetra(xylyl)borate, triphenyl(pentafluorophenyl)borate, tris(pentafluorophenyl)(phenyl)borate, tridecahydride-7,8-dicarbaundecaborate, tetrafluoroborate, and hexafluorophosphate.

Meanwhile, examples of the cation include carbonium cation, oxonium cation, ammonium cation, phosphonium cation, cycloheptatrienyl cation, and ferrocenium cation.

Specific examples of the carbonium cation include tri-substituted carbonium cations such as triphenylcarbonium cation, and tri-substituted phenyl carbonium cation. Specific examples of the tri-substituted phenyl carbonium cation include tri(methylphenyl)carbonium cation, and tri(dimethylphenyl)carbonium cation.

Specific examples of the ammonium cation include trialkylammonium cations such as trimethylammonium cation, triethylammonium cation, tripropylammonium cation, tri(n-butyl)ammonium cation, and tri(i-butyl)ammonium cation; N,N-dialkylanilinium cations such as N,N-dimethylanilinium cation, N,N-diethylanilinium cation, and N,N-2,4,6-pentamethylanilinium cation; and dialkylammonium cations such as di(i-propyl)ammonium cation, and dicyclohexylammonium cation.

Specific examples of the phosphonium cation include arylphosphonium cations such as triphenylphosphonium cation, tetraphenylphosphonium cation, tri(methylphenyl)phosphonium cation, tetra(methylphenyl)phosphonium cation, tri(dimethylphenyl)phosphonium cation, and tetra(dimethylphenyl)phosphonium cation.

Any combination of a non-coordinating anion and a cation, which are arbitrarily selected from among those as exemplified above, respectively, may be preferably used as the ionic compound (B).

Among them, a boron-containing compound is preferred as the ionic compound (B). Among them, triphenylcarbenium tetrakis(pentafluorophenyl)borate, triphenylcarbenium tetrakis(fluorophenyl)borate, N,N-dimethylanilinium tetrakis(pentafluorophenyl)borate, 1,1'-dimethylferrocenium tetrakis(pentafluorophenyl)borate, and the like are particularly preferred. The ionic compound (B) may be used alone or in combination of two or more types thereof.

In addition, alumoxane may be used instead of the ionic compound consisting of a non-coordinating anion and a cation, which is the Component (B). Examples of the alumoxane include a linear alumoxane or a cyclic alumoxane, which may be obtained by contacting an organic aluminum compound with a condensing agent, and is represented by the general formula: (—Al(R')O—)$_n$ (wherein R' is a hydrocarbon group containing 1 to 10 carbon atoms, which includes the ones partially substituted by a halogen atom and/or an alkoxy group; and n is the degree of polymerization, and is 5 or more, preferably 10 or more.). Examples of the R' include methyl, ethyl, propyl and isobutyl, and methyl is preferred. Examples of the organic aluminum compound to be used as the starting material for the alumoxane include trialkyl aluminum such as trimethyl aluminum, triethyl aluminum, and triisobutyl aluminum; and a mixture thereof. Among them, an alumoxane obtained using a mixture of trimethyl aluminum and triisobutyl aluminum as the starting material may be preferably used.

Typical examples of the condensing agent to be used for the production of the alumoxane include water, and examples thereof in addition thereto include any substance which undergo a condensation reaction with the organic aluminum compound, for example, water adsorbed on an inorganic substance, or the like, and diols.

As the organic metal compound of an element selected from the groups 2, 12 and 13 of the periodic table, which is the Component (C), an organic magnesium compound, an organic zinc compound, an organic aluminum compound, or the like may be used, for example. Among these compounds, dialkyl magnesium; alkyl magnesium halide compounds such as alkyl magnesium chloride, and alkyl magnesium bromide; dialkyl zinc; trialkyl aluminum; dialkyl aluminum chloride, and dialkyl aluminum bromide; organic aluminum halide compounds such as alkyl aluminum sesquichloride, alkyl aluminum sesquibromide, and alkyl aluminum dichloride; organic aluminum hydride compounds such as dialkyl aluminum hydride; and the like are preferred.

Specific examples of the compound include alkyl magnesium halide compounds such as methyl magnesium chloride, ethyl magnesium chloride, butyl magnesium chloride, hexyl magnesium chloride, octyl magnesium chloride, ethyl magnesium bromide, butyl magnesium bromide, butyl magnesium iodide, and hexyl magnesium iodide.

In addition, examples thereof include dialkyl magnesium compounds such as dimethyl magnesium, diethyl magnesium, dibutyl magnesium, dihexyl magnesium, dioctyl magnesium, ethyl butyl magnesium, and ethyl hexyl magnesium.

In addition, examples thereof include dialkyl zinc compounds such as dimethyl zinc, diethyl zinc, diisobutyl zinc, dihexyl zinc, dioctyl zinc, and didecyl zinc.

In addition, examples thereof include trialkyl aluminum compounds such as trimethyl aluminum, triethyl aluminum, triisobutyl aluminum, trihexyl aluminum, trioctyl aluminum, and tridecyl aluminum.

In addition, examples thereof include dialkyl aluminum chloride compounds such as dimethyl aluminum chloride, and diethyl aluminum chloride; organic aluminum halide compounds such as ethyl aluminum sesquichloride, and ethyl aluminum dichloride; and organic aluminum hydride compounds such as diethyl aluminum hydride, diisobutyl aluminum hydride, and ethyl aluminum sesquihydride.

The organic metal compound (C) of an element selected from the groups 2, 12 and 13 of the periodic table may be used alone or in combination of two or more types thereof.

Among them, the compound (C) is preferably an organic metal compound of an element of the group 13. Among them, an organic aluminum compound is preferred, and examples thereof include trimethyl aluminum, triethyl aluminum, and triisobutyl aluminum. The compound (C) is particularly preferably triethyl aluminum.

According to the present invention, each catalyst component may be used in the form of being supported on an inorganic compound or an organic polymer compound.

Although no limits are set for the ratios of the Component (A) (metal compound), the Component (B) (ionic compound consisting of a non-coordinating anion and a cation) and the Component (C) (organic metal compound of an element selected from the groups 2, 12 and 13 of the periodic table) in the catalyst for a conjugated diene polymerization of the present invention, the amount of the Component (B) is preferably 0.5 to 10 mol, particularly preferably 1 to 5 mol, per 1 mol of the Component (A). The amount of the Component (C) is preferably 10 to 10000 mol, particularly preferably 50 to 7000 mol, per 1 mol of the Component (A).

(Conjugated Diene Polymer)

The conjugated diene polymer of the present invention is the one obtained by polymerizing a conjugated diene compound using the catalyst for a conjugated diene polymerization of the present invention as described above, that is, a catalyst which comprises a metal compound (A) containing terbium (Tb), lanthanum (La), dysprosium (Dy), praseodymium (Pr), holmium (Ho), erbium (Er), thulium (Tm), or gadolinium (Gd); an ionic compound (B) consisting of a non-coordinating anion and a cation; and an organic metal compound (C) of an element selected from the groups 2, 12 and 13 of the periodic table. The process for producing a conjugated diene polymer of the present invention is characterized in that a conjugated diene compound is polymerized using the catalyst for a conjugated diene polymerization of the present invention as described above.

Examples of the conjugated diene compound monomer, which is the starting material, include 1,3-butadiene, isoprene, 1,3-pentadiene, 2-ethyl-1,3-butadiene, 2,3-dimethyl butadiene, 2-methyl pentadiene, 4-methyl pentadiene, and 2,4-hexadiene. Among them, a conjugated diene compound monomer comprising 1,3-butadiene as the main component (for example, 50 mol % or more, preferably 80 mol % or more, more preferably 90 mol % or more) is preferred. The monomer component may be used alone or in combination of two or more types thereof.

The starting material monomer for the conjugated diene polymer of the present invention may comprise, in addition to the conjugated diene compound as described above, an olefin compound such as ethylene, propylene, allene, 1-butene, 2-butene, 1,2-butadiene, pentene, cyclopentene, hexene, cyclohexene, octene, cyclooctadiene, cyclododecatriene, norbornene, and norbornadiene.

According to the present invention, the polymerization of the conjugated diene is performed using the catalyst which comprises the Components (A), (B) and (C) as described above. In addition to the components as described above, however, a regulator of the molecular weight of the obtained conjugated diene polymer, or the like may be added, as long as the effect of the present invention would not be impaired.

A compound selected from the group consisting of hydrogen, a metal hydride compound, and an organic metal hydride compound may be used as the molecular weight regulator.

Examples of the metal hydride compound include lithium hydride, sodium hydride, potassium hydride, magnesium hydride, calcium hydride, borane, aluminum hydride, gallium hydride, silane, germane, lithium borohydride, sodium borohydride, lithium aluminum hydride, and sodium aluminum hydride.

Examples of the organic metal hydride compound include alkyl borane such as methyl borane, ethyl borane, propyl borane, butyl borane, and phenyl borane; dialkyl borane such as dimethyl borane, diethyl borane, dipropyl borane, dibutyl borane, and diphenyl borane; alkyl aluminum dihydride such as methyl aluminum dihydride, ethyl aluminum dihydride, propyl aluminum dihydride, butyl aluminum dihydride, and phenyl aluminum dihydride; dialkyl aluminum hydride such as dimethyl aluminum hydride, diethyl aluminum hydride, dipropyl aluminum hydride, di-normal-butyl aluminum hydride, diisobutyl aluminum hydride, and diphenyl aluminum hydride; silanes such as methyl silane, ethyl silane, propyl silane, butyl silane, phenyl silane, dimethyl silane, diethyl silane, dipropyl silane, dibutyl silane, diphenyl silane, trimethyl silane, triethyl silane, tripropyl silane, tributyl silane, and triphenyl silane; and germanes such as methyl germane, ethyl germane, propyl germane, butyl germane, phenyl germane, dimethyl germane, diethyl germane, dipropyl germane, dibutyl germane, diphenyl germane, trimethyl germane, triethyl germane, tripropyl germane, tributyl germane, and triphenyl germane.

Among them, diisobutyl aluminum hydride, and diethyl aluminum hydride are preferred, and diisobutyl aluminum hydride is particularly preferred.

In the process for producing a conjugated diene polymer according to the present invention, no limits are set for the order of the addition of the catalyst components [the metal compound (A), the ionic compound consisting of a non-coordinating anion and a cation (B), and the organic metal compound (C) of an element selected from the groups 2, 12 and 13 of the periodic table] and the addition may be performed in the order as described below, for example.

(1) The Component (C) is added into an inert organic solvent in the presence of or in the absence of a conjugated diene compound monomer, and then the Component (A) and the Component (B) are added thereto in an arbitrary order.

(2) The Component (C) is added into an inert organic solvent in the presence of or in the absence of a conjugated diene compound monomer, and the molecular weight regulator as described above is added thereto, and then the Component (A) and the Component (B) are added thereto in an arbitrary order.

(3) The Component (A) is added into an inert organic solvent in the presence of or in the absence of a conjugated diene compound monomer, and the Component (C) and the molecular weight regulator as described above are added thereto in an arbitrary order, and then the Component (B) is added thereto.

(4) The Component (B) is added into an inert organic solvent in the presence of or in the absence of a conjugated diene compound monomer, and the Component (C) and the molecular weight regulator as described above are added thereto in an arbitrary order, and then the Component (A) is added thereto.

(5) The Component (C) is added into an inert organic solvent in the presence of or in the absence of a conjugated diene compound monomer, and the Component (A) and the Component (B) are added thereto in an arbitrary order, and then the molecular weight regulator as described above is added thereto.

Herein, the monomer to be added at first may be the total amount of the monomer, or may be a part of the monomer.

No limits are set for the polymerization process, and mass polymerization (bulk polymerization) in which a conjugated diene compound monomer such as 1,3-butadiene itself is used as the polymerization solvent, solution polymerization, or the like may be applied. Examples of the solvent used in the solution polymerization include aliphatic hydrocarbons such as butane, pentane, hexane, and heptane; alicyclic hydrocarbons such as cyclopentane, and cyclohexane; aromatic hydrocarbons such as benzene, toluene, xylene, ethylbenzene, and cumene; and olefinic hydrocarbons such as the olefinic compounds as described above, and cis-2-butene and trans-2-butene. Among them, benzene, toluene, xylene, cyclohexane, or a mixture of cis-2-butene and trans-2-butene, or the like may be preferably used. The solvent may be used alone or in combination of two or more types thereof.

The polymerization temperature is preferably within the range of −30 to 150° C., particularly preferably 0 to 100° C. In the case where a metal compound containing lanthanum (La) or a metal compound containing praseodymium (Pr) is used as the metal compound (A), in particular, the polymerization temperature tends to be preferably 40° C. or less, more preferably within the range of 0 to 30° C.

The polymerization time is preferably 1 minute to 12 hours, particularly preferably 5 minutes to 5 hours.

The concentration of the Component (A) (metal compound) is preferably 1 to 100 μmol/L, particularly preferably 2 to 50 μmol/L, although the amount of the catalyst for a conjugated diene polymerization of the present invention to be used is not limited thereto.

After the polymerization is performed for a predetermined time, the pressure inside the polymerization vessel is released, as necessary, and a post-treatment such as washing step and drying step is performed. Thus the conjugated diene polymer of the present invention may be obtained.

Examples of the conjugated diene polymer obtained according to the present invention include cis-1,4-polybutadiene, which preferably has cis-1,4-structure in an amount of 89.0% or more, more preferably 90.0% or more, more preferably 91.0% or more, particularly preferably 91.5% or more, although the obtained conjugated diene polymer is not limited thereto. In one embodiment, it may be preferred that the content of cis-1,4-structure is higher, and examples of the conjugated diene polymer obtained according to the present invention include cis-1,4-polybutadiene, which preferably has cis-1,4-structure in an amount of 92.0% or more, more preferably 92.5% or more, more preferably 93.0% or more, more preferably 93.5% or more, more preferably 94.0% or more, particularly preferably 94.5% or more. The cis-1,4-structure content of the other conjugated diene polymer obtained according to the present invention such as polyisoprene is also preferably within the range as described above, although the content is not limited thereto. The "%" used herein for the cis-1,4-structure content means "mol %".

The intrinsic viscosity [η] of the conjugated diene polymer may be controlled to be preferably 0.1 to 10, more preferably 1.0 to 7.0, more preferably 1.2 to 5.0, particularly preferably 1.5 to 5.

The number-average molecular weight (Mn) of the conjugated diene polymer obtained according to the present invention may be preferably 10000 to 1000000, more preferably 30000 to 700000, particularly preferably 50000 to 550000. In one embodiment, the number-average molecular weight (Mn) of the conjugated diene polymer obtained according to the present invention is more preferably 100000 or more, particularly preferably 150000 or more. Meanwhile, the ratio (Mw/Mn) of the weight-average molecular weight (Mw) to the number-average molecular weight (Mn) of the conjugated diene polymer obtained according to the present invention may be preferably 1.5 to 10, more preferably 1.5 to 7, more preferably 1.5 to 5, particularly preferably 1.5 to 4. When the Mw/Mn is low, the processability may be worse.

(Modified Conjugated Diene Polymer)

The modified conjugated diene polymer of the present invention is the one obtained by polymerizing a conjugated diene compound using the catalyst for a conjugated diene polymerization of the present invention as described above, that is, a catalyst which comprises a metal compound (A) containing terbium (Tb), lanthanum (La), dysprosium (Dy), praseodymium (Pr), holmium (Ho), erbium (Er), thulium (Tm), or gadolinium (Gd); an ionic compound (B) consisting of a non-coordinating anion and a cation; and an organic metal compound (C) of an element selected from the groups 2, 12 and 13 of the periodic table; and then modifying the obtained conjugated diene polymer with a modifying agent (reacting the conjugated diene polymer with a modifying agent). The process for producing a modified conjugated diene polymer of the present invention is characterized in that a conjugated diene compound is polymerized using the catalyst for a conjugated diene polymerization of the present invention as described above; and then the obtained conjugated diene polymer is modified with a modifying agent.

The conjugated diene polymer to be reacted with the modifying agent is the conjugated diene polymer of the present invention as described above, and examples of the conjugated diene compound monomer, which is the starting material, include those as described above and the preferred ones are also the same as described above. The process for polymerizing the conjugated diene compound is also the same as described above.

In addition, the cis-1,4-structure content, the intrinsic viscosity [η], the number-average molecular weight (Mn), and the ratio (Mw/Mn) of the weight-average molecular weight (Mw) to the number-average molecular weight (Mn) of the modified conjugated diene polymer of the present invention are preferably within the same ranges as described above for the conjugated diene polymer of the present invention.

Examples of the modified conjugated diene polymer obtained according to the present invention include the one obtained by modifying cis-1,4-polybutadiene, which preferably has cis-1,4-structure in an amount of 89% or more, more preferably 90% or more, more preferably 91% or more, particularly preferably 91.5% or more, with a modifying agent, although the obtained modified conjugated diene polymer is not limited thereto. In one embodiment, examples of the modified conjugated diene polymer obtained according to the present invention include the one obtained by modifying cis-1,4-polybutadiene, which preferably has cis-1,4-structure in an amount of 93% or more, more preferably 94% or more, more preferably 95% or more, with a modifying agent.

Any known modifying agent may be used as the modifying agent to be used in the present invention, and examples thereof include aromatic compounds which have a polar functional group. Among them, an aromatic carbonyl compound, more preferably an aromatic carbonyl compound having an amino group and/or an alkoxy group, a halogenated benzyl compound, more preferably a halogenated benzyl compound having an alkoxy group, and an aromatic aldehyde compound, more preferably an aromatic aldehyde compound having an alkoxy group are preferred. The modifying agent may be used alone or in combination of two or more types thereof.

As for the aromatic carbonyl compound having an amino group, an aminobenzophenone compound is preferred, and it is also preferred that the amino group is an alkylamino group in which the amino group is bound to an alkyl group containing 1 to 6 carbon atoms. Specific examples of the compound include 4-dimethylaminoacetophenone, 4-diethylaminoacetophenone, 4-dimethylaminopropiophenone, 4-diethylaminopropiophenone, 1,3-bis(diphenylamino)-2-propanone, 1,7-bis(methylethylamino)-4-heptanone, 4-dimethylaminobenzophenone, 4-diethylaminobenzophenone, 4-dibutylaminobenzophenone, 4-diphenylaminobenzophenone, 4,4'-bis(dimethylamino)benzophenone, 4,4'-bis(diethylamino)benzophenone, 4,4'-bis(dibutylamino)benzophenone, 4,4'-bis(diphenylamino)benzophenone, 4-dimethylaminobenzaldehyde, 4-diphenylaminobenzaldehyde, and 4-divinylaminobenzaldehyde. Among these compounds, 4,4'-bis(dimethylamino)benzophenone, and 4,4'-bis(diethylamino)benzophenone are preferred, and 4,4'-bis(diethylamino)benzophenone is particularly preferred.

As for the aromatic carbonyl compound having an alkoxy group, an alkoxybenzophenone compound is preferred, and it is also preferred that the alkoxy group contains 1 to 6 carbon atoms. Specific examples of the compound include 4-methoxyacetophenone, 4-ethoxyacetophenone, 4-propoxyacetophenone, 4-butoxyacetophenone, 4-pentoxyacetophenone, 4-hexyloxyacetophenone, 2,4-dimethoxyacetophenone, 2,4-diethoxyacetophenone, 2,4-dipropoxyacetophenone, 2,4-dibutoxyacetophenone, 3,4-dimethoxyacetophenone, 3,4-diethoxyacetophenone, 3,4-dipropoxyacetophenone, 3,4-dibutoxyacetophenone, 2-methoxybenzophenone, 3-methoxybenzophenone, 4-methoxybenzophenone, 2-ethoxybenzophenone, 3-ethoxybenzophenone, 4-ethoxybenzophenone, 2-propoxybenzophenone, 3-propoxybenzophenone, 4-propoxybenzophenone, 2-butoxybenzophenone, 3-butoxybenzophenone, 4-butoxybenzophenone, 3,3'-dimethoxybenzophenone, 3,3'-diethoxybenzophenone, 4,4'-dimethoxybenzophenone, and 4,4'-diethoxybenzophenone. Among these compounds, 4,4'-dimethoxybenzophenone, and 4,4'-diethoxybenzophenone are preferred, and 4,4'-dimethoxybenzophenone is particularly preferred.

As for the halogenated benzyl compound, a halogenated benzyl compound having an alkoxy group (alkoxybenzyl halide compound) is preferred. Specific examples of the compound include methoxybenzyl chloride, methoxybenzyl bromide, methoxybenzyl iodide, ethoxybenzyl chloride, ethoxybenzyl bromide, ethoxybenzyl iodide, dimethoxybenzyl chloride, dimethoxybenzyl bromide, dimethoxybenzyl iodide, diethoxybenzyl chloride, diethoxybenzyl bromide, diethoxybenzyl iodide, piperonyl chloride, piperonyl bromide, and piperonyl iodide. Among these compounds, methoxybenzyl chloride, dimethoxybenzyl bromide, and piperonyl chloride are particularly preferred.

As for the aromatic aldehyde compound, an aromatic aldehyde compound having an alkoxy group is preferred. Specific examples of the compound include methoxybenzaldehyde, ethoxybenzaldehyde, propoxybenzaldehyde, butoxybenzaldehyde, veratraldehyde, 2,4-dimethoxybenzaldehyde, 3,5-dimethoxybenzaldehyde, diethoxybenzaldehyde, ethoxymethoxybenzaldehyde, trimethoxybenzaldehyde, and heliotropin. Among these compounds, veratraldehyde, and heliotropin are particularly preferred.

Examples of the modifying agent to be used in the present invention include, in addition thereto, quinone compounds, thiazole compounds, sulfeneamide compounds, dithiocarbamate compounds, thiuram compounds, imide compounds, thioimide compounds, amine compounds which have at least one oxirane group in the molecule, azine compounds which are condensation products of hydrazine and aldehyde and/or ketone, N-substituted aminoketone compounds, N-substituted aminoaldehyde compounds, N-substituted lactam compounds, N-substituted urea compounds, isocyanate compounds, 1-oxa-2-silacycloalkane compounds, cycloperoxide compounds, and organosilicon compounds which have an alkoxy group such as phenoxysilane compound, and alkoxysilane compounds.

Examples of the quinone compound include 1,4-benzoquinone, 1,4-naphthoquinone, anthraquinone, chloranil, bromanil, chloranilic acid, bromanilic acid, and 2,3-dichloro-1,4-naphthoquinone.

Examples of the thiazole compound include mercaptobenzothiazole, dibenzothiazole disulfide, and 2-(4-morpholinodithio)benzothiazole.

Examples of the sulfeneamide compound include N-t-butyl-2-benzothiazolyl sulfeneamide, N-cyclohexyl-2-benzothiazolyl sulfeneamide, N,N'-dicyclohexyl-2-benzothiazolyl sulfeneamide, and N-oxydiethylene-2-benzothiazolyl sulfeneamide.

Examples of the dithiocarbamate compound include diethyldithiocarbamic acid 2-benzothiazolyl ester, pentamethylene dithiocarbamic acid piperidine salt, and pipecoline dithiocarbamic acid pipecoline salt.

Examples of the thiuram compound include tetramethyl thiuram disulfide, tetramethylene thiuram monosulfide, and dipentamethylene thiuram tetrasulfide.

Examples of the imide compound include phthalimide, and pyromellitic diimide.

Examples of the thioimide compound include N-(cyclohexylthio)phthalimide, and N-(phenylthio)phthalimide.

Examples of the amine compound having at least one oxirane group in the molecule include t-butyl glycidyl amine, and N,N-diglycidyl aniline.

Examples of the azine compound which is a condensation product of hydrazine and aldehyde and/or ketone include formaldehyde azine, acetaldehyde azine, benzaldehyde azine, 2-pyridine carboxaldehyde azine, tetrahydrofuran-3-carboxaldehyde azine, N-methyl-2-pyrrole carboxaldehyde azine, acetone azine, and 2-acetyl pyridine azine.

Examples of the N-substituted aminoketone compound include 4-dimethylaminoacetophenone, 4-dimethylaminobenzophenone, 4-diphenylaminobenzophenone, 4,4'-bis(diethylamino)benzophenone, and 4,4'-bis(diphenylamino)benzophenone.

Examples of the N-substituted aminoaldehyde compound include 4-dimethylaminobenzaldehyde, and 4-diphenylaminobenzaldehyde. In addition, N-substituted aminothioaldehyde compounds corresponding to the N-substituted aminoaldehyde compounds as described above may be used.

Examples of the N-substituted lactam compound include N-methyl-β-propiolactam, N-methyl-2-pyrrolidone, N-methyl-ε-caprolactam, and N-phenyl-ω-laurolactam. In addition, N-substituted thiolactam compounds corresponding to the N-substituted lactam compounds as described above may be used.

Examples of the N-substituted urea compound include 1,3-dimethyl urea, and 1,3-dimethyl-2-imidazolidinone. In addition, N-substituted cyclic thiourea compounds corresponding to the N-substituted cyclic urea compounds as described above may be used.

Examples of the isocyanate compound include ethylene diisocyanate, tetramethylene 1,4-diisocyanate, hexamethylene 1,6-diisocyanate, dicyclohexylmethane 4,4'-diisocyanate, toluene 2,4- and 2,6-diisocyanate, diphenylmethane-2,4'-diisocyanate, and diphenylmethane 4,4'-diisocyanate. In addition, isothiocyanate compounds corresponding to the isocyanate compounds as described above may be used.

Examples of the 1-oxa-2-silacycloalkane compound include 2,2-dimethyl-1-oxa-2-silacyclohexane, 2,2-diphenyl-1-oxa-2-silacyclohexane, 2,2,4-trimethyl-1-oxa-2-silacyclopentane, and 2,2,4-trimethyl-1-oxa-4-aza-2-silacyclohexane.

Examples of the cycloperoxide compound include dimethyl dioxirane, 1,2-dioxolane, 1,2-dioxane, 1,2,4-trioxin, 1,2-dioxocane, 3,3,5,5,7,7-pentamethyl-1,2,4-trioxepane, and 3,6,9-triethyl-3,6,9-trimethyl-1,4,7-triperoxononane.

Examples of the phenoxysilane compound include vinyl triphenoxy silane, and methyl triphenoxy silane.

As for the modifying agent to be used in the present invention, an organosilicon compound having an alkoxy group is also preferred. In one embodiment, the modified conjugated diene polymer may be obtained while suppressing the gelation when an organosilicon compound having an alkoxy group is used as the modifying agent.

As for the organosilicon compound having an alkoxy group, a silane compound having an alkoxy group (alkoxysilane compound) is preferred, and an alkoxysilane compound containing a cyclic ether is more preferred. In addition, it is also preferred that the alkoxy group is an alkoxy group containing 1 to 6 carbon atoms. Specific examples of the compound include (3-glycidoxypropyl)dimethyl methoxy silane, (3-glycidoxypropyl)methyl dimethoxy silane, (3-glycidoxypropyl)dimethyl ethoxy silane, (3-glycidoxypropyl)methyl diethoxy silane, (3-glycidoxypropyl)bis(trimethoxysiloxy)-methyl silane, 3-glycidoxypropyl trimethoxy silane, 3-glycidoxypropyl triethoxy silane, 3-glycidoxypropyl methyl dimethoxy silane, 2-(3,4-epoxycyclohexyl)ethyl trimethoxy silane, 2-glycidoxypropyl trimethoxy silane, 2-glycidoxypropyl triethoxy silane, 4-glycidoxybutyl trimethoxy silane, and 4-glycidoxybutyl triethoxy silane. Among them, 3-glycidoxypropyl trimethoxy silane is preferred.

Examples of the other alkoxysilane compound which may be used as the modifying agent include vinyl trimethoxy silane, phenyl trimethoxy silane, 3-aminopropyl trimethoxy silane, and p-styryl trimethoxy silane.

The modifying agent may be used alone or in combination of two or more types thereof.

The organosilicon compound having an alkoxy group as described above may also be preferably used as a modifying agent for a conjugated diene polymer obtained by polymerizing a conjugated diene compound using any catalyst other than the catalyst for a conjugated diene polymerization of the present invention, for example, a catalyst comprising a rare-earth metal compound (A) such as neodymium (Nd) (with the proviso that Sm, Eu and Yb compounds are excluded.), an ionic compound (B) consisting of a non-coordinating anion and a cation, and an organic metal compound (C) of an element selected from the groups 2, 12 and 13 of the periodic table. A rubber composition comprising a modified conjugated diene polymer which is modified with the organosilicon compound having an alkoxy group as described above has good rubber properties.

In order to perform the modification reaction, examples of the process therefor include a process in which the polymerization reaction of the conjugated diene compound is followed by the addition of a modifying agent, and then a polymerization terminator is added thereto, and the solvent and the unreacted monomer remaining in the reaction product are removed by a steam stripping method, a vacuum drying method, or the like; or a process in which a polymerization terminator is added thereto, and then a modifying agent is added thereto; or a process in which the synthesized conjugated diene polymer is washed and dried, and then the dried polymer obtained is dissolved in a solvent again, and then a modifying agent and a catalyst are added thereto. Depending on the type of the polymerization terminator, the activity of the site of the polymer to react with the modifying agent may be reduced; therefore a process in which a modifying agent is added before the termination of the polymerization is preferred.

As the organic solvent used in the modification reaction, any solvent may be used, on the condition that the solvent itself does not react with the conjugated diene polymer. The same solvent as used in the production of the conjugated diene polymer is usually used. Specific examples thereof include aromatic hydrocarbon solvents such as benzene, chlorobenzene, toluene, and xylene; aliphatic hydrocarbon solvents containing 5 to 10 carbon atoms such as n-heptane, n-hexane, n-pentane, and n-octane; and alicyclic hydrocarbon solvents such as cyclohexane, methyl cyclohexane, tetralin, and decalin. In addition, methylene chloride, tetrahydrofuran, or the like may be also used.

The temperature of the reaction solution in the modification reaction (reaction temperature) is preferably within the range of 0 to 100° C., more preferably 10 to 90° C., particularly preferably 30 to 90° C. In the case where the modifying agent is an organosilicon compound having an alkoxy group, the temperature of the reaction solution in the modification reaction may be particularly preferably within the range of 50 to 90° C. When the temperature is too low, the modification reaction proceeds more slowly. When the temperature is too high, the polymer is more apt to gelatinize. In one embodiment, the temperature of the reaction solution in the modification reaction (reaction temperature) may be preferably 50° C. or less, more preferably 40° C. or less, more preferably within the range of 0 to 30° C.

Although no limits are set for the modification reaction time (reaction time), the reaction time is preferably within the range of 1 minute to 5 hours, more preferably 3 minutes to 1 hour. When the modification reaction time is too short, the reaction may not proceed sufficiently. When the modification reaction time is too long, the polymer is more apt to gelatinize.

In the modification reaction, the amount of the conjugated diene polymer in the reaction solution is generally preferably within the range of 2 to 500 g, preferably 5 to 300 g, more preferably 10 to 200 g, per 1 liter of the solvent. In the case where the modifying agent is an organosilicon compound having an alkoxy group, the amount of the conjugated diene polymer in the reaction solution in the modification reaction is generally preferably within the range of 5 to 500 g, preferably 20 to 300 g, more preferably 30 to 200 g, per 1 liter of the solvent.

In the modification reaction, the amount of the modifying agent to be used is generally preferably within the range of 0.01 to 150 mmol, preferably 0.1 to 100 mmol, more preferably 0.2 to 50 mmol, per 100 g of the conjugated diene polymer. When the amount of the modifying agent to be used is too small, the amount of the modified group introduced into the modified conjugated diene polymer is small, and therefore the modification effect may be reduced. When the amount of the modifying agent to be used is too large, the unreacted modifying agent may remain in the modified conjugated diene polymer, and the removal thereof may be troublesome.

In the case where the modifying agent is an organosilicon compound having an alkoxy group, the amount of the modifying agent to be used in the modification reaction is preferably less than 10 equivalents, preferably 7 equivalents or less, more preferably 5 equivalents or less, relative to the metal compound (A) [modifying agent/metal compound (A)]. Meanwhile, the amount of the modifying agent to be used is preferably 0.1 equivalents or more relative to the metal compound (A) [modifying agent/metal compound (A)]. When the amount of the modifying agent to be used is too small, the amount of the modified group introduced into the modified conjugated diene polymer is small, and therefore the modification effect may be reduced. When the amount of the modifying agent to be used is too large, the gelation may be accelerated in the modification process.

After the modification reaction is performed for a predetermined time, the pressure inside the polymerization vessel, or reaction vessel is released, as necessary, and a post-treatment such as washing step and drying step is performed.

The polymerization reaction of the conjugated diene compound in the process for producing a modified conjugated diene polymer of the present invention may be performed in the same way as the polymerization reaction in the process for producing a conjugated diene polymer of the present invention as described above. In the case of the modified conjugated diene polymer, the polymerization temperature is preferably within the range of −30 to 150° C., more preferably 0 to 80° C. In one embodiment, the polymerization temperature is particularly preferably within the range of 0 to 50° C. In the case where a metal compound containing lanthanum (La) or a metal compound containing praseodymium (Pr) is used as the metal compound (A), in particular, the polymerization temperature tends to be preferably 40° C. or less, more preferably within the range of 0 to 30° C.

The polymerization time is preferably within the range of 1 minute to 12 hours, particularly preferably 5 minutes to 5 hours, more preferably 10 minutes to 1 hour.

The degree of modification of the modified conjugated diene polymer of the present invention may be calculated, for example, by a method in which a gel permeation chromatography (GPC) measurement is used. The method will be described in detail with reference to FIG. 1, taking a modified cis-1,4-polybutadiene as an example.

In FIG. 1, the vertical axis represents the value of the ratio (UV/RI) of the value of the peak area obtained from the UV absorbance at 274 nm of the polymer, which is obtained by the GPC measurement (UV) to the value of the peak area obtained from the differential refractive index (RI). The horizontal axis represents the value of $(1/Mn) \times 10^4$, wherein Mn is the number-average molecular weight.

In FIG. 1, the Li—BR (unmodified) is a line obtained by plotting the UV/RI values of the polymers themselves which are obtained by polymerizing 1,3-butadiene by living anionic polymerization with a Li-based catalyst, wherein the polymers have different number-average molecular weights (Mn), and the line may be approximated to a straight line. Meanwhile, the Li—BR (modified) is a line obtained by plotting the UV/RI values of the polymers which are obtained by polymerizing 1,3-butadiene by living anionic polymerization with a Li-based catalyst, and then reacting the polymer terminals with a certain modifying agent to modify the polymer, wherein the polymers have different number-average molecular weights (Mn), and the line may be approximated to a straight line.

In the case of the living anionic polymerization, one molecule of the polymer reacts with one molecule of the modifying agent quantitatively. Accordingly, the difference between the UV/RI value of the Li—BR (modified) and the UV/RI value of the Li—BR (unmodified) at a certain number-average molecular weight (Mn1) is defined as "A". This represents the amount of change in the UV/RI value when one molecule of the modifying agent reacts with one molecular chain having the number-average molecular weight (Mn1). Accordingly, the degree of modification may be calculated based on the value.

The UV/RI values of the modified cis-1,4-polybutadiene of the present invention which has a certain number-average molecular weight (Mn1), and the unmodified cis-1,4-polybutadiene obtained by the same process as the one used for the modification are calculated respectively in the same way as in the case of the Li—BR, and the difference between the values is defined as "B". The degree of modification of the modified cis-1,4-polybutadiene of the present invention may be represented by the formula (1) as described below.

$$\text{Degree of Modification} = B/A \quad (1)$$

The degree of modification of the modified conjugated diene polymer of the present invention may be preferably, but not limited to, 0.1 or more, and be more preferably more than 0.1. When the degree of modification is less than 0.1, the effect may not be achieved sufficiently by the modification. When the degree of modification is within the preferable range, the dispersibility of the filler in the rubber composition may be enhanced by the interaction between the polar functional group (amino group, alkoxy group, or the like) of the modifying agent and the polar functional group of the filler.

(Conjugated Diene Polymer Composition, Modified Conjugated Diene Polymer Composition)

The conjugated diene polymer composition of the present invention is the one comprising one, or two or more types of the conjugated diene polymer of the present invention, and preferably comprises the conjugated diene polymer (α) of the present invention, a diene polymer (β) other than (α), and a rubber reinforcing agent (γ). The process for producing a conjugated diene polymer composition of the present invention is characterized in that the process comprises a step of producing the conjugated diene polymer (α) by polymerizing a conjugated diene compound using the catalyst for a conjugated diene polymerization of the present invention as described above. In other words, the process for producing a conjugated diene polymer composition of the present invention is characterized in that the process comprises a step of producing the conjugated diene polymer (α) by the process for producing a conjugated diene polymer of the present invention as described above.

The modified conjugated diene polymer composition of the present invention is the one comprising one, or two or more types of the modified conjugated diene polymer of the present invention, and preferably comprises the modified conjugated diene polymer (α') of the present invention, a diene polymer (β) other than (α'), and a rubber reinforcing agent (γ). The process for producing a modified conjugated diene polymer composition of the present invention is characterized in that the process comprises a step of producing the modified conjugated diene polymer (α') by polymerizing a conjugated diene compound using the catalyst for a conjugated diene polymerization of the present invention as described above, and then modifying the obtained conjugated diene polymer with a modifying agent. In other words, the process for producing a modified conjugated diene polymer composition of the present invention is characterized in that the process comprises a step of producing the modified conjugated diene polymer (α') by the process for producing a modified conjugated diene polymer of the present invention as described above.

Specifically, the conjugated diene polymer of the present invention, or the modified conjugated diene polymer of the present invention is blended alone, or with another synthetic rubber or natural rubber, and extended with a process oil, if necessary, and then a filler such as carbon black, a vulcanizing agent, a vulcanizing accelerator, and other commonly-used compounding agents are added thereto, and the resulting composition is vulcanized, and thereby the product may be used in the rubber application where mechanical properties, abrasion resistance, and the like are required, including a tire, a hose, a belt, a crawler, and other various industrial products.

In addition, the conjugated diene polymer of the present invention, and the modified conjugated diene polymer of the present invention may also be used as a modifier for a plastic material, for example, an impact-resistant polystyrene, that is, an impact-resistant polystyrene-based resin composition or a rubber-modified impact-resistant polystyrene-based resin composition may be produced.

The mixing ratio of the conjugated diene polymer composition according to the present invention is preferably 100 parts by mass of the rubber components (α)+(β), which consists of 90 to 5 parts by mass of the conjugated diene polymer (α) and 10 to 95 parts by mass of the diene polymer (β) other than (α), and 20 to 120 parts by mass of the rubber reinforcing agent (γ). The mixing ratio of the modified conjugated diene polymer composition according to the present invention is preferably 100 parts by mass of the rubber components (α')+(β), which consists of 90 to 5 parts by mass of the modified conjugated diene polymer (α') and 10 to 95 parts by mass of the diene polymer (β) other than (α'), and 20 to 120 parts by mass of the rubber reinforcing agent (γ).

As for the diene polymer (β) other than (α) comprised in the conjugated diene polymer composition and (α') comprised in the modified conjugated diene polymer composition, a vulcanizable rubber is preferred, and specific examples thereof include natural rubber (NR), ethylene-propylene-diene rubber (EPDM), nitrile rubber (NBR), butyl rubber (IIR), chloroprene rubber (CR), polyisoprene, high-cis polybutadiene rubber, low-cis polybutadiene rubber (BR), styrene-butadiene rubber (SBR), butyl rubber, chlorinated butyl rubber, brominated butyl rubber, and acrylonitrile-butadiene rubber. Among them, NR and SBR are preferred. Additionally, in the case of the SBR, solution-polymerized styrene-butadiene copolymer rubber (S—SBR) is particularly preferred among them, although no limits are set for the SBR. The rubber may be used alone or in combination of two or more types thereof.

Examples of the rubber reinforcing agent (γ) to be used in the present invention include inorganic reinforcing agents such as various carbon blacks, silica, activated calcium carbonate, and ultrafine magnesium silicate. Among them, carbon black and silica are generally preferred. The rubber reinforcing agent may be used alone or in combination of two or more types thereof.

Examples of the silica include silicic acid-based fillers, in addition to silicon dioxide (represented by the formula; $SiO_2$), including anhydrous silicic acid, hydrous silicic acid, and silicate such as calcium silicate and aluminum silicate. In addition, no limits are set for the aggregation state of the silica such as dry silica, precipitated silica, gel silica, and colloidal silica, and the production process such as wet process and dry process. These may be used alone or in combination of two or more types thereof. Preferable examples thereof include wet silica which has excellent abrasion resistance.

In addition, a silane coupling agent may be used as the additive. The silane coupling agent to be used as the additive is an organic silicon compound represented by the general formula; $R^7{}_n SiR^8{}_{4-n}$, wherein $R^7$ is an organic group containing 1 to 20 carbon atoms which has a reactive group selected from the group consisting of vinyl group, acyl group, allyl group, allyloxy group, amino group, epoxy group, mercapto group, chloro group, alkyl group, phenyl group, hydrogen, styryl group, methacryl group, acryl group, ureido group, and the like; $R^8$ is a hydrolyzable group selected from the group consisting of chloro group, alkoxy group, acetoxy group, isopropenoxy group, amino group, and the like; and n represents an integer of 1 to 3. As for the $R^7$ in the silane coupling agent as described above, a group containing vinyl group and/or chloro group is preferred.

The amount of the silane coupling agent as the additive to be added is preferably 0.2 to 20 parts by mass, more preferably 3 to 15 parts by mass, particularly preferably 5 to 15 parts by mass, relative to 100 parts by mass of the filler such as silica. When the amount is less than the range as described above, scorch may be caused thereby. Meanwhile, when the amount is more than the range as described above, deterioration in tensile properties and elongation may be caused thereby.

The conjugated diene polymer composition and the modified conjugated diene polymer composition according to the present invention may be obtained by kneading the components as described above using a banbury, an open roll, a kneader, a twin-screw kneader, or the like, which is commonly used.

The conjugated diene polymer composition and the modified conjugated diene polymer composition according to the present invention may be kneaded with a compounding agent commonly used in the rubber industry, including a vulcanizing agent, a vulcanizing aid, an anti-oxidant, a filler, a process oil, zinc oxide (Chinese white), and stearic acid, as necessary.

As the vulcanizing agent, any known vulcanizing agent, for example, sulfur, an organic peroxide, a resin vulcanizing agent, a metal oxide such as magnesium oxide, or the like may be used. The vulcanizing agent is preferably blended into the composition in an amount of about 0.5 to 3 parts by mass relative to 100 parts by mass of the rubber components $(\alpha)+(\beta)$ or $(\alpha')+(\beta)$.

As the vulcanizing aid, any known vulcanizing aid, for example, aldehyde, ammonia, amine, guanidine, thiourea, thiazole, thiuram, dithiocarbamate, xanthate, or the like may be used.

Examples of the anti-oxidant include amine-ketone-based, imidazole-based, amine-based, phenol-based, sulfur-based, and phosphorus-based anti-oxidants.

Examples of the filler include inorganic fillers such as silica, calcium carbonate, basic magnesium carbonate, clay, Lissajou, and diatomaceous earth, carbon black, and organic fillers such as reclaimed rubber, and powdered rubber.

As the process oil, any of aromatic, naphthenic, and paraffinic oils may be used.

The conjugated diene polymer composition and the modified conjugated diene polymer composition obtained according to the present invention may be used in various rubber applications, including industrial products such as tire, vibration-proof rubber, belt, hose, and seismic isolation rubber, and footgear such as men's shoes, ladies' shoes, and sports shoes. In that case, the conjugated diene polymer of the present invention or the modified conjugated diene polymer of the present invention, including the polybutadiene of the present invention, is preferably blended such that the polymer is comprised in the rubber component(s) in an amount of at least 10 wt % or more. In addition, the rubber-modified impact-resistant polystyrene-based resin composition may be used for known various molded articles, and may be preferably used in the field of the electrical industrial applications, and for packaging materials, housing-related materials, materials for OA equipment (office automation equipment), tools, daily commodities, and the like, because the composition has excellent flame retardance, impact strength, and tensile strength. The composition may be used in extensive application, including a housing for a television set, a personal computer, an air conditioner, or the like, an exterior material for office equipment such as a copying machine and a printer, and a container for food such as frozen food, lactic acid drink, and ice cream, for example, (Rubber Composition for Tire, and Rubber Composition for Rubber Belt)

The conjugated diene polymer composition of the present invention, and the modified conjugated diene polymer composition of the present invention may be preferably used as a rubber composition for a tire, and a rubber composition for a rubber belt by an adjustment of the mixing ratio between the rubber components $(\alpha)+(\beta)$ or $(\alpha')+(\beta)$ and the rubber reinforcing agent $(\gamma)$.

The tire of the present invention is the one obtained using the conjugated diene polymer composition of the present invention, or the modified conjugated diene polymer composition of the present invention. The first process for producing a tire of the present invention is a process for producing a tire comprising the conjugated diene polymer, and is characterized in that the process comprises a step of producing the conjugated diene polymer by polymerizing a conjugated diene compound using the catalyst for a conjugated diene polymerization of the present invention as described above, or a step of producing the conjugated diene polymer by the process for producing a conjugated diene polymer of the present invention as described above. The second process for producing a tire of the present invention is a process for producing a tire comprising the modified conjugated diene polymer, and is characterized in that the process comprises a step of producing the modified conjugated diene polymer by polymerizing a conjugated diene compound using the catalyst for a conjugated diene polymerization of the present invention as described above, and then modifying the obtained conjugated diene polymer with a modifying agent, or a step of producing the modified conjugated diene polymer by the process for producing a modified conjugated diene polymer of the present invention as described above.

The rubber belt of the present invention is the one obtained using the conjugated diene polymer composition of the present invention, or the modified conjugated diene polymer composition of the present invention. The first process for producing a rubber belt of the present invention is a process for producing a rubber belt comprising the conjugated diene polymer, and is characterized in that the process comprises a step of producing the conjugated diene polymer by polymerizing a conjugated diene compound using the catalyst for a conjugated diene polymerization of the present invention as described above, or a step of producing the conjugated diene polymer by the process for producing a conjugated diene polymer of the present invention as described above. The second process for producing a rubber belt of the present invention is a process for producing a rubber belt comprising the modified conjugated diene polymer, and is characterized in that the process comprises a step of producing the modified conjugated diene polymer by polymerizing a conjugated diene compound using the catalyst for a conjugated diene polymerization of the present invention as described above, and then modifying the obtained conjugated diene polymer with a modifying agent, or a step of producing the modified conjugated diene polymer by the process for producing a modified conjugated diene polymer of the present invention as described above.

In the case of the rubber composition for a tire, the rubber composition comprises the rubber components $(\alpha)+(\beta)$ or $(\alpha')+(\beta)$, which consists of the conjugated diene polymer $(\alpha)$ of the present invention or the modified conjugated diene polymer $(\alpha')$ of the present invention and a diene polymer $(\beta)$ other than $(\alpha)$ or $(\alpha')$, and a rubber reinforcing agent $(\gamma)$, and the rubber composition preferably comprises the rubber reinforcing agent $(\gamma)$ in an amount of 30 to 80 parts by mass relative to 100 parts by mass of the rubber components $(\alpha)+(\beta)$ or $(\alpha')+(\beta)$.

In the case of the rubber composition for a rubber belt, the rubber composition comprises the rubber components $(\alpha)+(\beta)$ or $(\alpha')+(\beta)$, which consists of the conjugated diene polymer $(\alpha)$ of the present invention or the modified conjugated diene polymer $(\alpha')$ of the present invention and a diene polymer $(\beta)$ other than $(\alpha)$ or $(\alpha')$, and a rubber reinforcing agent $(\gamma)$, and the rubber composition preferably comprises the rubber reinforcing agent $(\gamma)$ in an amount of 20 to 70 parts by mass relative to 100 parts by mass of the rubber components $(\alpha)+(\beta)$ or $(\alpha')+(\beta)$.

The rubber composition for a tire and the rubber composition for a rubber belt according to the present invention comprise a diene polymer $(\beta)$ other than the conjugated diene polymer $(\alpha)$ or the modified conjugated diene polymer $(\alpha')$, and the diene polymer $(\beta)$ other than the conjugated diene polymer $(\alpha)$ or the modified conjugated diene polymer (α') is preferably blended into the composition in an amount of 10 to 95 parts by mass relative to 90 to 5 parts by mass of the conjugated diene polymer (α) or the modified conjugated diene polymer (α').

The diene polymer (β) to be blended into the rubber composition for a tire and the rubber composition for a rubber belt according to the present invention is preferably at least one or more of natural rubber, styrene-butadiene rubber (SBR), and polyisoprene.

Examples of the rubber reinforcing agent (γ) to be blended into the rubber composition for a tire and the rubber composition for a rubber belt according to the present invention include various carbon blacks, silica, activated calcium carbonate, ultrafine magnesium silicate, talc, and mica. Among them, the rubber reinforcing agent (γ) is preferably at least one or more of carbon black and silica.

In addition, fullerene as described in JP-A-2006-131819 may be used as the rubber reinforcing agent (γ) to be blended into the rubber composition for a tire and the rubber composition for a rubber belt. Examples of the fullerene include C60, C70, a mixture of C60 and C70, and derivatives thereof. Examples of the fullerene derivative include PCBM (Phenyl C61-butyric acid methyl ester), PCBNB (Phenyl C61-butyric acid n-butyl ester), PCBIB (Phenyl C61-butyric acid I-butyl ester), and C70PCBM (Phenyl C71-butyric acid methyl ester). In addition thereto, hydroxylated fullerene, oxidized fullerene, hydrogenated fullerene, and the like may be used.

(Vinyl-Cis Polybutadiene (VCR))

The polybutadiene of the present invention is a polybutadiene (vinyl-cis polybutadiene, VCR) obtained by performing cis-1,4-polymerization of 1,3-butadiene, and then performing syndiotactic-1,2-polymerization in the polymerization system, wherein the polybutadiene is produced using, as the catalyst for the cis-1,4-polymerization, the catalyst for a conjugated diene polymerization of the present invention as described above, that is, a catalyst which comprises a metal compound (A) containing terbium (Tb), lanthanum (La), dysprosium (Dy), praseodymium (Pr), holmium (Ho), erbium (Er), thulium (Tm), or gadolinium (Gd); an ionic compound (B) consisting of a non-coordinating anion and a cation; and an organic metal compound (C) of an element selected from the groups 2, 12 and 13 of the periodic table. The process for producing a polybutadiene of the present invention is a process for producing a polybutadiene, which comprises performing cis-1,4-polymerization of 1,3-butadiene, and then performing syndiotactic-1,2-polymerization in the polymerization system, and is characterized in that the catalyst for a conjugated diene polymerization of the present invention as described above is used as the catalyst for the cis-1,4-polymerization.

According to the present invention, 1,3-butadiene which is a conjugated diene polymer is subjected to cis-1,4-polymerization using the catalyst for a conjugated diene polymerization of the present invention as described above. The cis-1,4-polymerization reaction may be performed in the same way as the polymerization reaction in the process for producing a conjugated diene polymer of the present invention as described above. In the case of the cis-1,4-polymerization reaction, the polymerization temperature is preferably within the range of −30 to 150° C., more preferably 0 to 100° C., particularly preferably 10 to 80° C. In the case where a metal compound containing lanthanum (La) or a metal compound containing praseodymium (Pr) is used as the metal compound (A), in particular, the polymerization temperature tends to be preferably 40° C. or less, more preferably within the range of 0 to 30° C.

The polymerization time is preferably within the range of 1 minute to 12 hours, more preferably 3 minutes to 5 hours, particularly preferably 5 minutes to 1 hour.

The cis-1,4-polymerized component of the vinyl-cis polybutadiene (VCR) obtained according to the present invention preferably has cis-1,4-structure in an amount of 89% or more, more preferably 90% or more, more preferably 91% or more, more preferably 92% or more, although the cis-1,4-structure content is not limited thereto. In one embodiment, the cis-1,4-polymerized component of the VCR more preferably has cis-1,4-structure in an amount of 93% or more, more preferably 94% or more, particularly preferably 95% or more.

According to the present invention, after 1,3-butadiene is subjected to the cis-1,4-polymerization, a catalyst for a syndiotactic-1,2-polymerization is then added to the obtained cis-1,4-polymerization reaction mixture, and syndiotactic-1,2-polymerization is performed in the polymerization system. When the syndiotactic-1,2-polymerization is performed, 1,3-butadiene may be added, or may not be added to the cis-1,4-polymerization reaction mixture obtained as described above.

As for the catalyst for the syndiotactic-1,2-polymerization, a catalyst system comprising a sulfur compound is preferred, and a catalyst system comprising a trialkyl aluminum compound, a sulfur compound, and a cobalt compound or a nickel compound is more preferred.

As for the trialkyl aluminum compound, a compound represented by the formula: $R^6_3Al$ (wherein $R^6$ represents a hydrocarbon group containing 1 to 10 carbon atoms) is preferred. Examples of the trialkyl aluminum compound include triethyl aluminum, trimethyl aluminum, triisobutyl aluminum, trihexyl aluminum, and trioctyl aluminum. Among them, triethyl aluminum is preferred. The trialkyl aluminum compound is the Component (C) in the catalyst for the cis-1,4-polymerization (the catalyst for a conjugated diene polymerization of the present invention), and the Component (C) may be used as it is. When the syndiotactic-1,2-polymerization is performed, a trialkyl aluminum compound may be added, or may not be added thereto.

Examples of the sulfur compound include carbon disulfide, phenyl isothiocyanate, and a xanthic acid compound. Among them, carbon disulfide is preferred.

As the cobalt compound, salts and complexes of cobalt may be preferably used. Preferable examples of the cobalt compound include cobalt salts such as cobalt chloride, cobalt bromide, cobalt nitrate, cobalt 2-ethylhexanoate, cobalt naphthenate, cobalt acetate, and cobalt malonate; bis-acetyl acetonate or tris-acetyl acetonate of cobalt; ethyl acetoacetate cobalt; and triarylphosphine complex, trialkylphosphine complex, organic base complex such as pyridine complex and picoline complex, or ethyl alcohol complex of halogenated cobalt. Among them, cobalt 2-ethylhexanoate is preferred.

Examples of the nickel compound include nickel naphthenate, nickel 2-ethylhexanoate, and nickel stearate.

The amount of the trialkyl aluminum compound to be used is preferably 0.1 mmol or more, more preferably 0.3 to 50 mmol, particularly preferably 0.5 to 50 mmol, per 1 mol of 1,3-butadiene. The amount of the cobalt compound or the nickel compound to be used is preferably 0.001 mmol or more, more preferably 0.001 to 0.3 mmol, particularly preferably 0.003 to 0.03 mmol, per 1 mol of 1,3-butadiene. The concentration of the sulfur compound is preferably 20 mmol/L or less, particularly preferably 0.01 to 10 mmol/L.

In addition, water may be added, or may not be added in the syndiotactic-1,2-polymerization. When water is added, the addition amount thereof is preferably 1.1 mmol or less, preferably 1 mmol or less, relative to 1 mmol of the trialkyl aluminum compound.

The temperature at which the 1,3-butadiene is subjected to syndiotactic-1,2-polymerization is preferably within the range of 0 to 100° C., more preferably 10 to 100° C., more preferably 20 to 100° C.

When 1,3-butadiene is added to the polymerization system on the occasion of the syndiotactic-1,2-polymerization in an amount of 1 to 50 parts by mass, preferably 1 to 20 parts by mass, relative to 100 parts by mass of the cis-polymerization solution (cis-1,4-polymerization reaction mixture), the yield of SPB (1,2-polybutadiene) may be increased during the syndiotactic-1,2-polymerization. As described above, however, 1,3-butadiene may be added, or may not be added to the cis-1,4-polymerization reaction mixture.

The polymerization time (average residence time) for which the syndiotactic-1,2-polymerization is performed is preferably within the range of 1 minute to 2 hours, more preferably 2 minutes to 2 hours, more preferably 5 minutes to 1 hour, particularly preferably 10 minutes to 1 hour.

The polymerization is performed by stirring and mixing the polymerization solution in a polymerization vessel (polymerization reactor). As for the polymerization vessel, the polymerization is performed in one vessel, or two or more vessels connected to each other. As for the polymerization vessel used in the syndiotactic-1,2-polymerization, a polymerization vessel equipped with a device for stirring a high-viscosity liquid, for example, the apparatus described in JP-B-S40-2645 may be used because the polymerization solution becomes more highly viscous and the polymer is apt to adhere to the vessel during the syndiotactic-1,2-polymerization.

After a predetermined degree of polymerization is reached in the polymerization reaction, a known anti-oxidant may be added according to the usual method. Examples of the anti-oxidant include phenol-based anti-oxidants, phosphorus-based anti-oxidants, and sulfur-based anti-oxidants. The anti-oxidant may be used alone or in combination of two or more types thereof. The amount of the anti-oxidant to be added is 0.001 to 5 parts by mass relative to 100 parts by mass of the VCR, for example.

Subsequently, a polymerization terminator is added to the polymerization system, to terminate the polymerization reaction. The process therefor is a known process itself, including a process in which the polymerization solution is fed into a polymerization termination vessel after the completion of the polymerization reaction, and then a polar solvent, including alcohol such as methanol and ethanol, and water, is poured into the polymerization solution in a large amount; and a process in which an inorganic acid such as hydrochloric acid and sulfuric acid, an organic acid such as acetic acid and benzoic acid, or a hydrogen chloride gas is introduced into the polymerization solution. Subsequently, the produced VCR is separated from the solution, and washed and dried according to the usual method.

The VCR thus obtained consists of 3 to 30 wt % of (I) the boiling-n-hexane-insoluble portion (H.I.) and 97 to 70 wt % of (II) the boiling-n-hexane-soluble portion, for example. The boiling-n-hexane-soluble portion (II) is a cis-1,4-polybutadiene preferably having 90% or more thereof in the micro-structure. The boiling-n-hexane-insoluble portion (H.I.) (I) is a SPB (syndiotactic-1,2-polybutadiene) having a melting point of 180 to 215° C.

The Mooney viscosity (ML) at 100° C. of the VCR obtained according to the present invention is preferably 20 to 200, more preferably 25 to 100, particularly preferably 30 to 70.

In addition, the SPB dispersed in the VCR is homogeneously dispersed in the cis-1,4-polybutadiene matrix in the form of a fine crystal.

(Polybutadiene Composition (VCR Composition))

The polybutadiene composition (VCR composition) of the present invention is the one comprising one, or two or more types of the polybutadiene (vinyl-cis polybutadiene, VCR) of the present invention, and preferably comprises the polybutadiene ($\alpha''$) of the present invention, a diene polymer ($\beta$) other than ($\alpha''$), and a rubber reinforcing agent ($\gamma$). The process for producing a polybutadiene composition (VCR composition) of the present invention is characterized in that the process comprises a step of producing the polybutadiene ($\alpha''$) by performing cis-1,4-polymerization of 1,3-butadiene using the catalyst for a conjugated diene polymerization of the present invention as described above, and then performing syndiotactic-1,2-polymerization in the polymerization system.

Specifically, the VCR of the present invention is blended alone, or with another synthetic rubber or natural rubber, and extended with a process oil, if necessary, and then a filler such as carbon black and silica, a vulcanizing agent, a vulcanizing accelerator, and other commonly-used compounding agents are added thereto, and the resulting composition is vulcanized, and thereby the product may be used in the rubber application where mechanical properties and abrasion resistance are required, including a tread, a sidewall, a stiffener, a bead filler, an inner liner, a carcass, and the like, as well as a hose, a belt, and other various industrial products. In addition, the VCR may also be used as a modifier for plastics.

The mixing ratio of the polybutadiene rubber composition according to the present invention is preferably 100 parts by mass of the rubber components ($\alpha''$)+($\beta$), which consists of 5 to 80 parts by mass of the VCR ($\alpha''$) and 95 to 20 parts by mass of the diene polymer ($\beta$) other than ($\alpha''$), and 20 to 120 parts by mass of the rubber reinforcing agent ($\gamma$).

The mixing ratio is more preferably 100 parts by mass of the rubber components ($\alpha''$)+($\beta$), which consists of 20 to 80 parts by mass of the VCR ($\alpha''$) and 80 to 20 parts by mass of the diene polymer ($\beta$) other than ($\alpha''$), and 30 to 100 parts by mass of the rubber reinforcing agent ($\gamma$).

As for the diene polymer ($\beta$) other than ($\alpha''$) comprised in the polybutadiene rubber composition, a vulcanizable rubber is preferred, and specific examples thereof include natural rubber (NR), ethylene-propylene-diene rubber (EPDM), nitrile rubber (NBR), butyl rubber (IIR), chloroprene rubber (CR), polyisoprene, high-cis polybutadiene rubber, polybutadiene rubber (BR), styrene-butadiene rubber (SBR), butyl rubber, chlorinated butyl rubber, brominated butyl rubber, and acrylonitrile-butadiene rubber. Among them, NR and SBR are preferred. The rubber may be used alone or in combination of two or more types thereof.

Examples of the rubber reinforcing agent ($\gamma$) in the polybutadiene rubber composition of the present invention include inorganic fillers such as silica, calcium carbonate, basic magnesium carbonate, clay, Lissajou, and diatomaceous earth, carbon black, and organic fillers such as reclaimed rubber, and powdered rubber, and carbon black and silica are preferred. The filler (rubber reinforcing agent) may be used alone or in combination of two or more types thereof.

Examples of the silica include silicic acid-based fillers, in addition to silicon dioxide (represented by the formula: $SiO_2$), including anhydrous silicic acid, hydrous silicic acid, and silicate such as calcium silicate and aluminum silicate. In addition, no limits are set for the aggregation state of the silica such as dry silica, precipitated silica, gel silica, and colloidal silica, and the production process such as wet process and dry process. These may be used alone or in combination of two or more types thereof. Preferable examples thereof include wet silica which has excellent abrasion resistance.

In addition, a silane coupling agent may be used as the additive. Examples of the silane coupling agent to be used as the additive include those listed in the conjugated diene polymer composition and the modified conjugated diene polymer composition of the present invention. The amount of the silane coupling agent to be added is generally preferably within the same range as in the conjugated diene polymer composition and the modified conjugated diene polymer composition of the present invention.

As the vulcanizing agent, any known vulcanizing agent, for example, sulfur, an organic peroxide, a resin vulcanizing agent, a metal oxide such as magnesium oxide, or the like may be used. As the vulcanizing aid, any known vulcanizing aid, for example, aldehyde, ammonia, amine, guanidine, thiourea, thiazole, thiuram, dithiocarbamate, xanthate, or the like may be used. As the process oil, any of aromatic, naphthenic, and paraffinic oils may be used.

The polybutadiene rubber composition of the present invention may be obtained by kneading the components according to a commonly-used method using a banbury mixer, an open roll, a kneader, a twin-screw kneader, or the like.

In addition to the filler, the vulcanizing agent, the vulcanizing aid, and the process oil, an anti-oxidant, zinc oxide (Chinese white), stearic acid, and the like, which are commonly used in the rubber industry, may be used as the compounding agent. Examples of the anti-oxidant include amine-ketone-based, imidazole-based, amine-based, phenol-based, sulfur-based, and phosphorus-based anti-oxidants.

EXAMPLES

The Examples according to the present invention will be specifically described below. The polymerization conditions and the polymerization results, or the polymerization conditions, the modification conditions and the polymerization results are summarized in the Tables. The methods for measuring the properties, and the like are as follows.

Catalytic activity: The yield of the polymer (g or kg) per 1 mmol of the central metal of the catalyst used in the polymerization reaction and per 1 hour of the polymerization time is taken as the catalytic activity. For example, when the catalyst is a terbium compound, the catalytic activity is the yield of the polymer (g or kg) per 1 mmol of the terbium metal of the terbium compound used in the polymerization reaction and per 1 hour of the polymerization time.

(Evaluation of Polybutadiene and Modified Polybutadiene)

Micro-structure: The micro-structure was determined by an infrared absorption spectrum analysis. The micro-structure was calculated from the absorption intensity ratio of cis 734 $cm^{-1}$, trans 967 $cm^{-1}$, and vinyl 910 $cm^{-1}$.

Number-average molecular weight (Mn) and Weight-average molecular weight (Mw): The measurement was carried out by GPC (made by Shimadzu Corporation) at a temperature of 40° C. using polystyrene as the standard substance and tetrahydrofuran as the solvent, and the number-average molecular weight and the weight-average molecular weight were calculated using the calibration curve from the obtained molecular-weight distribution curve and thereby determined.

Molecular-weight distribution: The molecular-weight distribution was evaluated by Mw/Mn, which was the ratio of the weight-average molecular weight (Mw) to the number-average molecular weight (Mn) determined from GPC using polystyrene as the standard substance.

Gelation: The presence or absence of gelation is defined by the ratio (C) of the areas of the differential refractive indexes (RI) of the gel permeation chromatography (GPC) between the modified polymer and the unmodified polymer as described below, and when the C is less than 0.9, the polymer is defined as the presence of gelation therein. The polymer solution is filtered through a membrane filter (GL Chromatodisc 25N made by GL Sciences Inc., pore size: 0.45 μm) before the GPC measurement, and the elution area of RI decreases when a gel is present.

$C=B/A$

A: area of RI of GPC of the unmodified polymer
B: area of RI of GPC of the modified polymer
C: ratio of area of RI of GPC (Evaluation of Composition)

Processability: The Mooney viscosity ($ML_{1+4}$, 100° C.) of the composition was measured in accordance with JIS-K6300-1 using a Mooney viscometer made by Shimadzu Corporation, wherein the viscosity was measured for 4 minutes after the composition was preheated at 100° C. for 1 minute. In each Table, the values are expressed as index numbers on the assumption that the value of each Comparative Example described therein is 100. The processability is better as the Mooney viscosity is lower. The index numbers in the Tables are expressed such that the value is greater as the processability is better.

Tensile stress (300%): The 300% tensile stress was measured in accordance with JIS-K6251. In each Table, the values are expressed as index numbers on the assumption that the value of each Comparative Example described therein is 100. The tensile stress is better as the index number is greater.

Tensile stress (100%): The 100% tensile stress was measured in accordance with JIS-K6251. In each Table, the values are expressed as index numbers on the assumption that the value of each Comparative Example described therein is 100. The tensile stress is better as the index number is greater.

Tensile stress (50%): The 50% tensile stress was measured in accordance with JIS-K6251. In each Table, the values are expressed as index numbers on the assumption that the value of each Comparative Example described therein is 100. The tensile stress is better as the index number is greater.

Tensile strength at break: The stress at break was measured in accordance with JIS-K6251. In each Table, the values are expressed as index numbers on the assumption that the value of each Comparative Example described therein is 100. The tensile strength at break is better as the index number is greater.

Elongation at break: The elongation at break was measured in accordance with JIS-K6251. In each Table, the values are expressed as index numbers on the assumption that the value of each Comparative Example described therein is 100. The elongation at break is better as the index number is greater.

Abrasion resistance (Lambourn abrasion): The Lambourn abrasion was measured in accordance with the measurement method specified in JIS-K6264 at a slip ratio of 40% or 20%. In each Table, the values are expressed as index numbers on the assumption that the value of each Comparative Example described therein is 100. The abrasion resistance is better as the index number is greater.

Rebound resilience: The rebound resilience was measured in accordance with JIS-K6255 at room temperature using a Dunlop tripsometer. In each Table, the values are expressed as index numbers on the assumption that the value of each Comparative Example described therein is 100. The rebound resilience is better as the index number is greater.

Low heat build-up/Permanent set: The heat value rising for 25 minutes and the permanent set were measured in accordance with JIS-K6265 with a flexometer at a measurement temperature of 100° C. In each Table, the values are expressed as index numbers on the assumption that the value of each Comparative Example described therein is 100. The low heat build-up (heat value) and the permanent set are better as the values are smaller. The index numbers in the Tables are expressed such that the value is greater as the low heat build-up and the permanent set are better.

Silica or filler dispersibility: With respect to the dispersibility of the silica or filler in the composition according to the dependence of the storage elastic modulus (G') on the strain (Payne effect), the dynamic strain analysis was carried out using a rubber process analyzer RPA-2000 made by Alpha Technologies at 120° C. and at a frequency of 1 Hz. The values of the ratios (G'25%/G'0.5%) of the G' at a strain of 25% to the G' at a strain of 0.5% as the Payne effect are expressed as index numbers in each Table on the assumption that the value of each Comparative Example described therein is 100. The dispersibility of the reinforcing agent is better as the index number is greater.

Low fuel consumption (tan δ (60° C.)): The measurement was carried out using a viscoelasticity measuring apparatus (EPLEXOR 100N made by GABO) at a frequency of 16 Hz and at a dynamic strain of 0.3% over a temperature range of −120° C. to 100° C., and the tan δ at 60° C. was used as the index of the low fuel consumption. In each Table, the values are expressed as index numbers on the assumption that the value of each Comparative Example described therein is 100. The low fuel consumption (tan δ) is better as the value is smaller. The index numbers in the Tables are expressed such that the value is greater as the low fuel consumption is better.

Low fuel consumption (tan δ (50° C.)): The measurement was carried out using a viscoelasticity measuring apparatus (EPLEXOR 100N made by GABO) at a frequency of 16 Hz and at a dynamic strain of 0.3% over a temperature range of −120° C. to 100° C., and the tan δ at 50° C. was used as the index of the low fuel consumption. In each Table, the values are expressed as index numbers on the assumption that the value of each Comparative Example described therein is 100. The low fuel consumption (tan δ) is better as the value is smaller. The index numbers in the Tables are expressed such that the value is greater as the low fuel consumption is better.

Low fuel consumption (tan δ (30° C.)): The measurement was carried out using a viscoelasticity measuring apparatus (EPLEXOR 100N made by GABO) at a frequency of 16 Hz and at a dynamic strain of 0.3% over a temperature range of −120° C. to 100° C., and the tan δ at 30° C. was used as the index of the low fuel consumption. In each Table, the values are expressed as index numbers on the assumption that the value of each Comparative Example described therein is 100. The low fuel consumption (tan δ) is better as the value is smaller. The index numbers in the Tables are expressed such that the value is greater as the low fuel consumption is better.

Wet grip performance (tan δ (0° C.)): The measurement was carried out using a viscoelasticity measuring apparatus (EPLEXOR 100N made by GABO) at a frequency of 16 Hz and at a dynamic strain of 0.3% over a temperature range of −120° C. to 100° C., and the tan δ at 0° C. was used as the index of the wet grip performance. In each Table, the values are expressed as index numbers on the assumption that the value of each Comparative Example described therein is 100. The wet grip performance is better as the index number is greater.

Low-temperature properties (−30° C. storage elastic modulus (E')): The measurement was carried out using a viscoelasticity measuring apparatus (EPLEXOR 100N made by GABO) at a frequency of 16 Hz and at a dynamic strain of 0.3% over a temperature range of −120° C. to 100° C., and the storage elastic modulus (E') at −30° C. was used. In each Table, the values are expressed as index numbers on the assumption that the value of each Comparative Example described therein is 100. (The elastic modulus at −30° C. is lower and better as the index number is greater.)

Swell: The ratio of the diameter of the composition to the die orifice diameter (wherein L/D=1.5 mm/1.5 mm) was determined during the extrusion at 100° C. and at a shear rate of 100 sec$^{-1}$, using a processability tester (MPT made by Monsanto), as a criterion for the extrusion processability of the composition. The dimensional stability during the extrusion processing is better as the value is smaller. In each Table, the values are expressed as index numbers on the assumption that the value of each Comparative Example described therein is 100, and the index numbers are expressed such that the value is greater as the dimensional stability during the extrusion processing is better.

(Evaluation of VCR)

Mooney viscosity ($ML_{1+4}$, 100° C.): The Mooney viscosity ($ML_{1+4}$, 100° C.) of the rubber was measured in accordance with JIS-K6300-1 using a Mooney viscometer made by Shimadzu Corporation, wherein the viscosity was measured for 4 minutes after the rubber was preheated at 100° C. for 1 minute, and the measured value was shown therein.

Boiling-n-hexane-insoluble portion (H.I.): The H.I. content was determined from the amount of heat of melting which was measured with a differential scanning calorimeter (DSC-50 made by Shimadzu Corporation), and the calibration curve of the H.I. which was obtained by the actual H.I. measurement method. The actual measured H.I. was the amount of the extraction residue after 2 g of vinyl-cis polybutadiene rubber was boiled and extracted with 200 mL of n-hexane for 4 hours by means of a Soxhlet extractor, which was expressed in terms of "parts by mass".

Melting point (Tm) of SPB portion in polymer: The value in the case where the amount of the sample was about 10 mg and the temperature-increasing rate was 10° C./min was determined from the peak-top temperatures of the endothermic peak during temperature-increasing and the exothermic peak during temperature-decreasing each by a differential scanning calorimeter (DSC-50 made by Shimadzu Corporation).

(Evaluation of VCR Composition)

Fatigue resistance: The fatigue resistance of the vulcanizate was evaluated using a constant elongation fatigue tester (made by Ueshima Seisakusho Co., Ltd.). A 0.5 mm scratch was made at the center of the vulcanizate test piece which was punched out into the dumbbell shape No. 3 (JIS- K6251), and the number of elongation at which the test piece was broken was determined at an initial strain of 50% and at a rate of 300 times/min.

Abrasion resistance: The abrasion resistance of the vulcanizate was evaluated in accordance with the Lambourn abrasion test (JIS-K6264). The slip ratio was set at 20%.

Example A1-1

The interior of a 1.5 L autoclave was purged with nitrogen, and a solution of 250 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of tris(2,2,6,6-tetramethyl-3,5-heptanedionato) terbium (Tb(dpm)$_3$) in cyclohexane (0.01 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A1-1.

Example A1-2

Polybutadiene was synthesized in the same way as in Example A1-1, except that the amount of the solution of triethyl aluminum (TEAL) in cyclohexane (2 mol/L) added was changed to 1.5 ml. The polymerization results are shown in Table A1-1.

Example A1-3

Polybutadiene was synthesized in the same way as in Example A1-1, except that the amount of the solution of triethyl aluminum (TEAL) in cyclohexane (2 mol/L) added was changed to 2.0 ml. The polymerization results are shown in Table A1-1.

Example A1-4

Polybutadiene was synthesized in the same way as in Example A1-1, except that the amount of the solution of triethyl aluminum (TEAL) in cyclohexane (2 mol/L) added was changed to 1.5 ml, and the polymerization temperature was changed to 70° C. and the polymerization was performed at 70° C. for 25 minutes. The polymerization results are shown in Table A1-1.

Example A1-5

Polybutadiene was synthesized in the same way as in Example A1-1, except that the amount of the solution of triethyl aluminum (TEAL) in cyclohexane (2 mol/L) added was changed to 1.5 ml, and the polymerization temperature was changed to 60° C. and the polymerization was performed at 60° C. for 25 minutes. The polymerization results are shown in Table A1-1.

Example A1-6

Polybutadiene was synthesized in the same way as in Example A1-1, except that the amount of the solution of triethyl aluminum (TEAL) in cyclohexane (2 mol/L) added was changed to 1.5 ml, and the amount of the solution of triphenylcarbenium tetrakis(pentafluorophenyl)borate in toluene (0.004 mol/L) added was changed to 1.5 ml. The polymerization results are shown in Table A1-1.

Example A1-7

The interior of a 1.5 L autoclave was purged with nitrogen, and a solution of 500 ml of cyclohexane solvent and 500 ml of butadiene was placed in the autoclave. And then, 3.1 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) terbium (Tb(dpm)$_3$) in cyclohexane (0.01 mol/L) was added thereto, and then 2.0 ml of a solution of trip henylcarbenium tetrakis(pentafluorophenyl)borate in toluene (0.004 mol/L) was added thereto. The polymerization was performed at 50° C. for 25 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A1-1.

Example A1-8

Polybutadiene was synthesized in the same way as in Example A1-7, except that the amount of the solution of triethyl aluminum (TEAL) in cyclohexane (2 mol/L) added was changed to 3.2 ml, and the polymerization time was changed to 20 minutes and the polymerization was performed at 50° C. for 20 minutes. The polymerization results are shown in Table A1-1.

Example A1-9

Polybutadiene was synthesized in the same way as in Example A1-7, except that the amount of the solution of triethyl aluminum (TEAL) in cyclohexane (2 mol/L) added was changed to 3.3 ml. The polymerization results are shown in Table A1-1.

Example A1-10

The interior of a 1.5 L autoclave was purged with nitrogen, and a solution of 295 ml of cyclohexane solvent and 300 ml of butadiene was placed in the autoclave. And then, 1.8 ml of a solution of triethyl aluminum (TEAL) in cyclohexane (2 mol/L) was added thereto. Subsequently, 0.24 ml of a solution of tris(2,2,6,6-tetramethyl-3,5-heptanedionato) terbium (Tb(dpm)$_3$) in cyclohexane (0.01 mol/L) was added thereto, and then 1.2 ml of a solution of triphenylcarbenium tetrakis(pentafluorophenyl)borate in toluene (0.004 mol/L) was added thereto. The polymerization was performed at 50° C. for 20 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A1-1.

Comparative Example A1-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of neodymium versatate (Nd(Ver)$_3$) in cyclohexane (0.01 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A1-1.

Comparative Example A1-2

Polybutadiene was synthesized in the same way as in Comparative Example A1-1, except that 0.4 ml of a solution of tris(2,2,6,6-tetramethyl-3,5-heptanedionato)neodymium (Nd(dpm)$_3$) in cyclohexane (0.005 mol/L) was added thereto, instead of 0.2 ml of the solution of neodymium versatate (Nd(Ver)$_3$) in cyclohexane (0.01 mol/L). The polymerization results are shown in Table A1-1.

the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A1-3.

Comparative Example A1-3

A compounded rubber was produced, molded and press-vulcanized, and the properties of the resulting vulcanizate were determined in the same way as in Example A1-11, except that UBEPOL BR150L made by Ube Industries, Ltd. (conjugated diene polymer polymerized using a Co-based catalyst) was used, instead of the polybutadiene synthesized according to Example A1-9. The results of the determination of various properties of the composition are shown in Table A1-3.

The compounding formulations are shown in Table A1-2. The numerical values in Table A1-2 are expressed in terms of "parts by mass".

TABLE A1-1

| | Catalyst | Yield (g/L) | Catalytic activity (g/mmol-Cat/hr) | Cis (%) | Trans (%) | Vinyl (%) | Mn/10$^4$ | Mw/10$^4$ | Mw/Mn |
|---|---|---|---|---|---|---|---|---|---|
| Example A1-1 | Tb(dpm)$_3$ | 68.8 | 41448 | 96.3 | 2.8 | 0.9 | 26.1 | 80.3 | 3.07 |
| Example A1-2 | Tb(dpm)$_3$ | 62.7 | 37824 | 95.4 | 3.6 | 1.0 | 18.5 | 53.0 | 2.87 |
| Example A1-3 | Tb(dpm)$_3$ | 57.9 | 34944 | 94.6 | 4.4 | 1.0 | 14.3 | 36.7 | 2.57 |
| Example A1-4 | Tb(dpm)$_3$ | 55.4 | 33408 | 93.6 | 5.0 | 1.4 | 14.0 | 44.9 | 3.22 |
| Example A1-5 | Tb(dpm)$_3$ | 58.9 | 35520 | 94.8 | 4.1 | 1.2 | 15.9 | 48.7 | 3.06 |
| Example A1-6 | Tb(dpm)$_3$ | 45.1 | 27240 | 95.7 | 3.2 | 1.0 | 16.4 | 41.3 | 2.51 |
| Example A1-7 | Tb(dpm)$_3$ | 80.9 | 48834 | 95.9 | 3.2 | 0.9 | 20.9 | 68.1 | 3.26 |
| Example A1-8 | Tb(dpm)$_3$ | 50.7 | 38250 | 95.6 | 3.5 | 1.0 | 17.2 | 45.0 | 2.62 |
| Example A1-9 | Tb(dpm)$_3$ | 66.0 | 39840 | 95.4 | 3.7 | 1.0 | 19.1 | 58.3 | 3.06 |
| Example A1-10 | Tb(dpm)$_3$ | 58.3 | 43613 | 95.6 | 3.5 | 1.0 | 18.0 | 48.8 | 2.71 |
| Comparative Example A1-1 | Nd(Ver)$_3$ | 17.6 | 10488 | 86.7 | 12.0 | 1.3 | 12.6 | 35.9 | 2.85 |
| Comparative Example A1-2 | Nd(dpm)$_3$ | 30.5 | 18204 | 90.8 | 8.1 | 1.1 | 15.6 | 60.6 | 3.89 |

As can be seen from Table A1-1, in Example A1-1 in which butadiene was polymerized under the most similar conditions to Comparative Example A1-1, the catalytic activity is about 4 times as high as that of Comparative Example A1-1, which is very high, and the obtained polymer has a higher content of cis-1,4-structure.

As described above, a conjugated diene polymer having a high content of cis-1,4-structure may be produced with high activity when the catalyst for a conjugated diene polymerization of the present invention, which comprises a terbium compound, is used.

Example A1-11

A compounded rubber was produced in accordance with the compounding formulation shown in Table A1-2, using the polybutadiene synthesized according to Example A1-9, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing

TABLE A1-2

| | Example A1-11 | Comparative Example A1-3 |
|---|---|---|
| Example A1-9 | 50 | |
| 150L | | 50 |
| natural rubber | 50 | 50 |
| carbon black | 50 | 50 |
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A1-3.

TABLE A1-3

| | Example A1-11 | Comparative Example A1-3 |
|---|---|---|
| Processability | 104 | 100 |
| Tensile stress (300%) | 102 | 100 |

TABLE A1-3-continued

|  | Example A1-11 | Comparative Example A1-3 |
|---|---|---|
| Rebound resilience | 100 | 100 |
| Low heat build-up | 116 | 100 |
| Permanent set | 119 | 100 |
| Low-temperature storage elastic modulus E' (−30° C.) | 209 | 100 |
| tan δ (60° C.) | 106 | 100 |

The numerical values in Table A1-3 are expressed as an index number with respect to each item, on the condition that each value of property of Comparative Example A1-3, in which UBEPOL BR150L made by Ube Industries, Ltd. (conjugated diene polymer polymerized using a Co-based catalyst) was used, is taken as the standard (100). The property is better as the numerical value is greater.

As shown in Table A1-3, the composition of Example A1-11 which comprises the polybutadiene obtained in Example A1-9 has better processability, mechanical strength, low heat build-up, permanent set, low-temperature properties (low-temperature storage elastic modulus), and low fuel consumption (tan δ (60° C.)) than the composition of Comparative Example A1-3 which comprises UBEPOL BR150L.

Example A1-12

A compounded rubber was produced in accordance with the compounding formulation shown in Table A1-4, using the polybutadiene synthesized according to Example A1-10, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A1-5.

Comparative Example A1-4

A compounded rubber was produced, molded and press-vulcanized, and the properties of the resulting vulcanizate were determined in the same way as in Example A1-12, except that UBEPOL BR150L made by Ube Industries, Ltd. (conjugated diene polymer polymerized using a Co-based catalyst) was used, instead of the polybutadiene synthesized according to Example A1-10. The results of the determination of various properties of the composition are shown in Table A1-5.

The compounding formulations are shown in Table A1-4. The numerical values in Table A1-4 are expressed in terms of "parts by mass".

TABLE A1-4

|  | Example A1-12 | Comparative Example A1-4 |
|---|---|---|
| Example A1-10 | 30 |  |
| BR150L |  | 30 |
| SBR | 70 | 70 |
| silica | 65 | 65 |
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A1-5.

TABLE A1-5

|  | Example A-12 | Comparative Example A1-4 |
|---|---|---|
| Tensile stress (300%) | 103 | 100 |
| Rebound resilience | 101 | 100 |
| Silica dispersibility | 113 | 100 |
| Low-temperature storage elastic modulus E' (−30° C.) | 122 | 100 |
| tan δ (0° C.) | 104 | 100 |

The numerical values in Table A1-5 are expressed as an index number with respect to each item, on the condition that each value of property of Comparative Example A1-4, in which UBEPOL BR150L made by Ube Industries, Ltd. (conjugated diene polymer polymerized using a Co-based catalyst) was used, is taken as the standard (100). The property is better as the numerical value is greater.

As shown in Table A1-5, the composition of Example A1-12 which comprises the polybutadiene obtained in Example A1-10 has better mechanical strength, rebound resilience, silica dispersibility, low-temperature properties (low-temperature storage elastic modulus), and wet grip performance (tan δ (0° C.)) than the composition of Comparative Example A1-4 which comprises UBEPOL BR150L.

Example A2-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of tris(2,2,6,6-tetramethyl-3,5-heptanedionato) lanthanum (La(dpm)$_3$) in toluene (0.01 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A2-1.

Example A2-2

Polybutadiene was synthesized in the same way as in Example A2-1, except that the amount of the solution of triethyl aluminum (TEAL) in cyclohexane (2 mol/L) added was changed to 1.3 ml, and the amount of the solution of tris(2,2,6,6-tetramethyl-3,5-heptanedionato)lanthanum (La(dpm)$_3$) in toluene (0.01 mol/L) added was changed to 0.5 ml, and the amount of the solution of triphenylcarbenium tetrakis(pentafluorophenyl)borate in toluene (0.004 mol/L) added was changed to 2.5 ml. The polymerization results are shown in Table A2-1.

Example A2-3

The interior of a 1.5 L autoclave was purged with nitrogen, and a solution of 495 ml of cyclohexane solvent and 500 ml of butadiene was placed in the autoclave. And then, 2.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato)lanthanum (La(dpm)$_3$) in toluene (0.01 mol/L) was added thereto, and then 5.0 ml of a solution of trip henylcarbenium tetrakis(pentafluorophenyl)borate in toluene (0.004 mol/L) was added thereto. The polymerization was performed at 50° C. for 40 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A2-1.

Example A2-4

Polybutadiene was synthesized in the same way as in Example A2-3, except that the amount of the solution of triethyl aluminum (TEAL) in cyclohexane (2 mol/L) added was changed to 2.1 ml. The polymerization results are shown in Table A2-1.

Example A2-5

The interior of a 1.5 L autoclave was purged with nitrogen, and a solution of 395 ml of cyclohexane solvent and 400 ml of butadiene was placed in the autoclave. And then, 1.6 ml of a solution of triethyl aluminum (TEAL) in cyclohexane (2 mol/L) was added thereto. Subsequently, 0.8 ml of a solution of tris(2,2,6,6-tetramethyl-3,5-heptanedionato)lanthanum (La(dpm)$_3$) in toluene (0.01 mol/L) was added thereto, and then 4.0 ml of a solution of trip henylcarbenium tetrakis(pentafluorophenyl)borate in toluene (0.004 mol/L) was added thereto. The polymerization was performed at 50° C. for 30 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A2-1.

Example A2-6

Polybutadiene was synthesized in the same way as in Example A2-5, except that the amount of the solution of triethyl aluminum (TEAL) in cyclohexane (2 mol/L) added was changed to 1.5 ml, and the polymerization time was changed to 20 minutes and the polymerization was performed at 50° C. for 20 minutes. The polymerization results are shown in Table A2-1.

TABLE A2-1

| | Catalyst | Yield (g/L) | Catalytic activity (g/mmol-Cat/hr) | Cis (%) | Trans (%) | Vinyl (%) | Mn/10$^4$ | Mw/10$^4$ | Mw/Mn |
|---|---|---|---|---|---|---|---|---|---|
| Example A2-1 | La(dpm)$_3$ | 27.0 | 16080 | 96.1 | 3.0 | 0.8 | 15.9 | 40.8 | 2.56 |
| Example A2-2 | La(dpm)$_3$ | 42.7 | 10229 | 94.9 | 4.3 | 0.8 | 16.0 | 36.3 | 2.27 |
| Example A2-3 | La(dpm)$_3$ | 59.4 | 8942 | 94.4 | 4.9 | 0.8 | 21.9 | 54.1 | 2.47 |
| Example A2-4 | La(dpm)$_3$ | 64.0 | 9626 | 94.9 | 4.3 | 0.8 | 23.0 | 57.2 | 2.49 |
| Example A2-5 | La(dpm)$_3$ | 52.3 | 10485 | 95.8 | 3.4 | 0.8 | 22.9 | 55.9 | 2.45 |
| Example A2-6 | La(dpm)$_3$ | 38.7 | 11644 | 96.2 | 3.0 | 0.7 | 21.9 | 51.0 | 2.34 |
| Comparative Example A1-1 | Nd(Ver)$_3$ | 17.6 | 10488 | 86.7 | 12.0 | 1.3 | 12.6 | 35.9 | 2.85 |

The polymerization results of Comparative Example A1-1 are also shown in Table A2-1. As can be seen from Table A2-1, in Example A2-1 in which butadiene was polymerized under the most similar conditions to Comparative Example A1-1, the catalytic activity is higher than that of Comparative Example A1-1, and the obtained polymer has a higher content of cis-1,4-structure.

As described above, a conjugated diene polymer having a high content of cis-1,4-structure may be produced with high activity when the catalyst for a conjugated diene polymerization of the present invention, which comprises a lanthanum compound, is used.

Example A2-7

A compounded rubber was produced in accordance with the compounding formulation shown in Table A2-2, using the polybutadiene synthesized according to Example A2-3, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A2-3.

Comparative Example A2-2

A compounded rubber was produced, molded and press-vulcanized, and the properties of the resulting vulcanizate were determined in the same way as in Example A2-7, except that UBEPOL BR150L made by Ube Industries, Ltd. (conjugated diene polymer polymerized using a Co-based catalyst) was used, instead of the polybutadiene synthesized according to Example A2-3. The results of the determination of various properties of the composition are shown in Table A2-3.

The compounding formulations are shown in Table A2-2. The numerical values in Table A2-2 are expressed in terms of "parts by mass".

TABLE A2-2

|  | Example A2-7 | Comparative Example A2-2 |
|---|---|---|
| Example A2-3 | 50 |  |
| 150L |  | 50 |
| natural rubber | 50 | 50 |
| carbon black | 50 | 50 |
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A2-3.

TABLE A2-3

|  | Example A2-7 | Comparative Example A2-2 |
|---|---|---|
| Tensile stress (50%) | 102 | 100 |
| Rebound resilience | 100 | 100 |
| Low heat build-up | 111 | 100 |
| Permanent set | 133 | 100 |
| Low-temperature storage elastic modulus E' (−30° C.) | 162 | 100 |
| tan δ (60° C.) | 105 | 100 |

The numerical values in Table A2-3 are expressed as an index number with respect to each item, on the condition that each value of property of Comparative Example A2-2, in which UBEPOL BR150L made by Ube Industries, Ltd. (conjugated diene polymer polymerized using a Co-based catalyst) was used, is taken as the standard (100). The property is better as the numerical value is greater.

As shown in Table A2-3, the composition of Example A2-7 which comprises the polybutadiene obtained in Example A2-3 has better mechanical strength, low heat build-up, permanent set, low-temperature properties (low-temperature storage elastic modulus), and low fuel consumption (tan δ (60° C.)) than the composition of Comparative Example A2-2 which comprises UBEPOL BR150L.

Example A2-8

A compounded rubber was produced in accordance with the compounding formulation shown in Table A2-4, using the polybutadiene synthesized according to Example A2-6, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A2-5.

Comparative Example A2-3

A compounded rubber was produced, molded and press-vulcanized, and the properties of the resulting vulcanizate were determined in the same way as in Example A2-8, except that UBEPOL BR150L made by Ube Industries, Ltd. (conjugated diene polymer polymerized using a Co-based catalyst) was used, instead of the polybutadiene synthesized according to Example A2-6.

The compounding formulations are shown in Table A2-4. The numerical values in Table A2-4 are expressed in terms of "parts by mass".

TABLE A2-4

|  | Example A2-8 | Comparative Example A2-3 |
|---|---|---|
| Example A2-6 | 30 |  |
| BR150L |  | 30 |
| SBR | 70 | 70 |
| silica | 65 | 65 |
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A2-5.

TABLE A2-5

|  | Example A2-8 | Comparative Example A2-3 |
|---|---|---|
| Tensile stress (50%) | 101 | 100 |
| Tensile strength at break | 100 | 100 |
| Elongation at break | 102 | 100 |
| Silica dispersibility | 101 | 100 |
| tan δ (0° C.) | 104 | 100 |

The numerical values in Table A2-5 are expressed as an index number with respect to each item, on the condition that each value of property of Comparative Example A2-3, in which UBEPOL BR150L made by Ube Industries, Ltd. (conjugated diene polymer polymerized using a Co-based catalyst) was used, is taken as the standard (100). The property is better as the numerical value is greater.

As shown in Table A2-5, the composition of Example A2-8 which comprises the polybutadiene obtained in Example A2-6 has better mechanical strength, silica dispersibility, and wet grip performance (tan δ (0° C.)) than the composition of Comparative Example A2-3 which comprises UBEPOL BR150L.

Example A3-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) dysprosium (Dy(dpm)$_3$) in toluene (0.005 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A3-1.

Example A3-2

Polybutadiene was synthesized in the same way as in Example A3-1, except that the amount of the solution of triethyl aluminum (TEAL) in cyclohexane (2 mol/L) added was changed to 1.25 ml. The polymerization results are shown in Table A3-1.

Example A3-3

Polybutadiene was synthesized in the same way as in Example A3-1, except that the amount of the solution of triethyl aluminum (TEAL) in cyclohexane (2 mol/L) added was changed to 1.5 ml. The polymerization results are shown in Table A3-1.

Example A3-4

Polybutadiene was synthesized in the same way as in Example A3-1, except that the amount of the solution of triethyl aluminum (TEAL) in cyclohexane (2 mol/L) added was changed to 2.0 ml. The polymerization results are shown in Table A3-1.

Example A3-5

Polybutadiene was synthesized in the same way as in Example A3-1, except that the amount of the solution of triethyl aluminum (TEAL) in cyclohexane (2 mol/L) added was changed to 0.75 ml. The polymerization results are shown in Table A3-1.

Example A3-6

Polybutadiene was synthesized in the same way as in Example A3-1, except that the amount of the solution of triphenylcarbenium tetrakis(pentafluorophenyl)borate in toluene (0.004 mol/L) added was changed to 0.5 ml. The polymerization results are shown in Table A3-1.

Example A3-7

Polybutadiene was synthesized in the same way as in Example A3-1, except that the amount of the solution of triphenylcarbenium tetrakis(pentafluorophenyl)borate in toluene (0.004 mol/L) added was changed to 0.75 ml. The polymerization results are shown in Table A3-1.

Example A3-8

Polybutadiene was synthesized in the same way as in Example A3-1, except that the amount of the solution of triphenylcarbenium tetrakis(pentafluorophenyl)borate in toluene (0.004 mol/L) added was changed to 1.5 ml. The polymerization results are shown in Table A3-1.

Example A3-9

Polybutadiene was synthesized in the same way as in Example A3-1, except that the polymerization temperature was changed to 60° C. and the polymerization was performed at 60° C. for 25 minutes. The polymerization results are shown in Table A3-1.

Example A3-10

Polybutadiene was synthesized in the same way as in Example A3-1, except that the polymerization temperature was changed to 70° C. and the polymerization was performed at 70° C. for 25 minutes. The polymerization results are shown in Table A3-1.

Example A3-11

The interior of a 1.5 L autoclave was purged with nitrogen, and a solution of 195 ml of cyclohexane solvent and 300 ml of butadiene was placed in the autoclave. And then, 1.0 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) dysprosium (Dy(dpm)$_3$) in toluene (0.005 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A3-1.

Example A3-12

The interior of a 1.5 L autoclave was purged with nitrogen, and 500 ml of butadiene was placed in the autoclave. And then, 1.0 ml of a solution of triethyl aluminum (TEAL) in cyclohexane (2 mol/L) was added thereto. Subsequently, 0.4 ml of a solution of tris(2,2,6,6-tetramethyl-3,5-heptanedionato)dysprosium (Dy(dpm)$_3$) in toluene (0.005 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A3-1.

Example A3-13

The interior of a 1.5 L autoclave was purged with nitrogen, and a solution of 545 ml of cyclohexane solvent and 550 ml of butadiene was placed in the autoclave. And then, 3.4 ml of a solution of triethyl aluminum (TEAL) in cyclohexane (2 mol/L) was added thereto. Subsequently, 0.88 ml of a solution of tris(2,2,6,6-tetramethyl-3,5-heptanedionato) dysprosium (Dy(dpm)$_3$) in toluene (0.005 mol/L) was added thereto, and then 2.2 ml of a solution of triphenylcarbenium tetrakis(pentafluorophenyl)borate in toluene (0.004 mol/L) was added thereto. The polymerization was performed at 50° C. for 20 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A3-1.

Example A3-14

The interior of a 1.5 L autoclave was purged with nitrogen, and a solution of 295 ml of cyclohexane solvent and 300 ml of butadiene was placed in the autoclave. And then, 1.95 ml of a solution of triethyl aluminum (TEAL) in cyclohexane (2 mol/L) was added thereto. Subsequently, 0.48 ml of a solution of tris(2,2,6,6-tetramethyl-3,5-heptanedionato)dysprosium (Dy(dpm)$_3$) in toluene (0.005 mol/L) was added thereto, and then 1.2 ml of a solution of triphenylcarbenium tetrakis(pentafluorophenyl)borate in toluene (0.004 mol/L) was added thereto. The polymerization was performed at 50° C. for 25 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A3-1.

which butadiene was polymerized under the most similar conditions to Comparative Example A1-1, the catalytic activity is about 4 times as high as that of Comparative Example A1-1, which is very high, and the obtained polymer has a higher content of cis-1,4-structure.

As described above, a conjugated diene polymer having a high content of cis-1,4-structure may be produced with high activity when the catalyst for a conjugated diene polymerization of the present invention, which comprises a dysprosium compound, is used.

Example A3-15

A compounded rubber was produced in accordance with the compounding formulation shown in Table A3-2, using the polybutadiene synthesized according to Example A3-13, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A3-3.

Comparative Example A3-3

A compounded rubber was produced, molded and press-vulcanized, and the properties of the resulting vulcanizate

TABLE A3-1

| | Catalyst | Yield (g/L) | Catalytic activity (g/mmol-Cat/hr) | Cis (%) | Trans (%) | Vinyl (%) | Mn/10$^4$ | Mw/10$^4$ | Mw/Mn |
|---|---|---|---|---|---|---|---|---|---|
| Example A3-1 | Dy(dpm)$_3$ | 67.5 | 40296 | 96.2 | 2.9 | 0.9 | 24.0 | 82.7 | 3.45 |
| Example A3-2 | Dy(dpm)$_3$ | 67.5 | 40296 | 95.7 | 3.4 | 0.9 | 20.1 | 68.6 | 3.41 |
| Example A3-3 | Dy(dpm)$_3$ | 66.9 | 39960 | 95.3 | 3.8 | 0.9 | 18.3 | 60.3 | 3.29 |
| Example A3-4 | Dy(dpm)$_3$ | 63.2 | 37800 | 94.6 | 4.4 | 1.0 | 14.3 | 43.4 | 3.05 |
| Example A3-5 | Dy(dpm)$_3$ | 59.2 | 35364 | 96.6 | 2.5 | 0.9 | 25.6 | 85.8 | 3.35 |
| Example A3-6 | Dy(dpm)$_3$ | 58.1 | 34620 | 96.2 | 2.9 | 0.9 | 21.0 | 66.8 | 3.18 |
| Example A3-7 | Dy(dpm)$_3$ | 58.8 | 35064 | 96.2 | 2.9 | 1.0 | 21.9 | 68.2 | 3.12 |
| Example A3-8 | Dy(dpm)$_3$ | 58.6 | 35004 | 96.4 | 2.7 | 1.0 | 22.8 | 72.3 | 3.17 |
| Example A3-9 | Dy(dpm)$_3$ | 74.5 | 44472 | 95.3 | 3.5 | 1.2 | 19.6 | 65.3 | 3.34 |
| Example A3-10 | Dy(dpm)$_3$ | 65.3 | 38976 | 94.8 | 3.9 | 1.3 | 18.1 | 66.2 | 3.65 |
| Example A3-11 | Dy(dpm)$_3$ | 69.6 | 41520 | 96.8 | 2.3 | 0.9 | 23.2 | 75.9 | 3.28 |
| Example A3-12 | Dy(dpm)$_3$ | 38.9 | 23424 | 97.9 | 1.3 | 0.8 | 26.4 | 94.3 | 3.57 |
| Example A3-13 | Dy(dpm)$_3$ | 59.7 | 44864 | 95.5 | 3.6 | 1.0 | 16.7 | 50.6 | 3.02 |
| Example A3-14 | Dy(dpm)$_3$ | 61.6 | 36890 | 95.4 | 3.7 | 0.9 | 16.4 | 51.1 | 3.12 |
| Comparative Example A1-1 | Nd(Ver)$_3$ | 17.6 | 10488 | 86.7 | 12.0 | 1.3 | 12.6 | 35.9 | 2.85 |
| Comparative Example A1-2 | Nd(dpm)$_3$ | 30.5 | 18204 | 90.8 | 8.1 | 1.1 | 15.6 | 60.6 | 3.89 |

The polymerization results of Comparative Example A1-1 and Comparative Example A1-2 are also shown in Table A3-1. As can be seen from Table A3-1, in Example A3-1 in were determined in the same way as in Example A3-15, except that UBEPOL BR150L made by Ube Industries, Ltd. (conjugated diene polymer polymerized using a Co-based catalyst) was used, instead of the polybutadiene synthesized according to Example A3-13. The results of the determination of various properties of the composition are shown in Table A3-3.

The compounding formulations are shown in Table A3-2. The numerical values in Table A3-2 are expressed in terms of "parts by mass".

TABLE A3-2

|  | Example A3-15 | Comparative Example A3-3 |
|---|---|---|
| Example A3-13 | 50 |  |
| 150L |  | 50 |
| natural rubber | 50 | 50 |
| carbon black | 50 | 50 |
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A3-3.

TABLE A3-3

|  | Example A3-15 | Comparative Example A3-3 |
|---|---|---|
| Processability | 105 | 100 |
| Tensile stress (300%) | 101 | 100 |
| Rebound resilience | 100 | 100 |
| Low heat build-up | 107 | 100 |
| Permanent set | 106 | 100 |
| Low-temperature storage elastic modulus E' (−30° C.) | 209 | 100 |
| tan δ (60° C.) | 103 | 100 |

The numerical values in Table A3-3 are expressed as an index number with respect to each item, on the condition that each value of property of Comparative Example A3-3, in which UBEPOL BR150L made by Ube Industries, Ltd. (conjugated diene polymer polymerized using a Co-based catalyst) was used, is taken as the standard (100). The property is better as the numerical value is greater.

As shown in Table A3-3, the composition of Example A3-15 which comprises the polybutadiene obtained in Example A3-13 has better processability, mechanical strength, low heat build-up, permanent set, low-temperature properties (low-temperature storage elastic modulus), and low fuel consumption (tan δ (60° C.)) than the composition of Comparative Example A3-3 which comprises UBEPOL BR150L.

Example A3-16

A compounded rubber was produced in accordance with the compounding formulation shown in Table A3-4, using the polybutadiene synthesized according to Example A3-14, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A3-5.

Comparative Example A3-4

A compounded rubber was produced, molded and press-vulcanized, and the properties of the resulting vulcanizate were determined in the same way as in Example A3-16, except that UBEPOL BR150L made by Ube Industries, Ltd. (conjugated diene polymer polymerized using a Co-based catalyst) was used, instead of the polybutadiene synthesized according to Example A3-14. The results of the determination of various properties of the composition are shown in Table A3-5.

The compounding formulations are shown in Table A3-4. The numerical values in Table A3-4 are expressed in terms of "parts by mass".

TABLE A3-4

|  | Example A3-16 | Comparative Example A3-4 |
|---|---|---|
| Example A3-14 | 30 |  |
| BR150L |  | 30 |
| SBR | 70 | 70 |
| silica | 65 | 65 |
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A3-5.

TABLE A3-5

|  | Example A3-16 | Comparative Example A3-4 |
|---|---|---|
| Tensile stress (300%) | 101 | 100 |
| Tensile strength at break | 105 | 100 |
| Elongation at break | 102 | 100 |
| Rebound resilience | 102 | 100 |
| Silica dispersibility | 114 | 100 |
| Low-temperature storage elastic modulus E' (−30° C.) | 114 | 100 |
| tan δ (0° C.) | 101 | 100 |

The numerical values in Table A3-5 are expressed as an index number with respect to each item, on the condition that each value of property of Comparative Example A3-4, in which UBEPOL BR150L made by Ube Industries, Ltd. (conjugated diene polymer polymerized using a Co-based catalyst) was used, is taken as the standard (100). The property is better as the numerical value is greater.

As shown in Table A3-5, the composition of Example A3-16 which comprises the polybutadiene obtained in Example A3-14 has better mechanical strength, rebound resilience, silica dispersibility, low-temperature properties (low-temperature storage elastic modulus), and wet grip performance (tan δ (0° C.)) than the composition of Comparative Example A3-4 which comprises UBEPOL BR150L.

Production Example A4-1

The interior of a 1.5 L autoclave was purged with nitrogen, and a solution of 495 ml of cyclohexane solvent and 500 ml of butadiene was placed in the autoclave. And then, 2.6 ml of a solution of triethyl aluminum (TEAL) in cyclohexane (2 mol/L) was added thereto. Subsequently, 2.0 ml of a solution of tris(2,2,6,6-tetramethyl-3,5-heptanedionato) praseodymium (Pr(dpm)$_3$) in cyclohexane (0.005 mol/L) was added thereto, and then 5.0 ml of a solution of triphenylcarbenium tetrakis(pentafluorophenyl)borate in toluene (0.004 mol/L) was added thereto. The polymerization was performed at 50° C. for 25 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A4-1.

Production Example A4-2

The interior of a 1.5 L autoclave was purged with nitrogen, and a solution of 395 ml of cyclohexane solvent and 400 ml of butadiene was placed in the autoclave. And then, 2.0 ml of a solution of triethyl aluminum (TEAL) in cyclohexane (2 mol/L) was added thereto. Subsequently, 1.6 ml of a solution of tris(2,2,6,6-tetramethyl-3,5-heptanedionato) praseodymium (Pr(dpm)$_3$) in cyclohexane (0.005 mol/L) was added thereto, and then 4.0 ml of a solution of triphenylcarbenium tetrakis(pentafluorophenyl)borate in toluene (0.004 mol/L) was added thereto. The polymerization was performed at 50° C. for 20 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A4-1.

Production Example A4-3

The interior of a 1.5 L autoclave was purged with nitrogen, and a solution of 245 ml of cyclohexane solvent and 250 ml of butadiene was placed in the autoclave. And then, 1.25 ml of a solution of triethyl aluminum (TEAL) in cyclohexane (2 mol/L) was added thereto. Subsequently, 1.0 ml of a solution of tris(2,2,6,6-tetramethyl-3,5-heptanedionato)praseodymium (Pr(dpm)$_3$) in cyclohexane (0.005 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A4-1.

TABLE A4-1

| | Catalyst | Yield (g/L) | Catalytic activity (g/mmol-Pr/hr) | Cis (%) | Trans (%) | Vinyl (%) | Mn/10$^4$ | Mw/10$^4$ | Mw/Mn |
|---|---|---|---|---|---|---|---|---|---|
| Production Example A4-1 | Pr(dpm)$_3$ | 51.7 | 12456 | 92.0 | 7.0 | 1.0 | 18.4 | 53.8 | 2.92 |
| Production Example A4-2 | Pr(dpm)$_3$ | 43.9 | 13223 | 91.6 | 7.5 | 1.0 | 17.7 | 53.3 | 3.01 |
| Production Example A4-3 | Pr(dpm)$_3$ | 46.5 | 11160 | 89.8 | 9.2 | 1.0 | 15.4 | 47.9 | 3.10 |

Example A4-1

A compounded rubber was produced in accordance with the compounding formulation shown in Table A4-2, using the polybutadiene synthesized according to Production Example A4-1, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A4-3.

Comparative Example A4-1

A compounded rubber was produced, molded and press-vulcanized, and the properties of the resulting vulcanizate were determined in the same way as in Example A4-1, except that UBEPOL BR150L made by Ube Industries, Ltd. (conjugated diene polymer polymerized using a Co-based catalyst) was used, instead of the polybutadiene synthesized according to Production Example A4-1. The results of the determination of various properties of the composition are shown in Table A4-3.

The compounding formulations are shown in Table A4-2. The numerical values in Table A4-2 are expressed in terms of "parts by mass".

TABLE A4-2

| | Example A4-1 | Comparative Example A4-1 |
|---|---|---|
| Production Example A4-1 | 50 | |
| 150L | | 50 |
| natural rubber | 50 | 50 |
| carbon black | 50 | 50 |

TABLE A4-2-continued

|  | Example A4-1 | Comparative Example A4-1 |
|---|---|---|
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A4-3.

TABLE A4-3

|  | Example A4-1 | Comparative Example A4-1 |
|---|---|---|
| Tensile stress (50%) | 101 | 100 |
| Rebound resilience | 102 | 100 |
| Low heat build-up | 111 | 100 |
| Permanent set | 128 | 100 |
| Low-temperature storage elastic modulus E' (−30° C.) | 188 | 100 |
| tan δ (60° C.) | 105 | 100 |

The numerical values in Table A4-3 are expressed as an index number with respect to each item, on the condition that each value of property of Comparative Example A4-1, in which UBEPOL BR150L made by Ube Industries, Ltd. (conjugated diene polymer polymerized using a Co-based catalyst) was used, is taken as the standard (100). The property is better as the numerical value is greater.

As shown in Table A4-3, the composition of Example A4-1 which comprises the polybutadiene obtained in Production Example A4-1 has better mechanical strength, rebound resilience, low heat build-up, permanent set, low-temperature properties (low-temperature storage elastic modulus), and low fuel consumption (tan δ (60° C.)) than the composition of Comparative Example A4-1 which comprises UBEPOL BR150L.

Example A4-2

A compounded rubber was produced in accordance with the compounding formulation shown in Table A4-4, using the polybutadiene synthesized according to Production Example A4-2, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A4-5.

Comparative Example A4-2

A compounded rubber was produced, molded and press-vulcanized, and the properties of the resulting vulcanizate were determined in the same way as in Example A4-2, except that UBEPOL BR150L made by Ube Industries, Ltd. (conjugated diene polymer polymerized using a Co-based catalyst) was used, instead of the polybutadiene synthesized according to Production Example A4-2. The results of the determination of various properties of the composition are shown in Table A4-5.

The compounding formulations are shown in Table A4-4. The numerical values in Table A4-4 are expressed in terms of "parts by mass".

TABLE A4-4

|  | Example A4-2 | Comparative Example A4-2 |
|---|---|---|
| Production Example A4-2 | 30 |  |
| BR150L |  | 30 |
| SBR | 70 | 70 |
| silica | 65 | 65 |
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A4-5.

TABLE A4-5

|  | Example A4-2 | Comparative Example A4-2 |
|---|---|---|
| Elongation at break | 102 | 100 |
| Silica dispersibility | 112 | 100 |
| tan δ (0° C.) | 103 | 100 |

The numerical values in Table A4-5 are expressed as an index number with respect to each item, on the condition that each value of property of Comparative Example A4-2, in which UBEPOL BR150L made by Ube Industries, Ltd. (conjugated diene polymer polymerized using a Co-based catalyst) was used, is taken as the standard (100). The property is better as the numerical value is greater.

As shown in Table A4-5, the composition of Example A4-2 which comprises the polybutadiene obtained in Production Example A4-2 has better mechanical strength, silica dispersibility, and wet grip performance (tan δ (0° C.)) than the composition of Comparative Example A4-2 which comprises UBEPOL BR150L.

Example A5-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of tris(2,2,6,6-tetramethyl-3,5-heptanedionato) holmium (Ho(dpm)$_3$) in toluene (0.01 mol/L) was added thereto, and then 1.0 ml of a solution of triphenylcarbenium tetrakis(pentafluorophenyl)borate in toluene (0.004 mol/L)

was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A5-1.

Example A5-2

Polybutadiene was synthesized in the same way as in Example A5-1, except that the amount of the solution of tris(2,2,6,6-tetramethyl-3,5-heptanedionato)holmium (Ho(dpm)$_3$) in toluene (0.01 mol/L) added was changed to 0.5 ml, and the amount of the solution of triphenylcarbenium tetrakis(pentafluorophenyl)borate in toluene (0.004 mol/L) added was changed to 2.5 ml. The polymerization results are shown in Table A5-1.

Example A5-3

Polybutadiene was synthesized in the same way as in Example A5-1, except that the amount of the solution of triethyl aluminum (TEAL) in cyclohexane (2 mol/L) added was changed to 1.25 ml, and the amount of the solution of tris(2,2,6,6-tetramethyl-3,5-heptanedionato)holmium (Ho(dpm)$_3$) in toluene (0.01 mol/L) added was changed to 0.5 ml, and the amount of the solution of trip henylcarbenium tetrakis(pentafluorophenyl)borate in toluene (0.004 mol/L) added was changed to 2.5 ml. The polymerization results are shown in Table A5-1.

Example A5-4

The interior of a 1.5 L autoclave was purged with nitrogen, and a solution of 495 ml of cyclohexane solvent and 500 ml of butadiene was placed in the autoclave. And then, 2.7 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) holmium (Ho(dpm)$_3$) in toluene (0.01 mol/L) was added thereto, and then 5.0 ml of a solution of triphenylcarbenium tetrakis(pentafluorophenyl)borate in toluene (0.004 mol/L) was added thereto. The polymerization was performed at 50° C. for 25 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A5-1.

Example A5-5

Polybutadiene was synthesized in the same way as in Example A5-4, except that the amount of the solution of triethyl aluminum (TEAL) in cyclohexane (2 mol/L) added was changed to 2.8 ml. The polymerization results are shown in Table A5-1.

Example A5-6

The interior of a 1.5 L autoclave was purged with nitrogen, and a solution of 395 ml of cyclohexane solvent and 400 ml of butadiene was placed in the autoclave. And then, 2.15 ml of a solution of triethyl aluminum (TEAL) in cyclohexane (2 mol/L) was added thereto. Subsequently, 0.8 ml of a solution of tris(2,2,6,6-tetramethyl-3,5-heptanedionato)holmium (Ho(dpm)$_3$) in toluene (0.01 mol/L) was added thereto, and then 4.0 ml of a solution of triphenylcarbenium tetrakis(pentafluorophenyl)borate in toluene (0.004 mol/L) was added thereto. The polymerization was performed at 50° C. for 20 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A5-1.

Example A5-7

Polybutadiene was synthesized in the same way as in Example A5-6, except that the amount of the solution of triethyl aluminum (TEAL) in cyclohexane (2 mol/L) added was changed to 2.3 ml. The polymerization results are shown in Table A5-1.

TABLE A5-1

| | Catalyst | Yield (g/L) | Catalytic activity (g/mmol-Cat/hr) | Cis (%) | Trans (%) | Vinyl (%) | Mn/10$^4$ | Mw/10$^4$ | Mw/Mn |
|---|---|---|---|---|---|---|---|---|---|
| Example A5-1 | Ho(dpm)$_3$ | 21.3 | 12708 | 96.4 | 2.6 | 1.1 | 16.1 | 43.1 | 2.68 |
| Example A5-2 | Ho(dpm)$_3$ | 43.2 | 10349 | 96.5 | 2.4 | 1.1 | 19.2 | 58.0 | 3.02 |
| Example A5-3 | Ho(dpm)$_3$ | 49.0 | 11731 | 96.2 | 2.7 | 1.1 | 18.0 | 53.9 | 2.99 |
| Example A5-4 | Ho(dpm)$_3$ | 51.8 | 12478 | 96.2 | 2.7 | 1.1 | 17.9 | 54.5 | 3.05 |
| Example A5-5 | Ho(dpm)$_3$ | 56.7 | 13666 | 96.2 | 2.7 | 1.0 | 19.1 | 58.3 | 3.06 |
| Example A5-6 | Ho(dpm)$_3$ | 50.4 | 15161 | 96.3 | 2.7 | 1.0 | 18.5 | 55.6 | 3.01 |
| Example A5-7 | Ho(dpm)$_3$ | 51.7 | 15548 | 96.2 | 2.8 | 1.0 | 18.1 | 54.6 | 3.02 |
| Comparative Example A1-1 | Nd(Ver)$_3$ | 17.6 | 10488 | 86.7 | 12.0 | 1.3 | 12.6 | 35.9 | 2.85 |

The polymerization results of Comparative Example A1-1 are also shown in Table A5-1. As can be seen from Table A5-1, in Example A5-1 in which butadiene was polymerized under the most similar conditions to Comparative Example A1-1, the catalytic activity is higher than that of Comparative Example A1-1, and the obtained polymer has a higher content of cis-1,4-structure.

As described above, a conjugated diene polymer having a high content of cis-1,4-structure may be produced with high activity when the catalyst for a conjugated diene polymerization of the present invention, which comprises a holmium compound, is used.

Example A5-8

A compounded rubber was produced in accordance with the compounding formulation shown in Table A5-2, using the polybutadiene synthesized according to Example A5-4, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A5-3.

Comparative Example A5-2

A compounded rubber was produced, molded and press-vulcanized, and the properties of the resulting vulcanizate were determined in the same way as in Example A5-8, except that UBEPOL BR150L made by Ube Industries, Ltd. (conjugated diene polymer polymerized using a Co-based catalyst) was used, instead of the polybutadiene synthesized according to Example A5-4. The results of the determination of various properties of the composition are shown in Table A5-3.

The compounding formulations are shown in Table A5-2. The numerical values in Table A5-2 are expressed in terms of "parts by mass".

TABLE A5-2

|  | Example A5-8 | Comparative Example A5-2 |
|---|---|---|
| Example A5-4 | 50 |  |
| 150L |  | 50 |
| natural rubber | 50 | 50 |
| carbon black | 50 | 50 |
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A5-3.

TABLE A5-3

|  | Example A5-8 | Comparative Example A5-2 |
|---|---|---|
| Processability | 101 | 100 |
| Tensile stress (300%) | 103 | 100 |
| Rebound resilience | 101 | 100 |
| Low heat build-up | 111 | 100 |
| Permanent set | 111 | 100 |
| Low-temperature storage elastic modulus E' (−30° C.) | 197 | 100 |
| tan δ (60° C.) | 106 | 100 |

The numerical values in Table A5-3 are expressed as an index number with respect to each item, on the condition that each value of property of Comparative Example A5-2, in which UBEPOL BR150L made by Ube Industries, Ltd. (conjugated diene polymer polymerized using a Co-based catalyst) was used, is taken as the standard (100). The property is better as the numerical value is greater.

As shown in Table A5-3, the composition of Example A5-8 which comprises the polybutadiene obtained in Example A5-4 has better processability, mechanical strength, rebound resilience, low heat build-up, permanent set, low-temperature properties (low-temperature storage elastic modulus), and low fuel consumption (tan δ (60° C.)) than the composition of Comparative Example A5-2 which comprises UBEPOL BR150L.

Example A5-9

A compounded rubber was produced in accordance with the compounding formulation shown in Table A5-4, using the polybutadiene synthesized according to Example A5-7, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A5-5.

Comparative Example A5-3

A compounded rubber was produced, molded and press-vulcanized, and the properties of the resulting vulcanizate were determined in the same way as in Example A5-9, except that UBEPOL BR150L made by Ube Industries, Ltd. (conjugated diene polymer polymerized using a Co-based catalyst) was used, instead of the polybutadiene synthesized according to Example A5-7. The results of the determination of various properties of the composition are shown in Table A5-5.

The compounding formulations are shown in Table A5-4. The numerical values in Table A5-4 are expressed in terms of "parts by mass".

TABLE A5-4

|  | Example A5-9 | Comparative Example A5-3 |
|---|---|---|
| Example A5-7 | 30 |  |
| BR150L |  | 30 |
| SBR | 70 | 70 |
| silica | 65 | 65 |
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A5-5.

TABLE A5-5

|  | Example A5-9 | Comparative Example A5-3 |
|---|---|---|
| Tensile strength at break | 105 | 100 |
| Elongation at break | 102 | 100 |
| Rebound resilience | 102 | 100 |
| Silica dispersibility | 122 | 100 |
| tan δ (0° C.) | 103 | 100 |

The numerical values in Table A5-5 are expressed as an index number with respect to each item, on the condition that each value of property of Comparative Example A5-3, in which UBEPOL BR150L made by Ube Industries, Ltd. (conjugated diene polymer polymerized using a Co-based catalyst) was used, is taken as the standard (100). The property is better as the numerical value is greater.

As shown in Table A5-5, the composition of Example A5-9 which comprises the polybutadiene obtained in Example A5-7 has better mechanical strength, rebound resilience, silica dispersibility, and wet grip performance (tan δ (0° C.)) than the composition of Comparative Example A5-3 which comprises UBEPOL BR150L.

Example A6-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of tris(2,2,6,6-tetramethyl-3,5-heptanedionato)erbium (Er(dpm)$_3$) in cyclohexane (0.01 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A6-1.

Example A6-2

Polybutadiene was synthesized in the same way as in Example A6-1, except that the amount of the solution of tris(2,2,6,6-tetramethyl-3,5-heptanedionato)erbium (Er(dpm)$_3$) in cyclohexane (0.01 mol/L) added was changed to 1.0 ml, and the amount of the solution of triphenylcarbenium tetrakis(pentafluorophenyl)borate in toluene (0.004 mol/L) added was changed to 5.0 ml. The polymerization results are shown in Table A6-1.

Example A6-3

Polybutadiene was synthesized in the same way as in Example A6-1, except that the amount of the solution of triethyl aluminum (TEAL) in cyclohexane (2 mol/L) added was changed to 1.5 ml, and the amount of the solution of tris(2,2,6,6-tetramethyl-3,5-heptanedionato)erbium (Er(dpm)$_3$) in cyclohexane (0.01 mol/L) added was changed to 1.0 ml, and the amount of the solution of trip henylcarbenium tetrakis(pentafluorophenyl)borate in toluene (0.004 mol/L) added was changed to 5.0 ml. The polymerization results are shown in Table A6-1.

Example A6-4

Polybutadiene was synthesized in the same way as in Example A6-1, except that the amount of the solution of triethyl aluminum (TEAL) in cyclohexane (2 mol/L) added was changed to 1.5 ml, and the amount of the solution of tris(2,2,6,6-tetramethyl-3,5-heptanedionato)erbium (Er(dpm)$_3$) in cyclohexane (0.01 mol/L) added was changed to 0.5 ml, and the amount of the solution of trip henylcarbenium tetrakis(pentafluorophenyl)borate in toluene (0.004 mol/L) added was changed to 2.5 ml. The polymerization results are shown in Table A6-1.

Example A6-5

Polybutadiene was synthesized in the same way as in Example A6-4, except that the polymerization time was changed to 20 minutes and the polymerization was performed at 50° C. for 20 minutes. The polymerization results are shown in Table A6-1.

Example A6-6

The interior of a 1.5 L autoclave was purged with nitrogen, and a solution of 495 ml of cyclohexane solvent and 500 ml of butadiene was placed in the autoclave. And then, 3.1 ml of a solution of triethyl aluminum (TEAL) in cyclohexane (2 mol/L) was added thereto. Subsequently, 1.0 ml of a solution of tris(2,2,6,6-tetramethyl-3,5-heptanedionato)erbium (Er(dpm)$_3$) in cyclohexane (0.01 mol/L) was added thereto, and then 5.0 ml of a solution of trip henylcarbenium tetrakis(pentafluorophenyl)borate in toluene (0.004 mol/L) was added thereto. The polymerization was performed at 50° C. for 20 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A6-1.

TABLE A6-1

|  | Catalyst | Yield (g/L) | Catalytic activity (g/mmol-Cat/hr) | Cis (%) | Trans (%) | Vinyl (%) | Mn/$10^4$ | Mw/$10^4$ | Mw/Mn |
|---|---|---|---|---|---|---|---|---|---|
| Example A6-1 | Er(dpm)$_3$ | 19.4 | 11580 | 96.0 | 2.7 | 1.3 | 14.8 | 40.6 | 2.74 |
| Example A6-2 | Er(dpm)$_3$ | 64.0 | 7706 | 95.3 | 2.9 | 1.8 | 20.2 | 84.1 | 4.17 |
| Example A6-3 | Er(dpm)$_3$ | 93.3 | 11251 | 94.8 | 3.5 | 1.7 | 17.7 | 77.0 | 4.36 |
| Example A6-4 | Er(dpm)$_3$ | 62.5 | 14995 | 95.5 | 3.1 | 1.4 | 16.0 | 57.5 | 3.59 |
| Example A6-5 | Er(dpm)$_3$ | 47.1 | 14124 | 95.4 | 3.2 | 1.4 | 14.9 | 48.0 | 3.22 |
| Example A6-6 | Er(dpm)$_3$ | 50.3 | 15159 | 95.8 | 2.9 | 1.3 | 16.2 | 48.7 | 3.00 |

TABLE A6-1-continued

|  | Catalyst | Yield (g/L) | Catalytic activity (g/mmol-Cat/hr) | Cis (%) | Trans (%) | Vinyl (%) | Mn/10⁴ | Mw/10⁴ | Mw/Mn |
|---|---|---|---|---|---|---|---|---|---|
| Comparative Example A1-1 | Nd(Ver)₃ | 17.6 | 10488 | 86.7 | 12.0 | 1.3 | 12.6 | 35.9 | 2.85 |

The polymerization results of Comparative Example A1-1 are also shown in Table A6-1. As can be seen from Table A6-1, in Example A6-1 in which butadiene was polymerized under the most similar conditions to Comparative Example A1-1, the catalytic activity is higher than that of Comparative Example A1-1, and the obtained polymer has a higher content of cis-1,4-structure.

As described above, a conjugated diene polymer having a high content of cis-1,4-structure may be produced with high activity when the catalyst for a conjugated diene polymerization of the present invention, which comprises a erbium compound, is used.

Example A6-7

A compounded rubber was produced in accordance with the compounding formulation shown in Table A6-2, using the polybutadiene synthesized according to Example A6-6, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A6-3.

Comparative Example A6-2

A compounded rubber was produced, molded and press-vulcanized, and the properties of the resulting vulcanizate were determined in the same way as in Example A6-7, except that UBEPOL BR150L made by Ube Industries, Ltd. (conjugated diene polymer polymerized using a Co-based catalyst) was used, instead of the polybutadiene synthesized according to Example A6-6. The results of the determination of various properties of the composition are shown in Table A6-3.

The compounding formulations are shown in Table A6-2. The numerical values in Table A6-2 are expressed in terms of "parts by mass".

TABLE A6-2

|  | Example A6-7 | Comparative Example A6-2 |
|---|---|---|
| Example A6-6 | 50 |  |
| 150L |  | 50 |
| natural rubber | 50 | 50 |
| carbon black | 50 | 50 |
| zinc oxide | 3 | 3 |

TABLE A6-2-continued

|  | Example A6-7 | Comparative Example A6-2 |
|---|---|---|
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

The results of the evaluations of the obtained compositions are shown in Table A6-3.

TABLE A6-3

|  | Example A6-7 | Comparative Example A6-2 |
|---|---|---|
| Processability | 106 | 100 |
| Tensile stress (100%) | 108 | 100 |
| Tensile stress (300%) | 110 | 100 |
| Rebound resilience | 101 | 100 |
| Low heat build-up | 102 | 100 |
| Filler dispersibility | 109 | 100 |
| tan δ (50° C.) | 101 | 100 |
| Low-temperature storage elastic modulus E' (−30° C.) | 196 | 100 |

The numerical values in Table A6-3 are expressed as an index number with respect to each item, on the condition that each value of property of Comparative Example A6-2, in which UBEPOL BR150L made by Ube Industries, Ltd. (conjugated diene polymer polymerized using a Co-based catalyst) was used, is taken as the standard (100). The property is better as the numerical value is greater.

As shown in Table A6-3, the composition of Example A6-7 which comprises the polybutadiene obtained in Example A6-6 has better processability, tensile strength, rebound resilience, low heat build-up, filler dispersibility (Payne effect), low fuel consumption (tan δ (50° C.)), and low-temperature properties (low-temperature storage elastic modulus) than the composition of Comparative Example A6-2 which comprises UBEPOL BR150L.

Example A7-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.2 ml of a solution of tris(2,2,6,6-tetramethyl-3,5-heptanedionato) thulium (Tm(dpm)₃) in cyclohexane (0.01 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A7-1.

Example A7-2

Polybutadiene was synthesized in the same way as in Example A7-1, except that the amount of the solution of triethyl aluminum (TEAL) in cyclohexane (2 mol/L) added was changed to 1.5 ml, and the amount of the solution of tris(2,2,6,6-tetramethyl-3,5-heptanedionato)thulium (Tm(dpm)$_3$) in cyclohexane (0.01 mol/L) added was changed to 1.0 ml, and the amount of the solution of trip henylcarbenium tetrakis(pentafluorophenyl)borate in toluene (0.004 mol/L) added was changed to 5.0 ml. The polymerization results are shown in Table A7-1.

Example A7-3

The interior of a 1.5 L autoclave was purged with nitrogen, and a solution of 395 ml of cyclohexane solvent and 400 ml of butadiene was placed in the autoclave. And then, 2.5 ml of a solution of triethyl aluminum (TEAL) in cyclohexane (2 mol/L) was added thereto. Subsequently, 1.6 ml of a solution of tris(2,2,6,6-tetramethyl-3,5-heptanedionato)thulium (Tm(dpm)$_3$) in cyclohexane (0.01 mol/L) was added thereto, and then 8.0 ml of a solution of trip henylcarbenium tetrakis(pentafluorophenyl)borate in toluene (0.004 mol/L) was added thereto. The polymerization was performed at 50° C. for 25 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table A7-1.

Example A7-4

Polybutadiene was synthesized in the same way as in Example A7-3, except that the polymerization time was changed to 20 minutes and the polymerization was performed at 50° C. for 20 minutes. The polymerization results are shown in Table A7-1.

Example A7-5

Polybutadiene was synthesized in the same way as in Example A7-3, except that the amount of the cyclohexane solvent added was changed to 390 ml, and the polymerization time was changed to 20 minutes and the polymerization was performed at 50° C. for 20 minutes. The polymerization results are shown in Table A7-1.

The polymerization results of Comparative Example A1-1 are also shown in Table A7-1.

As described above, a conjugated diene polymer having a high content of cis-1,4-structure may be produced with high activity when the catalyst for a conjugated diene polymerization of the present invention, which comprises a thulium compound, is used.

Example A7-6

A compounded rubber was produced in accordance with the compounding formulation shown in Table A7-2, using the polybutadiene synthesized according to Example A7-4, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A7-3.

Comparative Example A7-2

A compounded rubber was produced, molded and press-vulcanized, and the properties of the resulting vulcanizate were determined in the same way as in Example A7-6, except that UBEPOL BR150L made by Ube Industries, Ltd. (conjugated diene polymer polymerized using a Co-based catalyst) was used, instead of the polybutadiene synthesized according to Example A7-4. The results of the determination of various properties of the composition are shown in Table A7-3.

The compounding formulations are shown in Table A7-2. The numerical values in Table A7-2 are expressed in terms of "parts by mass".

TABLE A7-2

|  | Example A7-6 | Comparative Example A7-2 |
|---|---|---|
| Example A7-4 | 30 |  |
| BR150L |  | 30 |
| SBR | 70 | 70 |
| silica | 65 | 65 |

TABLE A7-1

|  | Catalyst | Yield (g/L) | Catalytic activity (g/mmol-Cat./hr) | Cis (%) | Trans (%) | Vinyl (%) | Mn/10$^4$ | Mw/10$^4$ | Mw/Mn |
|---|---|---|---|---|---|---|---|---|---|
| Example A7-1 | Tm(dpm)$_3$ | 10.3 | 6120 | 95.0 | 3.5 | 1.5 | 11.0 | 26.4 | 2.39 |
| Example A7-2 | Tm(dpm)$_3$ | 42.1 | 5076 | 93.2 | 4.6 | 2.2 | 12.4 | 52.9 | 4.26 |
| Example A7-3 | Tm(dpm)$_3$ | 52.2 | 6326 | 93.6 | 4.3 | 2.0 | 13.8 | 60.2 | 4.36 |
| Example A7-4 | Tm(dpm)$_3$ | 43.0 | 6512 | 93.5 | 4.5 | 2.0 | 13.5 | 51.6 | 3.81 |
| Example A7-5 | Tm(dpm)$_3$ | 44.6 | 6714 | 93.2 | 4.7 | 2.1 | 12.7 | 49.7 | 3.90 |
| Comparative Example A1-1 | Nd(Ver)$_3$ | 17.6 | 10488 | 86.7 | 12.0 | 1.3 | 12.6 | 35.9 | 2.85 |

TABLE A7-2-continued

|  | Example A7-6 | Comparative Example A7-2 |
|---|---|---|
| silane coupling agent | 5.2 | 5.2 |
| oil | 25 | 25 |
| zinc oxide | 3 | 3 |
| stearic acid | 1 | 1 |
| anti-oxidant | 1 | 1 |
| vulcanizing accelerator 1 | 1.7 | 1.7 |
| vulcanizing accelerator 2 | 2 | 2 |
| powdered sulfur | 1.4 | 1.4 |

The results of the evaluations of the obtained compositions are shown in Table A7-3.

TABLE A7-3

|  | Example A7-6 | Comparative Example A7-2 |
|---|---|---|
| Rebound resilience | 102 | 100 |
| Swell | 105 | 100 |
| Filler dispersibility | 127 | 100 |
| tan δ (0° C.) | 104 | 100 |
| Low-temperature storage elastic modulus E' (−30° C.) | 115 | 100 |

The numerical values in Table A7-3 are expressed as an index number with respect to each item, on the condition that each value of property of Comparative Example A7-2, in which UBEPOL BR150L made by Ube Industries, Ltd. (conjugated diene polymer polymerized using a Co-based catalyst) was used, is taken as the standard (100). The property is better as the numerical value is greater.

As shown in Table A7-3, the composition of Example A7-6 which comprises the polybutadiene obtained in Example A7-4 has better rebound resilience, swell, filler dispersibility (Payne effect), wet grip performance (tan δ (0° C.)), and low-temperature properties (low-temperature storage elastic modulus) than the composition of Comparative Example A7-2 which comprises UBEPOL BR150L.

Example A7-7

A compounded rubber was produced in accordance with the compounding formulation shown in Table A7-4, using the polybutadiene synthesized according to Example A7-5, by performing the first compounding in which natural rubber, carbon black (ISAF), zinc oxide, stearic acid, an antioxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table A7-5.

Comparative Example A7-3

A compounded rubber was produced, molded and press-vulcanized, and the properties of the resulting vulcanizate were determined in the same way as in Example A7-7, except that UBEPOL BR150L made by Ube Industries, Ltd. (conjugated diene polymer polymerized using a Co-based catalyst) was used, instead of the polybutadiene synthesized according to Example A7-5.

The results of the determination of various properties of the composition are shown in Table A7-5.

The compounding formulations are shown in Table A7-4. The numerical values in Table A7-4 are expressed in terms of "parts by mass".

TABLE A7-4

|  | Example A7-7 | Comparative Example A7-3 |
|---|---|---|
| Example A7-5 | 50 |  |
| 150L |  | 50 |
| natural rubber | 50 | 50 |
| carbon black | 50 | 50 |
| zinc oxide | 3 | 3 |
| stearic acid | 2 | 2 |
| anti-oxidant | 2 | 2 |
| oil | 3 | 3 |
| vulcanizing accelerator | 1 | 1 |
| powdered sulfur | 1.5 | 1.5 |

TABLE A7-5

|  | Example A7-7 | Comparative Example A7-3 |
|---|---|---|
| Processability | 112 | 100 |
| Swell | 106 | 100 |
| Tensile stress (300%) | 102 | 100 |
| Low heat build-up | 101 | 100 |
| Filler dispersibility | 108 | 100 |
| tan δ (0° C.) | 103 | 100 |
| Low-temperature storage elastic modulus E' (−30° C.) | 198 | 100 |

The numerical values in Table A7-5 are expressed as an index number with respect to each item, on the condition that each value of property of Comparative Example A7-3, in which UBEPOL BR150L made by Ube Industries, Ltd. (conjugated diene polymer polymerized using a Co-based catalyst) was used, is taken as the standard (100). The property is better as the numerical value is greater.

As shown in Table A7-5, the composition of Example A7-7 which comprises the polybutadiene obtained in Example A7-5 has better processability, swell, tensile stress, low heat build-up, filler dispersibility (Payne effect), wet grip performance (tan δ (0° C.)), and low-temperature properties (low-temperature storage elastic modulus) than the composition of Comparative Example A7-3 which comprises UBEPOL BR150L.

Example B1-1

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.2 ml of a solution of tris(2,2,6,6-tetramethyl-3,5-heptanedionato) terbium (Tb(dpm)$_3$) in cyclohexane (0.01 mol/L) was added thereto, and then 1.0 ml of a solution of trip henylcarbenium tetrakis(pentafluorophenyl)borate in toluene (0.004 mol/L) was added thereto. The polymerization was performed at 50° C. for 25 minutes, and then 0.5 ml of a solution of veratraldehyde (VTA) as a modifying agent in toluene (1 mol/L) was added thereto, and the modification reaction was performed at the same temperature for 10 minutes. Then 3 ml of an ethanol solution containing an anti-oxidant was added thereto, and the pressure inside the autoclave was released, and then ethanol was poured into the polymerization solution and the polybutadiene was collected. And then, the collected polybutadiene was dried under vacuum at 80° C. for 3 hours. The yield of the polybutadiene was 24.2 g. The polymerization results are shown in Table B1-1.

Example B1-2

Modified polybutadiene was synthesized in the same way as in Example B1-1, except that 0.5 ml of a solution of heliotropin (HLT) in toluene (1 mol/L) was added thereto, instead of 0.5 ml of the solution of veratraldehyde (VTA) in toluene (1 mol/L) as the modifying agent. The yield of the polybutadiene was 20.2 g. The polymerization results are shown in Table B1-1.

Example B1-3

Modified polybutadiene was synthesized in the same way as in Example B1-1, except that 5 ml of a solution of 4,4'-bis(diethylamino)benzophenone (EAB) in toluene (0.1 mol/L) was added thereto, instead of 0.5 ml of the solution of veratraldehyde (VTA) in toluene (1 mol/L) as the modifying agent. The yield of the polybutadiene was 20.2 g. The polymerization results are shown in Table B1-1.

Example B1-4

Modified polybutadiene was synthesized in the same way as in Example B1-1, except that 0.14 ml of 3-methoxybenzyl chloride (MOBC) was added thereto, instead of 0.5 ml of the solution of veratraldehyde (VTA) in toluene (1 mol/L) as the modifying agent. The yield of the polybutadiene was 20.2 g. The polymerization results are shown in Table B1-1.

Reference Example B1-1

Polybutadiene was synthesized in the same way as in Example B1-1, except that the modifying agent was not added thereto after the butadiene was polymerized, and the modification reaction was not performed. The yield of the polybutadiene was 31.5 g. The polymerization results are shown in Table B1-1.

The properties of the obtained cis-1,4-polybutadienes are shown in Table B1-1.

Example B2-1

The interior of a 1.5 L autoclave was purged with nitrogen, and a solution of 250 ml of cyclohexane solvent and 250 ml of butadiene was placed in the autoclave. And then, 1.1 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) lanthanum (La(dpm)$_3$) in cyclohexane (0.01 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 1.25 ml of a solution of heliotropin (HLT) as a modifying agent in toluene (1 mol/L) was added thereto, and the modification reaction was performed at the same temperature for 10 minutes. Then 3 ml of an ethanol solution containing an anti-oxidant was added thereto, and the pressure inside the autoclave was released, and then ethanol was poured into the polymerization solution and the polybutadiene was collected. And then, the collected polybutadiene was dried under vacuum at 80° C. for 3 hours. The yield of the polybutadiene was 16.2 g. The polymerization results are shown in Table B2-1.

Example B2-2

Modified polybutadiene was synthesized in the same way as in Example B2-1, except that 12.5 ml of a solution of 4,4'-bis(diethylamino)benzophenone (EAB) in toluene (0.1 mol/L) was added thereto, instead of 1.25 ml of the solution of heliotropin (HLT) in toluene (1 mol/L) as the modifying agent. The yield of the polybutadiene was 18.1 g. The polymerization results are shown in Table B2-1.

Example B2-3

Modified polybutadiene was synthesized in the same way as in Example B2-1, except that 0.36 ml of 3-methoxybenzyl chloride (MOBC) was added thereto, instead of 1.25 ml of the solution of heliotropin (HLT) in toluene (1 mol/L) as the modifying agent. The yield of the polybutadiene was 16.2 g. The polymerization results are shown in Table B2-1.

Reference Example B2-1

Polybutadiene was synthesized in the same way as in Example B2-1, except that the modifying agent was not added thereto after the butadiene was polymerized under the condition that the amount of the cyclohexane solvent added was changed to 245 ml and the amount of the solution of triethyl aluminum (TEAL) in cyclohexane (2 mol/L) added was changed to 1.0 ml, and the modification reaction was not performed. The yield of the polybutadiene was 19.1 g. The polymerization results are shown in Table B2-1.

TABLE B1-1

| | Catalyst | Modifying agent | Degree of Modification | Cis (%) | Trans (%) | Vinyl (%) | Mn/10$^4$ | Mw/10$^4$ | Mw/Mn |
|---|---|---|---|---|---|---|---|---|---|
| Example B1-1 | Tb(dpm)$_3$ | VTA | 0.27 | 95.7 | 3.3 | 1.0 | 15.3 | 41.5 | 2.71 |
| Example B1-2 | Tb(dpm)$_3$ | HLT | 0.23 | 96.0 | 3.0 | 1.0 | 15.2 | 42.1 | 2.77 |
| Example B1-3 | Tb(dpm)$_3$ | EAB | 0.21 | 95.8 | 3.2 | 1.0 | 15.4 | 36.8 | 2.39 |
| Example B1-4 | Tb(dpm)$_3$ | MOBC | 0.12 | 95.8 | 3.3 | 1.0 | 15.5 | 38.0 | 2.45 |
| Reference Example B1-1 | Tb(dpm)$_3$ | — | 0.00 | 95.4 | 3.6 | 1.0 | 18.5 | 53.0 | 2.87 |

The properties of the obtained cis-1,4-polybutadienes are shown in Table B2-1.

TABLE B2-1

| | Catalyst | Modifying agent | Degree of Modification | Cis (%) | Trans (%) | Vinyl (%) | Mn/$10^4$ | Mw/$10^4$ | Mw/Mn |
|---|---|---|---|---|---|---|---|---|---|
| Example B2-1 | La(dpm)$_3$ | HLT | 0.15 | 95.2 | 4.0 | 0.8 | 17.3 | 44.9 | 2.59 |
| Example B2-2 | La(dpm)$_3$ | EAB | 0.31 | 95.8 | 3.4 | 0.8 | 16.3 | 47.8 | 2.93 |
| Example B2-3 | La(dpm)$_3$ | MOBC | 0.43 | 95.9 | 3.3 | 0.8 | 18.2 | 47.8 | 2.62 |
| Reference Example B2-1 | La(dpm)$_3$ | — | 0.00 | 94.3 | 4.7 | 1.1 | 19.7 | 44.7 | 2.27 |

Example B3-1

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) dysprosium (Dy(dpm)$_3$) in cyclohexane (0.005 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 0.5 ml of a solution of veratraldehyde (VTA) as a modifying agent in toluene (1 mol/L) was added thereto, and the modification reaction was performed at the same temperature for 10 minutes. Then 3 ml of an ethanol solution containing an anti-oxidant was added thereto, and the pressure inside the autoclave was released, and then ethanol was poured into the polymerization solution and the polybutadiene was collected. And then, the collected polybutadiene was dried under vacuum at 80° C. for 3 hours. The yield of the polybutadiene was 12.1 g. The polymerization results are shown in Table B3-1.

Example B3-2

Modified polybutadiene was synthesized in the same way as in Example B3-1, except that 0.5 ml of a solution of heliotropin (HLT) in toluene (1 mol/L) was added thereto, instead of 0.5 ml of the solution of veratraldehyde (VTA) in toluene (1 mol/L) as the modifying agent. The yield of the polybutadiene was 19.2 g. The polymerization results are shown in Table B3-1.

Example B3-3

Modified polybutadiene was synthesized in the same way as in Example B3-1, except that 0.14 ml of 3-methoxybenzyl chloride (MOBC) was added thereto, instead of 0.5 ml of the solution of veratraldehyde (VTA) in toluene (1 mol/L) as the modifying agent. The yield of the polybutadiene was 11.7 g. The polymerization results are shown in Table B3-1.

Example B3-4

Modified polybutadiene was synthesized in the same way as in Example B3-1, except that 5 ml of a solution of 4,4'-bis(diethylamino)benzophenone (EAB) in toluene (0.1 mol/L) was added thereto, instead of 0.5 ml of the solution of veratraldehyde (VTA) in toluene (1 mol/L) as the modifying agent. The yield of the polybutadiene was 14.9 g. The polymerization results are shown in Table B3-1.

Reference Example B3-1

Polybutadiene was synthesized in the same way as in Example B3-1, except that the modifying agent was not added thereto after the butadiene was polymerized under the condition that the amount of the cyclohexane solvent added was changed to 245 ml, and the modification reaction was not performed. The yield of the polybutadiene was 33.3 g. The polymerization results are shown in Table B3-1.

The properties of the obtained cis-1,4-polybutadienes are shown in Table B3-1.

TABLE B3-1

| | Catalyst | Modifying agent | Degree of Modification | Cis (%) | Trans (%) | Vinyl (%) | Mn/$10^4$ | Mw/$10^4$ | Mw/Mn |
|---|---|---|---|---|---|---|---|---|---|
| Example B3-1 | Dy(dpm)$_3$ | VTA | 0.25 | 95.7 | 3.3 | 1.0 | 12.3 | 29.3 | 2.37 |
| Example B3-2 | Dy(dpm)$_3$ | HLT | 0.12 | 95.8 | 3.2 | 0.9 | 14.6 | 38.6 | 2.65 |
| Example B3-3 | Dy(dpm)$_3$ | MOBC | 0.15 | 95.8 | 3.2 | 0.9 | 13.3 | 31.2 | 2.34 |
| Example B3-4 | Dy(dpm)$_3$ | EAB | 0.27 | 95.5 | 3.5 | 1.1 | 13.4 | 31.1 | 2.32 |
| Reference Example B3-1 | Dy(dpm)$_3$ | — | 0.00 | 95.3 | 3.8 | 0.9 | 18.3 | 60.3 | 3.29 |

Example B4-1

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) gadolinium (Gd(dpm)$_3$) in cyclohexane (0.005 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 0.4 ml of a solution of 3-glycidoxypropyl trimethoxy silane (GPTMS) as a modifying agent in cyclohexane (0.005 mol/L) was added thereto, and the modification reaction was performed at the same temperature for 10 minutes. Then 3 ml of an ethanol solution containing an anti-oxidant was added thereto, and the pressure inside the autoclave was released, and then ethanol was poured into the polymerization solution and the polybutadiene was collected. And then, the collected polybutadiene was dried under vacuum at 80° C. for 3 hours. The yield of the polybutadiene was 30.3 g. The polymerization results are shown in Table B4-1.

Example B4-2

Modified polybutadiene was synthesized in the same way as in Example B4-1, except that the amount of the solution of 3-glycidoxypropyl trimethoxy silane (GPTMS) in cyclohexane (0.005 mol/L) as the modifying agent added was changed to 0.8 ml. The yield of the polybutadiene was 20.1 g. The polymerization results are shown in Table B4-1.

Reference Example B4-3

Polybutadiene was synthesized in the same way as in Example B4-1, except that the modifying agent was not added thereto after the butadiene was polymerized under the condition that the amount of the cyclohexane solvent added was changed to 245 ml and the amount of the solution of triethyl aluminum (TEAL) in cyclohexane (2 mol/L) added was changed to 1.4 ml, and the modification reaction was not performed. The yield of the polybutadiene was 27.6 g.

The properties of the obtained cis-1,4-polybutadienes are shown in Table B4-1.

TABLE B4-1

|  | GPTMS/M ratio | GPC-RI area ratio | Gelation | Cis (%) | Trans (%) | Vinyl (%) | $Mn/10^4$ | $Mw/10^4$ | Mw/Mn |
|---|---|---|---|---|---|---|---|---|---|
| Example B4-1 | 1 | 1.00 | absence | 95.1 | 4.0 | 0.9 | 17.6 | 50.5 | 2.87 |
| Example B4-2 | 2 | 1.00 | absence | 95.3 | 3.8 | 0.9 | 14.0 | 34.3 | 2.46 |
| Example B4-3 | 5 | 0.93 | absence | 94.9 | 4.2 | 0.9 | 17.8 | 48.7 | 2.74 |
| Reference Example B4-1 | 10 | 0.87 | presence | 95.0 | 4.1 | 0.9 | 18.4 | 72.5 | 3.93 |
| Reference Example B4-2 | 250 | 0.33 | presence | 95.5 | 3.6 | 0.9 | 18.9 | 62.9 | 3.32 |
| Reference Example B4-3 | 0 | 1.00 | absence | 95.2 | 3.9 | 0.9 | 17.1 | 46.9 | 2.74 |

Example B4-3

Modified polybutadiene was synthesized in the same way as in Example B4-1, except that the amount of the solution of 3-glycidoxypropyl trimethoxy silane (GPTMS) in cyclohexane (0.005 mol/L) as the modifying agent added was changed to 2.0 ml. The yield of the polybutadiene was 30.5 g. The polymerization results are shown in Table B4-1.

Reference Example B4-1

Modified polybutadiene was synthesized in the same way as in Example B4-1, except that the amount of the solution of 3-glycidoxypropyl trimethoxy silane (GPTMS) in cyclohexane (0.005 mol/L) as the modifying agent added was changed to 4.0 ml. The yield of the polybutadiene was 30.4 g. The polymerization results are shown in Table B4-1.

Reference Example B4-2

Modified polybutadiene was synthesized in the same way as in Example B4-1, except that the amount of the cyclohexane solvent added was changed to 245 ml, and the amount of the solution of triethyl aluminum (TEAL) in cyclohexane (2 mol/L) added was changed to 1.25 ml, and 1.0 ml of a solution of 3-glycidoxypropyl trimethoxy silane (GPTMS) in cyclohexane (0.5 mol/L) was added thereto as the modifying agent. The yield of the polybutadiene was 37.6 g. The polymerization results are shown in Table B4-1.

Example C1-1

(1) Production of Cis-1,4 Component

The interior of a 1.5 L autoclave was purged with nitrogen, and a solution of 400 ml of cyclohexane and 400 ml of 1,3-butadiene was placed in the autoclave, and then 4.0 ml of a solution of triethyl aluminum (TEAL) in cyclohexane (2 mol/L) was added thereto. Subsequently, 0.40 ml of a solution of tris(2,2,6,6-tetramethylheptane-3,5-dionato)terbium in cyclohexane (10 mmol/L) was added thereto, and then 2.0 ml of a solution of triphenylcarbenium tetrakis (pentafluorophenyl)borate in toluene (0.004 mol/L) was added thereto, and the polymerization was initiated and the polymerization was performed at 50° C. for 25 minutes.

(2) Production of Syndiotactic-1,2 Component

Subsequently, 33.5 µl of water and 0.80 ml of a solution of carbon disulfide ($CS_2$) in cyclohexane (0.25 mol/L) were added thereto. And then, 2.0 ml of a solution of cobalt octylate ($Co(Oct)_2$) in cyclohexane (0.020 mol/L) was added thereto, and the polymerization was initiated. The polymerization was performed at 60° C. for 15 minutes, and then 6.0 ml of an ethanol/heptane (1/1) solution containing an antioxidant was added thereto, to terminate the polymerization. The pressure inside the autoclave was released, and then the polybutadiene was collected. And then, the collected polybutadiene was dried under vacuum at 80° C. for 3 hours. The polymerization results are shown in Table C-1.

Reference Example C1-1

The interior of a 1.5 L autoclave was purged with nitrogen, and a solution of 400 ml of cyclohexane and 400 ml of 1,3-butadiene was placed in the autoclave, and then 4.0 ml of a solution of triethyl aluminum (TEAL) in cyclohexane (2 mol/L) was added thereto. Subsequently, 0.40 ml of a solution of tris(2,2,6,6-tetramethylheptane-3,5-dionato)terbium in cyclohexane (10 mmol/L) was added thereto, and then 2.0 ml of a solution of triphenylcarbenium tetrakis(pentafluorophenyl)borate in toluene (0.004 mol/L) was added thereto, and the polymerization was initiated and the polymerization was performed at 50° C. for 25 minutes. The polymerization results are shown in Table C-1.

Example C2-1

(1) Production of Cis-1,4 Component

The interior of a 1.5 L autoclave was purged with nitrogen, and a solution of 250 ml of cyclohexane and 250 ml of 1,3-butadiene was placed in the autoclave, and then 1.3 ml of a solution of triethyl aluminum (TEAL) in cyclohexane (2 mol/L) was added thereto. Subsequently, 0.50 ml of a solution of tris(2,2,6,6-tetramethylheptane-3,5-dionato)lanthanum in cyclohexane (10 mmol/L) was added thereto, and then 2.5 ml of a solution of triphenylcarbenium tetrakis(pentafluorophenyl)borate in toluene (0.004 mol/L) was added thereto, and the polymerization was initiated and the polymerization was performed at 50° C. for 25 minutes.

(2) Production of Syndiotactic-1,2 Component

Subsequently, 10.8 μl of water and 0.50 ml of a solution of carbon disulfide ($CS_2$) in cyclohexane (0.25 mol/L) were added thereto. And then, 1.25 ml of a solution of cobalt octylate ($Co(Oct)_2$) in cyclohexane (0.020 mol/L) was added thereto, and the polymerization was initiated. The polymerization was performed at 60° C. for 15 minutes, and then 3.0 ml of an ethanol/heptane (1/1) solution containing an anti-oxidant was added thereto, to terminate the polymerization. The pressure inside the autoclave was released, and then the polybutadiene was collected. And then, the collected polybutadiene was dried under vacuum at 80° C. for 3 hours. The polymerization results are shown in Table C-1.

Reference Example C2-1

The interior of a 1.5 L autoclave was purged with nitrogen, and a solution of 250 ml of cyclohexane and 250 ml of 1,3-butadiene was placed in the autoclave, and then 1.3 ml of a solution of triethyl aluminum (TEAL) in cyclohexane (2 mol/L) was added thereto. Subsequently, 0.50 ml of a solution of tris(2,2,6,6-tetramethylheptane-3,5-dionato)lanthanum in cyclohexane (10 mmol/L) was added thereto, and then 2.5 ml of a solution of triphenylcarbenium tetrakis(pentafluorophenyl)borate in toluene (0.004 mol/L) was added thereto, and the polymerization was initiated and the polymerization was performed at 50° C. for 25 minutes. The polymerization results are shown in Table C-1.

Example C3-1

(1) Production of Cis-1,4 Component

The interior of a 1.5 L autoclave was purged with nitrogen, and a solution of 400 ml of cyclohexane and 400 ml of 1,3-butadiene was placed in the autoclave, and then 4.0 ml of a solution of triethyl aluminum (TEAL) in cyclohexane (2 mol/L) was added thereto. Subsequently, 0.80 ml of a solution of tris(2,2,6,6-tetramethylheptane-3,5-dionato)dysprosium in cyclohexane (5 mmol/L) was added thereto, and then 2.0 ml of a solution of triphenylcarbenium tetrakis(pentafluorophenyl)borate in toluene (0.004 mol/L) was added thereto, and the polymerization was initiated and the polymerization was performed at 50° C. for 25 minutes.

(2) Production of Syndiotactic-1,2 Component

Subsequently, 33.5 μl of water and 0.80 ml of a solution of carbon disulfide ($CS_2$) in cyclohexane (0.25 mol/L) were added thereto. And then, 2.0 ml of a solution of cobalt octylate ($Co(Oct)_2$) in cyclohexane (0.020 mol/L) was added thereto, and the polymerization was initiated. The polymerization was performed at 60° C. for 15 minutes, and then 6.0 ml of an ethanol/heptane (1/1) solution containing an anti-oxidant was added thereto, to terminate the polymerization. The pressure inside the autoclave was released, and then the polybutadiene was collected. And then, the collected polybutadiene was dried under vacuum at 80° C. for 3 hours. The polymerization results are shown in Table C-1.

Reference Example C3-1

The interior of a 1.5 L autoclave was purged with nitrogen, and a solution of 400 ml of cyclohexane and 400 ml of 1,3-butadiene was placed in the autoclave, and then 4.0 ml of a solution of triethyl aluminum (TEAL) in cyclohexane (2 mol/L) was added thereto. Subsequently, 0.80 ml of a solution of tris(2,2,6,6-tetramethylheptane-3,5-dionato)dysprosium in cyclohexane (5 mmol/L) was added thereto, and then 2.0 ml of a solution of triphenylcarbenium tetrakis(pentafluorophenyl)borate in toluene (0.004 mol/L) was added thereto, and the polymerization was initiated and the polymerization was performed at 50° C. for 25 minutes. The polymerization results are shown in Table C-1.

Reference Example C1-2

(1) Production of Cis-1,4 Component

The interior of a 2 L autoclave was purged with nitrogen, and a solution of 390 ml of toluene and 210 ml of 1,3-butadiene was placed in the autoclave, and then 0.9 ml of a solution of diethyl aluminum hydride (DEAH) in toluene (2 mol/L) was added thereto. Subsequently, 1.8 ml of a solution of tris(2,2,6,6-tetramethylheptane-3,5-dionato)yttrium in toluene (20 mmol/L) was added thereto. And then, 0.18 ml of a solution of triphenylcarbenium tetrakis(pentafluorophenyl)borate in toluene (0.43 mol/L) was added thereto, and the polymerization was initiated and the polymerization was performed at 40° C. for 30 minutes.

(2) Production of Syndiotactic-1,2 Component

Subsequently, 1.8 ml of a solution of triethyl aluminum (TEAL) in toluene (1 mol/L) was added thereto, and then water was added thereto such that the concentration was 1.0 mmol/L, and 1.8 ml of a solution of cobalt octylate (Co$(Oct)_2$) in toluene (0.05 mol/L) and 0.36 ml of a solution of carbon disulfide ($CS_2$) in toluene (1 mol/L) were added thereto, and then the polymerization was further performed at 40° C. for 10 minutes. Then 5 ml of an ethanol/heptane (1/1) solution containing an anti-oxidant was added thereto, to terminate the polymerization. The pressure inside the autoclave was released, and then the polymerization solution was poured into ethanol and the polybutadiene was collected. And then, the collected polybutadiene was dried under vacuum at 80° C. for 6 hours. The polymerization results are shown in Table C-1.

Reference Example C1-3

The interior of a 2 L autoclave was purged with nitrogen, and a solution of 390 ml of toluene and 210 ml of 1,3-butadiene was placed in the autoclave, and then 0.9 ml of a solution of diethyl aluminum hydride (DEAH) in toluene (2 mol/L) was added thereto. Subsequently, 1.8 ml of a solution of tris(2,2,6,6-tetramethylheptane-3,5-dionato)yttrium in toluene (20 mmol/L) was added thereto. And then, 0.18 ml of a solution of triphenylcarbenium tetrakis(pentafluorophenyl)borate in toluene (0.43 mol/L) was added thereto, and the polymerization was initiated and the polymerization was performed at 40° C. for 30 minutes. Then 5 ml of an ethanol/heptane (1/1) solution containing an anti-oxidant was added thereto, to terminate the polymerization. The pressure inside the autoclave was released, and then the polymerization solution was poured into ethanol and the polybutadiene was collected. And then, the collected polybutadiene was dried under vacuum at 80° C. for 6 hours. The polymerization results are shown in Table C-1.

Table C4-1, using the VCR synthesized according to Synthesis Example C4-1, by performing the first compounding in which natural rubber, carbon black, an oil (naphthenic oil made by Japan Energy Corporation), zinc oxide, stearic acid, and an anti-oxidant (NOCRAC 6C made by Ouchi Shinko Chemical Industrial Co., Ltd.) were added to the VCR, and the mixture was kneaded using a banbury mixer; and then performing the second compounding in which a vulcanizing accelerator (Nocceler CZ made by Ouchi Shinko Chemical Industrial Co., Ltd.) and sulfur were added thereto in a roll.

TABLE C-1

|  | Central metal | Catalytic activity (kg/mmol-Cat.) | TEAL (mM) | $H_2O$ (mM) | $Co(Oct)_2$ (mM) | $CS_2$ (mM) | Yield (g/L) | $ML_{1+4}$ (100° C.) | H.I. (%) | Tm (° C.) |
|---|---|---|---|---|---|---|---|---|---|---|
| Example C1-1 | terbium | 15.3 | 10 | 2.3 | 0.05 | 0.25 | 76.6 | 58 | 7.9 | 196.8 |
| Reference Example C1-1 | terbium | 13.7 | 10 | — | — | — | 68.5 | 27 | — | — |
| Example C2-1 | lanthanum | 3.4 | 5.2 | 1.2 | 0.05 | 0.25 | 34.2 | 67 | 22.7 | 201.1 |
| Reference Example C2-1 | lanthanum | 4.3 | 5.2 | — | — | — | 42.7 | 21 | — | — |
| Example C3-1 | dysprosium | 13.6 | 10 | 2.3 | 0.05 | 0.25 | 67.9 | 48 | 9.2 | 197.4 |
| Reference Example C3-1 | dysprosium | 13.3 | 10 | — | — | — | 66.7 | 27 | — | — |
| Reference Example C1-2 | yttrium | 1.7 | 3.0 | 1.0 | 0.15 | 0.60 | 104.8 | 92 | 14.2 | 204.6 |
| Reference Example C1-3 | yttrium | 1.3 | — | — | — | — | 79.5 | 32 | — | — |

Synthesis Example C4-1

The interior of a 1.5 L autoclave was purged with nitrogen, and a solution of 550 ml of cyclohexane and 550 ml of 1,3-butadiene was placed in the autoclave, and then 1.65 ml of a solution of triethyl aluminum (TEAL) in cyclohexane (2 mol/L) was added thereto. Subsequently, 1.1 ml of a solution of tris(2,2,6,6-tetramethylheptane-3,5-dionato)gadolinium in cyclohexane (10 mmol/L), 0.43 ml of a solution of diisobutyl aluminum hydride in cyclohexane (1 mol/L) and 2.75 ml of a solution of triphenylcarbenium tetrakis(pentafluorophenyl)borate in toluene (0.004 mol/L) were added thereto, and the polymerization was initiated and the cis-1,4-polymerization was performed at 50° C. for 25 minutes. Subsequently, 15.9 μl of water and 1.1 ml of a solution of carbon disulfide ($CS_2$) in cyclohexane (0.25 mol/L) were added thereto. And then, 3.3 ml of a solution of cobalt octylate ($Co(Oct)_2$) in cyclohexane (0.020 mol/L) was added thereto, and the syndiotactic-1,2-polymerization was initiated. The polymerization was performed at 60° C. for 15 minutes, and then 6.0 ml of an ethanol/heptane (1/1) solution containing an anti-oxidant was added thereto, to terminate the polymerization. The pressure inside the autoclave was released, and then the polybutadiene was collected. And then, the collected polybutadiene was dried under vacuum at 80° C. for 3 hours.

Synthesis Example C4-2

Polybutadiene was synthesized in the same way as in Synthesis Example C4-1, except that 4.7 ml of a solution of cobalt octylate ($Co(Oct)_2$) in cyclohexane (0.035 mol/L) was added thereto, instead of adding 3.3 ml of a solution of cobalt octylate ($Co(Oct)_2$) in cyclohexane (0.020 mol/L), after the cis-1,4-polymerization was performed.

Example C4-1

A compounded rubber composition was produced in accordance with the compounding formulation shown in Table C4-1, using the VCR synthesized according to Synthesis Example C4-1, by performing the first compounding in which natural rubber, carbon black, an oil (naphthenic oil made by Japan Energy Corporation), zinc oxide, stearic acid, and an anti-oxidant (NOCRAC 6C made by Ouchi Shinko Chemical Industrial Co., Ltd.) were added to the VCR, and the mixture was kneaded using a banbury mixer; and then performing the second compounding in which a vulcanizing accelerator (Nocceler CZ made by Ouchi Shinko Chemical Industrial Co., Ltd.) and sulfur were added thereto in a roll.

The obtained compounded rubber composition was press-vulcanized at 150° C. for 15 minutes, to provide a test piece for evaluation. The results of the determination of various properties of the composition are shown in Table C4-2.

Example C4-2

A compounded rubber composition was produced, and press-vulcanized to provide a test piece for evaluation in the same way as in Example C4-1, except that the VCR synthesized according to Synthesis Example C4-2 was used, instead of the VCR synthesized according to Synthesis Example C4-1. The results of the determination of various properties of the composition are shown in Table C4-3.

Comparative Example C4-1

A compounded rubber composition was produced, and press-vulcanized to provide a test piece for evaluation in the same way as in Example C4-1, except that UBEPOL VCR412 made by Ube Industries, Ltd. (VCR polymerized using a Co-based catalyst as the catalyst for the cis-1,4-polymerization and having a H.I. of 12%) was used, instead of the VCR synthesized according to Synthesis Example C4-1. The results of the determination of various properties of the composition are shown in Table C4-2.

Comparative Example C4-2

A compounded rubber composition was produced, and press-vulcanized to provide a test piece for evaluation in the same way as in Example C4-1, except that UBEPOL VCR617 made by Ube Industries, Ltd. (VCR polymerized using a Co-based catalyst as the catalyst for the cis-1,4-polymerization and having a H.I. of 17%) was used, instead of the VCR synthesized according to Synthesis Example C4-1. The results of the determination of various properties of the composition are shown in Table C4-3.

The compounding formulations are shown in Table C4-1. The numerical values in Table C4-1 are expressed in terms of "parts by mass".

TABLE C4-1

Compounding formulation (parts by mass)

|  | Example C4-1 | Example C4-2 | Comparative Example C4-1 | Comparative Example C4-2 |
|---|---|---|---|---|
| Synthesis Example C4-1 | 50 | | | |
| Synthesis Example C4-2 | | 50 | | |
| UBEPOL VCR412 | | | 50 | |
| UBEPOL VCR617 | | | | 50 |
| natural rubber | 50 | 50 | 50 | 50 |
| carbon black | 50 | 50 | 50 | 50 |
| oil | 10 | 10 | 10 | 10 |
| Chinese white (ZnO) | 3 | 3 | 3 | 3 |
| stearic acid | 2 | 2 | 2 | 2 |
| anti-oxidant | 1 | 1 | 1 | 1 |
| vulcanizing accelerator | 1 | 1 | 1 | 1 |
| sulfur | 1.5 | 1.5 | 1.5 | 1.5 |

The results of the evaluations of the VCRs having a H.I. of 12% (Example C4-1, Comparative Example C4-1) are shown in Table C4-2. The numerical values of the fatigue resistance and the abrasion resistance are expressed on the assumption that the values of Comparative Example C4-1, in which UBEPOL VCR412 made by Ube Industries, Ltd. was used, is taken as the standard (100). The property is better as the numerical value is greater.

TABLE C4-2

Result of evaluation

|  | Central metal of Catalyst for cis-1,4-polymerization | H.I. (%) | Raw rubber Mooney viscosity | Fatigue resistance* | Abrasion resistance* |
|---|---|---|---|---|---|
| Example C4-1 | gadolinium | 12 | 45 | 122 | 102 |
| Comparative Example C4-1 | cobalt | 12 | 45 | 100 | 100 |

*Index number on the assumption that the value of Comparative Example C4-1 is 100

As shown in Table C4-2, the composition of Example C4-1 which comprises the VCR obtained in Synthesis Example C4-1 has better fatigue resistance and abrasion resistance than the composition of Comparative Example C4-1.

The results of the evaluations of the VCRs having a H.I. of 17% (Example C4-2, Comparative Example C4-2) are shown in Table C4-3. The numerical values of the fatigue resistance and the abrasion resistance are expressed on the assumption that the values of Comparative Example C4-2, in which UBEPOL VCR617 made by Ube Industries, Ltd. was used, is taken as the standard (100). The property is better as the numerical value is greater.

TABLE C4-3

Result of evaluation

|  | Central metal of Catalyst for cis-1,4-polymerization | H.I. (%) | Raw rubber Mooney viscosity | Fatigue resistance* | Abrasion resistance* |
|---|---|---|---|---|---|
| Example C4-2 | gadolinium | 17 | 53 | 132 | 105 |
| Comparative Example C4-2 | cobalt | 17 | 62 | 100 | 100 |

*Index number on the assumption that the value of Comparative Example C4-2 is 100

As shown in Table C4-3, the composition of Example C4-2 which comprises the VCR obtained in Synthesis Example C4-2 has better fatigue resistance and abrasion resistance than the composition of Comparative Example C4-2.

Example D-1

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.75 ml of a solution of triphenylcarbenium tetrakis(pentafluorophenyl)borate in toluene (0.004 mol/L) was added thereto, and then 0.15 ml of a solution of tris(2,2,6,6-tetramethyl-3,5-heptanedionato)terbium (Tb(dpm)$_3$) in cyclohexane (0.01 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-2

The interior of a 1.5 L autoclave was purged with nitrogen, and a solution of 245 ml of toluene solvent and 255 ml of butadiene was placed in the autoclave. And then, 0.5 ml of a solution of triethyl aluminum (TEAL) in cyclohexane (2 mol/L) was added thereto. Subsequently, 1.35 ml of a solution of tris(2,2,6,6-tetramethyl-3,5-heptanedionato)terbium (Tb(dpm)$_3$) in cyclohexane (0.005 mol/L) was added thereto, and then 3.40 ml of a solution of triphenylcarbenium tetrakis(pentafluorophenyl)borate in toluene (0.004 mol/L) was added thereto. The polymerization was performed at 40° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-3

The interior of a 1.5 L autoclave was purged with nitrogen, and a solution of 250 ml of cyclohexane solvent and 250 ml of butadiene was placed in the autoclave. And then, 0.60 ml of a solution of diisobutyl aluminum hydride (DIBAH) in cyclohexane (0.85 mol/L) was added thereto. Subsequently, 2.0 ml of a solution of triphenylcarbenium tetrakis(pentafluorophenyl)borate in toluene (0.004 mol/L) was added thereto, and then 0.80 ml of a solution of tris(2,2,6,6-tetramethyl-3,5-heptanedionato)terbium (Tb(dpm)$_3$) in cyclohexane (0.005 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-4

The interior of a 1.5 L autoclave was purged with nitrogen, and a solution of 250 ml of cyclohexane solvent and 250 ml of butadiene was placed in the autoclave. And then, 1.68 ml of a solution of triisobutyl aluminum (TIBA) in cyclohexane (1.80 mol/L) was added thereto. Subsequently, 2.0 ml of a solution of triphenylcarbenium tetrakis(pentafluorophenyl)borate in toluene (0.004 mol/L) was added thereto, and then 0.80 ml of a solution of tris(2,2,6,6-tetramethyl-3,5-heptanedionato)terbium (Tb(dpm)$_3$) in cyclohexane (0.005 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-5

The interior of a 1.5 L autoclave was purged with nitrogen, and a solution of 250 ml of cyclohexane solvent and 250 ml of butadiene was placed in the autoclave. And then, 0.59 ml of a solution of diisobutyl aluminum hydride (DIBAH) in cyclohexane (0.85 mol/L) was added thereto. Subsequently, 0.8 ml of a solution of tris(2,2,6,6-tetramethyl-3,5-heptanedionato)dysprosium (Dy(dpm)$_3$) in cyclohexane (0.005 mol/L) was added thereto, and then 2.0 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-6

The interior of a 1.5 L autoclave was purged with nitrogen, and a solution of 245 ml of cyclohexane solvent and 250 ml of butadiene was placed in the autoclave. And then, 0.75 ml of a solution of triethyl aluminum (TEAL) in cyclohexane (2 mol/L) was added thereto. Subsequently, 0.5 ml of a solution of tris(2,2,6,6-tetramethyl-3,5-heptanedionato)lanthanum (La(dpm)$_3$) in toluene (0.01 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-7

The interior of a 1.5 L autoclave was purged with nitrogen, and a solution of 245 ml of cyclohexane solvent and 250 ml of butadiene was placed in the autoclave. And then, 0.5 ml of a solution of triethyl aluminum (TEAL) in cyclohexane (2 mol/L) was added thereto. Subsequently, 0.5 ml of a solution of tris(2,2,6,6-tetramethyl-3,5-heptanedionato)lanthanum (La(dpm)$_3$) in toluene (0.01 mol/L) was added thereto, and then 2.5 ml of a solution of triphenylcarbenium tetrakis(pentafluorophenyl)borate in toluene (0.004 mol/L) was added thereto. The polymerization was performed at 20° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

Example D-8

Polybutadiene was synthesized in the same way as in Example D-7, except that the order of the addition of 0.5 ml of the solution of tris(2,2,6,6-tetramethyl-3,5-heptanedionato)lanthanum (La(dpm)$_3$) in toluene (0.01 mol/L) and 2.5 ml of the solution of triphenylcarbenium tetrakis(pentafluorophenyl)borate in toluene (0.004 mol/L) was reversed. The polymerization results are shown in Table D-1.

Example D-9

The interior of a 1.5 L autoclave was purged with nitrogen, and a solution of 250 ml of cyclohexane solvent and 250 ml of butadiene was placed in the autoclave. And then, 0.59 ml of a solution of diisobutyl aluminum hydride (DIBAH) in cyclohexane (0.85 mol/L) was added thereto. Subsequently, 0.8 ml of a solution of tris(2,2,6,6-tetramethyl-3,5-heptanedionato)lanthanum (La(dpm)$_3$) in cyclohexane (0.005 mol/L) was added thereto, and then 2.0 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table D-1.

TABLE D-1

| | Catalyst | Yield (g/L) | Catalytic activity (g/mmol-Cat/h) | Cis (%) | Trans (%) | Vinyl (%) | $Mn/10^4$ | $Mw/10^4$ | Mw/Mn |
|---|---|---|---|---|---|---|---|---|---|
| Example A1-1 | Tb(dpm)$_3$ | 68.8 | 41,448 | 96.3 | 2.8 | 0.9 | 26.1 | 80.3 | 3.07 |
| Example D-1 | Tb(dpm)$_3$ | 56.2 | 58,304 | 95.5 | 3.5 | 1.0 | 19.9 | 63.0 | 3.17 |
| Example D-2 | Tb(dpm)$_3$ | 23.4 | 4,165 | 97.9 | 1.4 | 0.8 | 31.6 | 100.5 | 3.18 |
| Example D-3 | Tb(dpm)$_3$ | 52.4 | 15,816 | 98.0 | 0.8 | 1.2 | 15.6 | 46.6 | 2.98 |
| Example D-4 | Tb(dpm)$_3$ | 14.5 | 4,332 | 98.1 | 0.7 | 1.1 | 17.9 | 54.9 | 3.07 |
| Example D-5 | Dy(dpm)$_3$ | 42.4 | 12,720 | 98.1 | 0.8 | 1.2 | 17.0 | 49.9 | 2.94 |
| Example D-6 | La(dpm)$_3$ | 56.7 | 13,600 | 96.2 | 3.0 | 0.8 | 27.7 | 69.6 | 2.51 |
| Example D-7 | La(dpm)$_3$ | 42.0 | 10,056 | 99.6 | 0.2 | 0.1 | 63.3 | 151.9 | 2.40 |
| Example D-8 | La(dpm)$_3$ | 39.3 | 9,394 | 99.1 | 0.8 | 0.1 | 37.3 | 81.6 | 2.19 |
| Example D-9 | La(dpm)$_3$ | 43.6 | 13,080 | 98.6 | 0.6 | 0.8 | 13.9 | 37.2 | 2.68 |

The polymerization results of Example A1-1 are also shown in Table D-1.

Example E-1

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) holmium (Ho(dpm)$_3$) in toluene (0.01 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-1.

Example E-2

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) holmium (Ho(dpm)$_3$) in toluene (0.01 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 1.0 ml of a solution of 4,4'-bis(diethylamino)benzophenone (EAB) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-3

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.5 ml of a solution of triphenylcarbenium tetrakis(pentafluorophenyl)borate in toluene (0.004 mol/L) was added thereto, and then 0.5 ml of a solution of tris(2,2,6,6-tetramethyl-3,5-heptanedionato)holmium (Ho(dpm)$_3$) in toluene (0.01 mol/L) was added thereto. The polymerization was performed at 50° C. for 25 minutes, and then 1.0 ml of a solution of heliotropin (HLT) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-4

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato)erbium (Er(dpm)$_3$) in cyclohexane (0.01 mol/L) was added thereto, and then 2.5 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-1.

Example E-5

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato)erbium (Er(dpm)$_3$) in toluene (0.01 mol/L) was added thereto, and then 2.5 ml of a solution of triphenylcarbenium (pentafluorophenyl)borate in toluene (0.004 mol/L) was added thereto. The polymerization was performed at 50° C. for 25 minutes, and then 1.0 ml of a solution of 4,4'-bis (diethylamino)benzophenone (EAB) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-6

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.5 ml of a solution of triphenylcarbenium tetrakis(pentafluorophenyl)borate in toluene (0.004 mol/L) was added thereto, and then 0.5 ml of a solution of tris(2,2,6,6-tetramethyl-3,5-heptanedionato)erbium (Er(dpm)$_3$) in toluene (0.01 mol/L) was added thereto. The polymerization was performed at 50° C. for 25 minutes, and then 1.0 ml of a solution of heliotropin (HLT) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-7

Modified polybutadiene was synthesized in the same way as in Example E-5, except that the modifying agent, and the amount of the modifying agent added was changed to 0.1 ml of 3-glycidoxypropyl trimethoxy silane (GPTMS). The polymerization results are shown in Table E-1.

Example E-8

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) thulium (Tm(dpm)$_3$) in cyclohexane (0.01 mol/L) was added thereto, and then 2.5 ml of a solution of trip henylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-1.

Example E-9

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) thulium (Tm(dpm)$_3$) in toluene (0.01 mol/L) was added thereto, and then 2.5 ml of a solution of triphenylcarbenium tetrakis(pentafluorophenyl)borate in toluene (0.004 mol/L) was added thereto. The polymerization was performed at 50° C. for 25 minutes, and then 1.0 ml of a solution of 4,4'-bis (diethylamino)benzophenone (EAB) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-10

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.5 ml of a solution of triphenylcarbenium tetrakis(pentafluorophenyl)borate in toluene (0.004 mol/L) was added thereto, and then 0.5 ml of a solution of tris(2,2,6,6-tetramethyl-3,5-heptanedionato)thulium (Tm(dpm)$_3$) in toluene (0.01 mol/L) was added thereto. The polymerization was performed at 50° C. for 25 minutes, and then 1.0 ml of a solution of heliotropin (HLT) as a modifying agent in toluene (1 mol/L) was added thereto, and the modification reaction was performed at the same temperature for 5 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-11

Modified polybutadiene was synthesized in the same way as in Example E-9, except that the modifying agent, and the amount of the modifying agent added was changed to 0.1 ml of 3-glycidoxypropyl trimethoxy silane (GPTMS). The polymerization results are shown in Table E-1.

Production Example E-12

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) praseodymium (Pr(dpm)$_3$) in cyclohexane (0.005 mol/L) was added thereto, and then 2.5 ml of a solution of triphenylcarbenium tetrakis(pentafluorophenyl)borate in toluene (0.004 mol/L) was added thereto. The polymerization was performed at 20° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-1.

Example E-13

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) praseodymium $(Pr(dpm)_3)$ in toluene (0.005 mol/L) was added thereto, and then 2.5 ml of a solution of trip henylcarbenium tetrakis(pentafluorophenyl)borate in toluene (0.004 mol/L) was added thereto. The polymerization was performed at 20° C. for 25 minutes, and then 0.5 ml of a solution of 4,4'-bis(diethylamino)benzophenone (EAB) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-1.

Example E-14

Modified polybutadiene was synthesized in the same way as in Example E-13, except that the modifying agent was changed to a solution of heliotropin (HLT) in toluene (1 mol/L). The polymerization results are shown in Table E-1.

Example E-15

Modified polybutadiene was synthesized in the same way as in Example E-13, except that the modifying agent, and the amount of the modifying agent added was changed to 0.1 ml of 3-glycidoxypropyl trimethoxy silane (GPTMS). The polymerization results are shown in Table E-1.

Example E-16

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) lanthanum $(La(dpm)_3)$ in toluene (0.01 mol/L) was added thereto, and then 2.5 ml of a solution of trip henylcarbenium tetrakis(pentafluorophenyl)borate in toluene (0.004 mol/L) was added thereto. The polymerization was performed at 20° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-2.

Example E-17

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 0.5 ml of a solution of tris(2,2,6,6-tetramethyl-3,5-heptanedionato) lanthanum $(La(dpm)_3)$ in toluene (0.01 mol/L) was added thereto, and then 2.5 ml of a solution of trip henylcarbenium tetrakis(pentafluorophenyl)borate in toluene (0.004 mol/L) was added thereto. The polymerization was performed at 20° C. for 25 minutes, and then 0.5 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

Example E-18

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) lanthanum $(La(dpm)_3)$ in cyclohexane (0.005 mol/L) was added thereto, and then 1.5 ml of a solution of diisobutyl aluminum hydride (DIBAH) in cyclohexane (0.1 mol/L) and 2.5 ml of a solution of triphenylcarbenium tetrakis(pentafluorophenyl)borate in toluene (0.004 mol/L) were added thereto. The polymerization was performed at 20° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-2.

Example E-19

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) lanthanum $(La(dpm)_3)$ in cyclohexane (0.005 mol/L) was added thereto, and then 1.5 ml of a solution of diisobutyl aluminum hydride (DIBAH) in cyclohexane (0.1 mol/L) and 2.5 ml of a solution of triphenylcarbenium tetrakis(pentafluorophenyl)borate in toluene (0.004 mol/L) were added thereto. The polymerization was performed at 20° C. for 25 minutes, and then 0.5 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected polybutadiene was dried under vacuum at 80° C. for 3 hours. The polymerization results are shown in Table E-2.

Example E-20

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.0 ml of a solution of tris(2,2,6,6-tetramethyl-3,5-heptanedionato) lanthanum (La(dpm)$_3$) in cyclohexane (0.005 mol/L) was added thereto, and then 2.5 ml of a solution of triphenylcarbenium tetrakis(pentafluorophenyl)borate in toluene (0.004 mol/L) was added thereto. The polymerization was performed at 10° C. for 25 minutes, and then 0.5 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

Example E-21

Modified polybutadiene was synthesized in the same way as in Example E-20, except that the polymerization temperature was changed to 30° C., and the polymerization time was changed to 15 minutes, and the modification reaction temperature was changed to 30° C. The polymerization results are shown in Table E-2.

Example E-22

Modified polybutadiene was synthesized in the same way as in Example E-20, except that the polymerization temperature and the modification reaction temperature were changed to 40° C. The polymerization results are shown in Table E-2.

Example E-23

Modified polybutadiene was synthesized in the same way as in Example E-20, except that the polymerization temperature was changed to 20° C., and the polymerization time was changed to 15 minutes. The polymerization results are shown in Table E-2.

Example E-24

Modified polybutadiene was synthesized in the same way as in Example E-20, except that the polymerization temperature was changed to 20° C., and the polymerization time was changed to 40 minutes. The polymerization results are shown in Table E-2.

Example E-25

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 1.5 ml of a solution of tris(2,2,6,6-tetramethyl-3,5-heptanedionato) lanthanum (La(dpm)$_3$) in cyclohexane (0.005 mol/L) was added thereto, and then 3.75 ml of a solution of triphenylcarbenium tetrakis(pentafluorophenyl)borate in toluene (0.004 mol/L) was added thereto. The polymerization was performed at 20° C. for 25 minutes, and then 0.75 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

Example E-26

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.0 ml of a solution of tris(2,2,6,6-tetramethyl-3,5-heptanedionato) lanthanum (La(dpm)$_3$) in cyclohexane (0.005 mol/L) was added thereto, and then 5.0 ml of a solution of triphenylcarbenium tetrakis(pentafluorophenyl)borate in toluene (0.004 mol/L) was added thereto. The polymerization was performed at 20° C. for 25 minutes, and then 1.0 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

Example E-27

The interior of a 1.5 L autoclave was purged with nitrogen, and a solution of 385 ml of cyclohexane solvent and 400 ml of butadiene was placed in the autoclave. And then, 2.2 ml of a solution of triethyl aluminum (TEAL) in cyclohexane (2 mol/L) was added thereto. Subsequently, 3.2 ml of a solution of tris(2,2,6,6-tetramethyl-3,5-heptanedionato) lanthanum (La(dpm)$_3$) in cyclohexane (0.005 mol/L) was added thereto, and then 8.0 ml of a solution of triphenylcarbenium tetrakis(pentafluorophenyl)borate in toluene (0.004 mol/L) was added thereto. The polymerization was performed at 20° C. for 25 minutes, and then 1.6 ml of a solution of 4,4'-bis(diethylamino)benzophenone (EAB) as a modifying agent in toluene (1 mol/L) was added thereto, and the modification reaction was performed at the same temperature for 15 minutes. And then, 4 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

Example E-28

Modified polybutadiene was synthesized in the same way as in Example E-17, except that the catalyst was changed to tris(2,6-dimethyl-3,5-heptanedionato)lanthanum (La(dibm)$_3$). The polymerization results are shown in Table E-2.

Example E-29

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.5 ml of a solution of triphenylcarbenium tetrakis(pentafluorophenyl)borate in toluene (0.004 mol/L) was added thereto, and then 0.5 ml of a solution of tris(2,2,6,6-tetramethyl-3,5-heptanedionato)terbium (Tb(dpm)$_3$) in cyclohexane (0.01 mol/L) was added thereto. The polymerization was performed at 20° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table E-2.

Example E-30

The interior of a 1.5 L autoclave was purged with nitrogen, and a solution of 245 ml of cyclohexane solvent and 250 ml of butadiene was placed in the autoclave. And then, 1.0 ml of a solution of triethyl aluminum (TEAL) in cyclohexane (2 mol/L) was added thereto. Subsequently, 2.5 ml of a solution of triphenylcarbenium tetrakis(pentafluorophenyl)borate in toluene (0.004 mol/L) was added thereto, and then 0.5 ml of a solution of tris(2,2,6,6-tetramethyl-3,5-heptanedionato)terbium (Tb(dpm)$_3$) in cyclohexane (0.01 mol/L) was added thereto. The polymerization was performed at 20° C. for 25 minutes, and then 0.5 ml of a solution of heliotropin (HLT) as a modifying agent in toluene (1 mol/L) was added thereto, and the modification reaction was performed at the same temperature for 15 minutes. And then, 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table E-2.

TABLE E-1

| | Catalyst | Modifying agent | Degree of Modification | Yield (g/L) | Catalytic activity (g/mmol-Cat/h) | Cis (%) | Trans (%) | Vinyl (%) | Mn/$10^4$ | Mw/$10^4$ | Mw/Mn |
|---|---|---|---|---|---|---|---|---|---|---|---|
| Example E-1 | Ho(dpm)$_3$ | — | — | 43.2 | 10,363 | 96.4 | 2.5 | 1.1 | 19.1 | 62.1 | 3.25 |
| Example E-2 | Ho(dpm)$_3$ | EAB | 0.12 | 46.0 | 11,040 | 96.4 | 2.5 | 1.1 | 18.2 | 64.4 | 3.54 |
| Example E-3 | Ho(dpm)$_3$ | HLT | 0.59 | 34.7 | 8,323 | 96.4 | 2.5 | 1.1 | 16.4 | 53.7 | 3.28 |
| Example E-4 | Er(dpm)$_3$ | — | — | 48.1 | 11,530 | 96.1 | 2.5 | 1.4 | 18.4 | 65.5 | 3.57 |
| Example E-5 | Er(dpm)$_3$ | EAB | 0.11 | 51.0 | 12,235 | 95.8 | 2.7 | 1.5 | 19.3 | 69.6 | 3.62 |
| Example E-6 | Er(dpm)$_3$ | HLT | 0.69 | 33.6 | 8,069 | 96.0 | 2.6 | 1.4 | 16.2 | 54.9 | 3.39 |
| Example E-7 | Er(dpm)$_3$ | GPTMS | — | 35.1 | 8,410 | 96.1 | 2.6 | 1.3 | 15.0 | 53.3 | 3.54 |
| Example E-8 | Tm(dpm)$_3$ | — | — | 28.2 | 6,749 | 94.7 | 3.6 | 1.7 | 13.6 | 47.3 | 3.48 |
| Example E-9 | Tm(dpm)$_3$ | EAB | 0.12 | 29.6 | 7,099 | 94.7 | 3.5 | 1.7 | 13.9 | 51.2 | 3.67 |
| Example E-10 | Tm(dpm)$_3$ | HLT | 0.60 | 27.1 | 6,499 | 94.4 | 3.8 | 1.8 | 12.0 | 46.5 | 3.86 |
| Example E-11 | Tm(dpm)$_3$ | GPTMS | — | 23.6 | 5,650 | 94.3 | 3.8 | 1.9 | 12.5 | 42.9 | 3.43 |
| Production Example E-12 | Pr(dpm)$_3$ | — | — | 32.9 | 7,882 | 98.0 | 1.8 | 0.3 | 24.0 | 91.0 | 3.79 |
| Example E-13 | Pr(dpm)$_3$ | EAB | 0.64 | 36.3 | 8,717 | 98.8 | 1.0 | 0.2 | 31.0 | 120.8 | 3.90 |
| Example E-14 | Pr(dpm)$_3$ | HLT | 0.72 | 33.2 | 7,973 | 97.8 | 1.9 | 0.2 | 22.7 | 94.1 | 4.15 |
| Example E-15 | Pr(dpm)$_3$ | GPTMS | — | 44.6 | 10,690 | 98.2 | 1.5 | 0.2 | 24.0 | 104.2 | 4.33 |

TABLE E-2

| | Catalyst | Modifying agent | Degree of Modification | Yield (g/L) | Catalytic activity (g/mmol-Cat/h) | Cis (%) | Trans (%) | Vinyl (%) | Mn/$10^4$ | Mw/$10^4$ | Mw/Mn |
|---|---|---|---|---|---|---|---|---|---|---|---|
| Example E-16 | La(dpm)$_3$ | — | — | 33.7 | 8,078 | 99.1 | 0.7 | 0.2 | 27.4 | 80.1 | 2.92 |
| Example E-17 | La(dpm)$_3$ | HLT | 0.76 | 30.1 | 7,214 | 98.7 | 1.1 | 0.2 | 22.2 | 62.3 | 2.81 |
| Example E-18 | La(dpm)$_3$ | — | — | 28.2 | 6,763 | 98.9 | 0.9 | 0.2 | 17.2 | 56.1 | 3.26 |
| Example E-19 | La(dpm)$_3$ | HLT | 0.75 | 29.2 | 7,018 | 98.8 | 1.0 | 0.2 | 16.6 | 59.5 | 3.59 |
| Example E-20 | La(dpm)$_3$ | HLT | 0.87 | 16.1 | 3,854 | 99.3 | 0.5 | 0.2 | 26.3 | 68.1 | 2.59 |
| Example E-21 | La(dpm)$_3$ | HLT | 0.52 | 29.7 | 11,872 | 98.1 | 1.6 | 0.3 | 18.2 | 47.8 | 2.62 |
| Example E-22 | La(dpm)$_3$ | HLT | 0.22 | 41.8 | 10,037 | 96.1 | 3.4 | 0.5 | 18.8 | 46.2 | 2.45 |
| Example E-23 | La(dpm)$_3$ | HLT | 0.85 | 21.5 | 8,608 | 99.1 | 0.8 | 0.2 | 23.5 | 66.9 | 2.84 |
| Example E-24 | La(dpm)$_3$ | HLT | 0.49 | 30.5 | 4,578 | 98.0 | 1.8 | 0.2 | 18.0 | 52.4 | 2.90 |
| Example E-25 | La(dpm)$_3$ | HLT | 0.90 | 35.6 | 5,722 | 98.8 | 0.9 | 0.2 | 24.8 | 70.1 | 2.83 |
| Example E-26 | La(dpm)$_3$ | HLT | 1.0 | 42.0 | 5,078 | 98.5 | 1.3 | 0.2 | 27.2 | 66.4 | 2.44 |
| Example E-27 | La(dpm)$_3$ | EAB | 0.60 | 40.9 | 4,911 | 98.7 | 1.1 | 0.2 | 22.4 | 52.4 | 2.34 |
| Example E-28 | La(dibm)$_3$ | HLT | 0.64 | 26.0 | 6,240 | 98.7 | 1.0 | 0.2 | 22.0 | 54.2 | 2.47 |

TABLE E-2-continued

| | Catalyst | Modifying agent | Degree of Modification | Yield (g/L) | Catalytic activity (g/mmol-Cat/h) | Cis (%) | Trans (%) | Vinyl (%) | Mn/10$^4$ | Mw/10$^4$ | Mw/Mn |
|---|---|---|---|---|---|---|---|---|---|---|---|
| Example E-29 | Tb(dpm)$_3$ | — | — | 18.8 | 4,512 | 98.2 | 1.1 | 0.7 | 20.8 | 50.5 | 2.42 |
| Example E-30 | Tb(dpm)$_3$ | HLT | 0.73 | 21.0 | 5,045 | 98.3 | 1.0 | 0.7 | 22.5 | 59.0 | 2.62 |

Example F-1

The interior of a 1.5 L autoclave was purged with nitrogen, and a solution of 590 ml of cyclohexane solvent and 600 ml of butadiene was placed in the autoclave. And then, 2.7 ml of a solution of triethyl aluminum (TEAL) in cyclohexane (2 mol/L) was added thereto. Subsequently, 1.2 ml of a solution of tris(2,2,6,6-tetramethyl-3,5-heptanedionato) lanthanum (La(dpm)$_3$) in toluene (0.01 mol/L) was added thereto, and then 6.0 ml of a solution of trip henylcarbenium tetrakis(pentafluorophenyl)borate in toluene (0.004 mol/L) was added thereto. The polymerization was performed at 20° C. for 25 minutes, and then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table F-1.

Example F-2

The interior of a 1.5 L autoclave was purged with nitrogen, and a solution of 385 ml of cyclohexane solvent and 400 ml of butadiene was placed in the autoclave. And then, 2.15 ml of a solution of triethyl aluminum (TEAL) in cyclohexane (2 mol/L) was added thereto. Subsequently, 3.2 ml of a solution of tris(2,2,6,6-tetramethyl-3,5-heptanedionato)lanthanum (La(dpm)$_3$) in toluene (0.005 mol/L) was added thereto, and then 8.0 ml of a solution of trip henylcarbenium tetrakis(pentafluorophenyl)borate in toluene (0.004 mol/L) was added thereto. The polymerization was performed at 20° C. for 25 minutes, and then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table F-1.

Example F-3

The interior of a 1.5 L autoclave was purged with nitrogen, and a solution of 385 ml of cyclohexane solvent and 400 ml of butadiene was placed in the autoclave. And then, 2.05 ml of a solution of triethyl aluminum (TEAL) in cyclohexane (2 mol/L) was added thereto. Subsequently, 3.2 ml of a solution of tris(2,2,6,6-tetramethyl-3,5-heptanedionato)lanthanum (La(dpm)$_3$) in toluene (0.005 mol/L) was added thereto, and then 8.0 ml of a solution of trip henylcarbenium tetrakis(pentafluorophenyl)borate in toluene (0.004 mol/L) was added thereto. The polymerization was performed at 20° C. for 25 minutes, and then 1.6 ml of a solution of heliotropin (HLT) as a modifying agent in toluene (1 mol/L) was added thereto, and the modification reaction was performed at the same temperature for 15 minutes. And then, 4 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table F-1.

TABLE F-1

| | Catalyst | Modifying agent | Degree of Modification | Yield (g/L) | Catalytic activity (g/mmol-Cat/h) | Cis (%) | Trans (%) | Vinyl (%) | Mn/10$^4$ | Mw/10$^4$ | Mw/Mn |
|---|---|---|---|---|---|---|---|---|---|---|---|
| Example F-1 | La(dpm)$_3$ | — | — | 28.9 | 6,946 | 99.0 | 0.8 | 0.2 | 19.5 | 53.6 | 2.74 |
| Example F-2 | La(dpm)$_3$ | — | — | 38.3 | 4,584 | 98.6 | 1.1 | 0.2 | 21.3 | 51.0 | 2.39 |
| Example F-3 | La(dpm)$_3$ | HLT | 0.87 | 41.1 | 4,928 | 98.4 | 1.3 | 0.2 | 22.0 | 57.1 | 2.59 |

Example F-4

A compounded rubber was produced in accordance with the compounding formulation shown in Table F-2, using the polybutadiene synthesized according to Example F-1, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table F-3.

Example F-5

A compounded rubber was produced, molded and press-vulcanized, and the properties of the resulting vulcanizate were determined in the same way as in Example F-4, except that the polybutadiene synthesized according to Example F-2 was used, instead of the polybutadiene synthesized according to Example F-1. The results of the determination of various properties of the composition are shown in Table F-3.

Example F-6

A compounded rubber was produced, molded and press-vulcanized, and the properties of the resulting vulcanizate were determined in the same way as in Example F-4, except that the polybutadiene synthesized according to Example F-3 was used, instead of the polybutadiene synthesized according to Example F-1. The results of the determination of various properties of the composition are shown in Table F-3.

Comparative Example F-1

A compounded rubber was produced, molded and press-vulcanized, and the properties of the resulting vulcanizate were determined in the same way as in Example F-4, except that UBEPOL BR150L made by Ube Industries, Ltd. (conjugated diene polymer polymerized using a Co-based catalyst) was used, instead of the polybutadiene synthesized according to Example F-1. The results of the determination of various properties of the composition are shown in Table F-3.

The compounding formulations are shown in Table F-2. The numerical values in Table F-2 are expressed in terms of "parts by mass".

TABLE F-2

|  | Example F-4 | Example F-5 | Example F-6 | Comparative Example F-1 |
|---|---|---|---|---|
| Example F-1 | 30 | | | |
| Example F-2 | | 30 | | |
| Example F-3 | | | 30 | |
| BR150L | | | | 30 |
| SBR | 70 | 70 | 70 | 70 |
| silica | 65 | 65 | 65 | 65 |
| silane coupling agent | 5.2 | 5.2 | 5.2 | 5.2 |
| oil | 25 | 25 | 25 | 25 |
| zinc oxide | 3 | 3 | 3 | 3 |
| stearic acid | 1 | 1 | 1 | 1 |
| anti-oxidant | 1 | 1 | 1 | 1 |
| vulcanizing accelerator 1 | 1.7 | 1.7 | 1.7 | 1.7 |
| vulcanizing accelerator 2 | 2 | 2 | 2 | 2 |
| powdered sulfur | 1.4 | 1.4 | 1.4 | 1.4 |

The results of the evaluations of the obtained compositions are shown in Table F-3.

TABLE F-3

|  | Example F-4 | Example F-5 | Example F-6 | Comparative Example F-1 |
|---|---|---|---|---|
| Degree of Modification | 0.00 | 0.00 | 0.87 | 0.00 |
| Tensile stress (100%) | 110 | 108 | 113 | 100 |
| Lambourn abrasion (40% Slip) | 101 | 100 | 101 | 100 |
| Low heat build-up | 104 | 104 | 104 | 100 |
| Permanent set | 105 | 101 | 106 | 100 |

The numerical values in Table F-3 are expressed as an index number with respect to each item, on the condition that each value of property of Comparative Example F-1, in which UBEPOL BR150L made by Ube Industries, Ltd. (conjugated diene polymer polymerized using a Co-based catalyst) was used, is taken as the standard (100). The property is better as the numerical value is greater.

As shown in Table F-3, the compositions of Examples F-4 to F-6 which comprise the polybutadienes obtained in Examples F-1 and F-2 and the modified polybutadiene obtained in Example F-3, respectively, have better mechanical strength, low heat build-up, and permanent set than the composition of Comparative Example F-1 which comprises UBEPOL BR150L. As for the abrasion resistance, the compositions of the Examples also have equal or better characteristics.

Example G-1

The interior of a 1.5 L autoclave was purged with nitrogen, and a solution of 440 ml of cyclohexane solvent and 440 ml of butadiene was placed in the autoclave. And then, 3.5 ml of a solution of triethyl aluminum (TEAL) in cyclohexane (2 mol/L) was added thereto. Subsequently, 6.6 ml of a solution of triphenylcarbenium tetrakis(pentafluorophenyl)borate in toluene (0.004 mol/L) was added thereto, and then 0.88 ml of a solution of tris(2,6-dimethyl-3,5-heptanedionato)terbium (Tb(dibm)$_3$) in cyclohexane (0.01 mol/L) was added thereto. The polymerization was performed at 50° C. for 30 minutes, and then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table G-1.

Example G-2

The interior of a 1.5 L autoclave was purged with nitrogen, and a solution of 440 ml of cyclohexane solvent and 440 ml of butadiene was placed in the autoclave. And then, 2.6 ml of a solution of triethyl aluminum (TEAL) in cyclohexane (2 mol/L) was added thereto. Subsequently, 6.6 ml of a solution of triphenylcarbenium tetrakis(pentafluorophenyl)borate in toluene (0.004 mol/L) was added thereto, and then 0.88 ml of a solution of tris(2,6-dimethyl-3,5-heptanedionato)dysprosium (Dy(dibm)$_3$) in cyclohexane (0.01 mol/L) was added thereto. The polymerization was performed at 50° C. for 28.5 minutes, and then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table G-1.

Example G-3

The interior of a 1.5 L autoclave was purged with nitrogen, and a solution of 350 ml of cyclohexane solvent and 350 ml of butadiene was placed in the autoclave. And then, 1.4 ml of a solution of triethyl aluminum (TEAL) in cyclohexane (2 mol/L) was added thereto. Subsequently, 0.7 ml of a solution of tris(2,6-dimethyl-3,5-heptanedionato)lanthanum (La(dibm)$_3$) in cyclohexane (0.01 mol/L) was added thereto, and then 3.5 ml of a solution of triphenylcarbenium tetrakis(pentafluorophenyl)borate in toluene (0.004 mol/L) was added thereto. The polymerization was performed at 50°

C. for 27.5 minutes, and then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table G-1.

lyst) was used, instead of the polybutadiene synthesized according to Example G-1. The results of the determination of various properties of the composition are shown in Table G-3.

The compounding formulations are shown in Table G-2. The numerical values in Table G-2 are expressed in terms of "parts by mass".

TABLE G-1

| | Catalyst | Yield (g/L) | Catalytic activity (g/mmol-Cat/h) | Cis (%) | Trans (%) | Vinyl (%) | $Mn/10^4$ | $Mw/10^4$ | Mw/Mn |
|---|---|---|---|---|---|---|---|---|---|
| Example G-1 | $Tb(dibm)_3$ | 79.4 | 15,880 | 95.5 | 3.4 | 1.1 | 17.6 | 58.5 | 3.32 |
| Example G-2 | $Dy(dibm)_3$ | 39.9 | 8,400 | 96.3 | 2.7 | 1.1 | 14.7 | 42.7 | 2.90 |
| Example G-3 | $La(dibm)_3$ | 52.6 | 11,476 | 94.7 | 4.4 | 0.8 | 21.1 | 51.5 | 2.44 |

Example G-4

A compounded rubber was produced in accordance with the compounding formulation shown in Table G-2, using the polybutadiene synthesized according to Example G-1, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table G-3.

Example G-5

A compounded rubber was produced, molded and press-vulcanized, and the properties of the resulting vulcanizate were determined in the same way as in Example G-4, except that the polybutadiene synthesized according to Example G-2 was used, instead of the polybutadiene synthesized according to Example G-1. The results of the determination of various properties of the composition are shown in Table G-3.

Example G-6

A compounded rubber was produced, molded and press-vulcanized, and the properties of the resulting vulcanizate were determined in the same way as in Example G-4, except that the polybutadiene synthesized according to Example G-3 was used, instead of the polybutadiene synthesized according to Example G-1. The results of the determination of various properties of the composition are shown in Table G-3.

Comparative Example G-1

A compounded rubber was produced, molded and press-vulcanized, and the properties of the resulting vulcanizate were determined in the same way as in Example G-4, except that UBEPOL BR150L made by Ube Industries, Ltd. (conjugated diene polymer polymerized using a Co-based catalyst) was used, instead of the polybutadiene synthesized according to Example G-1. The results of the determination of various properties of the composition are shown in Table G-3.

TABLE G-2

| | Example G-4 | Example G-5 | Example G-6 | Comparative Example G-1 |
|---|---|---|---|---|
| Example G-1 | 50 | | | |
| Example G-2 | | 50 | | |
| Example G-3 | | | 50 | |
| 150L | | | | 50 |
| natural rubber | 50 | 50 | 50 | 50 |
| carbon black | 50 | 50 | 50 | 50 |
| zinc oxide | 3 | 3 | 3 | 3 |
| stearic acid | 2 | 2 | 2 | 2 |
| anti-oxidant | 2 | 2 | 2 | 2 |
| oil | 3 | 3 | 3 | 3 |
| vulcanizing accelerator | 1 | 1 | 1 | 1 |
| powdered sulfur | 1.5 | 1.5 | 1.5 | 1.5 |

The results of the evaluations of the obtained compositions are shown in Table G-3.

TABLE G-3

| | Example G-4 | Example G-5 | Example G-6 | Comparative Example G-1 |
|---|---|---|---|---|
| Tensile stress (100%) | 100 | 101 | 102 | 100 |
| Rebound resilience | 100 | 101 | 101 | 100 |
| Low-temperature storage elastic modulus E' (−30° C.) | 193 | 216 | 157 | 100 |
| tan δ (60° C.) | 104 | 108 | 102 | 100 |

The numerical values in Table G-3 are expressed as an index number with respect to each item, on the condition that each value of property of Comparative Example G-1, in which UBEPOL BR150L made by Ube Industries, Ltd. (conjugated diene polymer polymerized using a Co-based catalyst) was used, is taken as the standard (100). The property is better as the numerical value is greater.

As shown in Table G-3, the compositions of Examples G-4 to G-6 which comprise the polybutadienes obtained in Examples G-1 to G-3, respectively, have better low-temperature properties (low-temperature storage elastic modulus), and low fuel consumption (tan δ (60° C.)) than the composition of Comparative Example G-1 which comprises UBEPOL BR150L. As for the mechanical strength, and the rebound resilience, the compositions of the Examples also have equal or better characteristics.

Example H-1

The interior of a 1.5 L autoclave was purged with nitrogen, and a solution of 385 ml of cyclohexane solvent and 400 ml of butadiene was placed in the autoclave. And then, 2.15 ml of a solution of triethyl aluminum (TEAL) in cyclohexane (2 mol/L) was added thereto. Subsequently, 3.2 ml of a solution of tris(2,2,6,6-tetramethyl-3,5-heptanedionato)lanthanum (La(dpm)$_3$) in cyclohexane (0.005 mol/L) was added thereto, and then 8.0 ml of a solution of triphenylcarbenium tetrakis(pentafluorophenyl)borate in toluene (0.004 mol/L) was added thereto. The polymerization was performed at 20° C. for 25 minutes, and then 1.6 ml of a solution of 4,4'-bis(diethylamino)benzophenone (EAB) as a modifying agent in toluene (1 mol/L) was added thereto. And then, the modification reaction was performed for 10 minutes after the temperature was increased to 50° C. Then 4 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table H-1.

Example H-2

The interior of a 1.5 L autoclave was purged with nitrogen, and a solution of 385 ml of cyclohexane solvent and 400 ml of butadiene was placed in the autoclave. And then, 2.0 ml of a solution of triethyl aluminum (TEAL) in cyclohexane (2 mol/L) was added thereto. Subsequently, 3.2 ml of a solution of tris(2,2,6,6-tetramethyl-3,5-heptanedionato)lanthanum (La(dpm)$_3$) in cyclohexane (0.005 mol/L) was added thereto, and then 8.0 ml of a solution of triphenylcarbenium tetrakis(pentafluorophenyl)borate in toluene (0.004 mol/L) was added thereto. The polymerization was performed at 20° C. for 25 minutes, and then 1.6 ml of a solution of 4,4'-bis(diethylamino)benzophenone (EAB) as a modifying agent in toluene (1 mol/L) was added thereto, and the modification reaction was performed at the same temperature for 15 minutes. Then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table H-1.

Example H-3

The interior of a 1.5 L autoclave was purged with nitrogen, and a solution of 385 ml of cyclohexane solvent and 400 ml of butadiene was placed in the autoclave. And then, 2.1 ml of a solution of triethyl aluminum (TEAL) in cyclohexane (2 mol/L) was added thereto. Subsequently, 3.2 ml of a solution of tris(2,2,6,6-tetramethyl-3,5-heptanedionato)lanthanum (La(dpm)$_3$) in cyclohexane (0.005 mol/L) was added thereto, and then 8.0 ml of a solution of triphenylcarbenium tetrakis(pentafluorophenyl)borate in toluene (0.004 mol/L) was added thereto. The polymerization was performed at 20° C. for 25 minutes, and then 6 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table H-1.

Example H-4

Polybutadiene was synthesized in the same way as in Example H-3, except that the amount of the triethyl aluminum added was changed to 2.0 ml. The polymerization results are shown in Table H-1.

TABLE H-1

| | Catalyst | Modifying agent | Degree of Modification | Yield (g/L) | Catalytic activity (g/mmol-Cat/h) | Cis (%) | Trans (%) | Vinyl (%) | Mn/10$^4$ | Mw/10$^4$ | Mw/Mn |
|---|---|---|---|---|---|---|---|---|---|---|---|
| Example H-1 | La(dpm)$_3$ | EAB | 0.57 | 39.5 | 4,739 | 98.7 | 1.1 | 0.2 | 20.5 | 50.7 | 2.47 |
| Example H-2 | La(dpm)$_3$ | EAB | 0.51 | 36.8 | 4,329 | 98.7 | 1.1 | 0.2 | 20.6 | 49.5 | 2.40 |
| Example H-3 | La(dpm)$_3$ | — | — | 40.0 | 4,706 | 98.7 | 1.0 | 0.2 | 22.2 | 51.7 | 2.33 |
| Example H-4 | La(dpm)$_3$ | — | — | 39.4 | 4,635 | 98.8 | 0.9 | 0.2 | 23.5 | 55.1 | 2.34 |

Example H-5

A compounded rubber was produced in accordance with the compounding formulation shown in Table H-2, using the modified polybutadiene synthesized according to Example H-1, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table H-3.

Example H-6

A compounded rubber was produced, molded and press-vulcanized, and the properties of the resulting vulcanizate were determined in the same way as in Example H-5, except that the modified polybutadiene synthesized according to Example H-2 was used, instead of the modified polybutadiene synthesized according to Example H-1. The results of the determination of various properties of the composition are shown in Table H-3.

Example H-7

A compounded rubber was produced, molded and press-vulcanized, and the properties of the resulting vulcanizate were determined in the same way as in Example H-5, except that the polybutadiene synthesized according to Example H-3 was used, instead of the modified polybutadiene synthesized according to Example H-1. The results of the determination of various properties of the composition are shown in Table H-3.

Example H-8

A compounded rubber was produced, molded and press-vulcanized, and the properties of the resulting vulcanizate were determined in the same way as in Example H-5, except that the polybutadiene synthesized according to Example H-4 was used, instead of the modified polybutadiene synthesized according to Example H-1. The results of the determination of various properties of the composition are shown in Table H-3.

Comparative Example H-1

A compounded rubber was produced, molded and press-vulcanized, and the properties of the resulting vulcanizate were determined in the same way as in Example H-5, except that UBEPOL BR150L made by Ube Industries, Ltd. (conjugated diene polymer polymerized using a Co-based catalyst) was used, instead of the modified polybutadiene synthesized according to Example H-1. The results of the determination of various properties of the composition are shown in Table H-3.

The compounding formulations are shown in Table H-2. The numerical values in Table H-2 are expressed in terms of "parts by mass".

TABLE H-2

|  | Example H-5 | Example H-6 | Example H-7 | Example H-8 | Comparative Example H-1 |
|---|---|---|---|---|---|
| Example H-1 | 50 | | | | |
| Example H-2 | | 50 | | | |
| Example H-3 | | | 50 | | |
| Example H-4 | | | | 50 | |
| 150L | | | | | 50 |
| natural rubber | 50 | 50 | 50 | 50 | 50 |
| carbon black | 50 | 50 | 50 | 50 | 50 |
| zinc oxide | 3 | 3 | 3 | 3 | 3 |
| stearic acid | 2 | 2 | 2 | 2 | 2 |
| anti-oxidant | 2 | 2 | 2 | 2 | 2 |
| oil | 3 | 3 | 3 | 3 | 3 |
| vulcanizing accelerator | 1 | 1 | 1 | 1 | 1 |
| powdered sulfur | 1.5 | 1.5 | 1.5 | 1.5 | 1.5 |

The results of the evaluations of the obtained compositions are shown in Table H-3.

TABLE H-3

|  | Example H-5 | Example H-6 | Example H-7 | Example H-8 | Comparative Example H-1 |
|---|---|---|---|---|---|
| Modifying agent | EAB | EAB | none | none | none |
| Tensile stress (50%) | 102 | 103 | 104 | 108 | 100 |
| Elongation at break | 102 | 100 | 103 | 103 | 100 |
| Rebound resilience | 106 | 108 | 102 | 104 | 100 |
| Low heat build-up | 117 | 117 | 109 | 108 | 100 |
| Permanent set | 134 | 147 | 119 | 129 | 100 |
| tan δ (60° C.) | 114 | 117 | 105 | 111 | 100 |

The numerical values in Table H-3 are expressed as an index number with respect to each item, on the condition that each value of property of Comparative Example H-1, in which UBEPOL BR150L made by Ube Industries, Ltd. (conjugated diene polymer polymerized using a Co-based catalyst) was used, is taken as the standard (100). The property is better as the numerical value is greater.

As shown in Table H-3, the compositions of Examples H-5 to H-8 which comprise the modified polybutadienes obtained in Examples H-1 and H-2 and the polybutadienes obtained in Examples H-3 and H-4, respectively, have better mechanical strength, rebound resilience, low heat build-up, permanent set, and low fuel consumption (tan δ (60° C.)) than the composition of Comparative Example H-1 which comprises UBEPOL BR150L.

Example I-1

The interior of a 1.5 L autoclave was purged with nitrogen, and a solution of 500 ml of cyclohexane solvent and 500 ml of butadiene was placed in the autoclave. And then, 3.0 ml of a solution of triethyl aluminum (TEAL) in cyclohexane (2 mol/L) was added thereto. Subsequently, 0.8 ml of a solution of tris(2,2,6,6-tetramethyl-3,5-heptanedionato) terbium $(Tb(dpm)_3)$ in cyclohexane (0.01 mol/L) was added thereto, and then 4.0 ml of a solution of trip henylcarbenium tetrakis(pentafluorophenyl)borate in toluene (0.004 mol/L) was added thereto. The polymerization was performed at 40° C. for 20 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table I-1.

Example 1-2

The interior of a 1.5 L autoclave was purged with nitrogen, and a solution of 500 ml of cyclohexane solvent and 500 ml of butadiene was placed in the autoclave. And then, 3.4 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) terbium $(Tb(dpm)_3)$ in cyclohexane (0.01 mol/L) was added thereto, and then 2.0 ml of a solution of trip henylcarbenium tetrakis(pentafluorophenyl)borate in toluene (0.004 mol/L) was added thereto. The polymerization was performed at 50° C. for 20 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table I-1.

Example I-3

Polybutadiene was synthesized in the same way as in Example I-2, except that the amount of the solution of triethyl aluminum (TEAL) in cyclohexane (2 mol/L) added was changed to 2.8 ml. The polymerization results are shown in Table I-1.

Example I-4

The interior of a 1.5 L autoclave was purged with nitrogen, and a solution of 500 ml of cyclohexane solvent and 500 ml of butadiene was placed in the autoclave. And then, 3.0 ml of a solution of triethyl aluminum (TEAL) in cyclohexane (2 mol/L) was added thereto. Subsequently, 0.3 ml of a solution of tris(2,2,6,6-tetramethyl-3,5-heptanedionato) terbium (Tb(dpm)$_3$) in cyclohexane (0.01 mol/L) was added thereto, and then 1.5 ml of a solution of trip henylcarbenium tetrakis(pentafluorophenyl)borate in toluene (0.004 mol/L) was added thereto. The polymerization was performed at 60° C. for 25 minutes, and then 5 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table I-1.

Example I-5

A compounded rubber was produced in accordance with the compounding formulation shown in Table I-2, using the polybutadiene synthesized according to Example I-1, by performing the first compounding in which natural rubber, carbon black (ISAF), zinc oxide, stearic acid, an anti-oxidant (Antigene 6C made by Sumitomo Chemical Co., Ltd.) and an oil (naphthenic oil made by Japan Energy Corporation) were added to the polybutadiene, and the mixture was kneaded in a plastomill; and then performing the second compounding in which a vulcanizing accelerator (Nocceler NS made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table I-3.

Example I-6

A compounded rubber was produced, molded and press-vulcanized, and the properties of the resulting vulcanizate were determined in the same way as in Example I-5, except that the polybutadiene synthesized according to Example I-2 was used, instead of the polybutadiene synthesized according to Example I-1. The results of the determination of various properties of the composition are shown in Table I-3.

Example I-7

A compounded rubber was produced, molded and press-vulcanized, and the properties of the resulting vulcanizate were determined in the same way as in Example I-5, except that the polybutadiene synthesized according to Example I-3 was used, instead of the polybutadiene synthesized according to Example I-1. The results of the determination of various properties of the composition are shown in Table I-3.

Example I-8

A compounded rubber was produced, molded and press-vulcanized, and the properties of the resulting vulcanizate were determined in the same way as in Example I-5, except that the polybutadiene synthesized according to Example I-4 was used, instead of the polybutadiene synthesized according to Example I-1. The results of the determination of various properties of the composition are shown in Table I-3.

Comparative Example I-1

A compounded rubber was produced, molded and press-vulcanized, and the properties of the resulting vulcanizate were determined in the same way as in Example I-5, except that UBEPOL BR150L made by Ube Industries, Ltd. (conjugated diene polymer polymerized using a Co-based catalyst) was used, instead of the polybutadiene synthesized according to Example I-1. The results of the determination of various properties of the composition are shown in Table I-3.

The compounding formulations are shown in Table I-2. The numerical values in Table I-2 are expressed in terms of "parts by mass".

TABLE I-1

|  | Catalyst | Yield (g/L) | Catalytic activity (g/mmol-Cat/h) | Cis (%) | Trans (%) | Vinyl (%) | Mn/10$^4$ | Mw/10$^4$ | Mw/Mn |
|---|---|---|---|---|---|---|---|---|---|
| Example I-1 | Tb(dpm)$_3$ | 55.4 | 20,929 | 96.4 | 2.8 | 0.9 | 21.8 | 52.7 | 2.42 |
| Example I-2 | Tb(dpm)$_3$ | 69.2 | 52,223 | 95.3 | 3.7 | 1.0 | 18.9 | 55.2 | 2.92 |
| Example I-3 | Tb(dpm)$_3$ | 64.8 | 48,630 | 96.2 | 2.8 | 1.0 | 20.0 | 71.7 | 3.59 |
| Example I-4 | Tb(dpm)$_3$ | 79.8 | 64,160 | 95.0 | 3.8 | 1.2 | 20.3 | 71.5 | 3.52 |

TABLE I-2

|  | Example I-5 | Example I-6 | Example I-7 | Example I-8 | Comparative Example I-1 |
|---|---|---|---|---|---|
| Example I-1 | 50 |  |  |  |  |
| Example I-2 |  | 50 |  |  |  |
| Example I-3 |  |  | 50 |  |  |
| Example I-4 |  |  |  | 50 |  |
| 150L |  |  |  |  | 50 |
| natural rubber | 50 | 50 | 50 | 50 | 50 |
| carbon black | 50 | 50 | 50 | 50 | 50 |
| zinc oxide | 3 | 3 | 3 | 3 | 3 |

TABLE I-2-continued

|  | Example I-5 | Example I-6 | Example I-7 | Example I-8 | Comparative Example I-1 |
|---|---|---|---|---|---|
| stearic acid | 2 | 2 | 2 | 2 | 2 |
| anti-oxidant | 2 | 2 | 2 | 2 | 2 |
| oil | 3 | 3 | 3 | 3 | 3 |
| vulcanizing accelerator | 1 | 1 | 1 | 1 | 1 |
| powdered sulfur | 1.5 | 1.5 | 1.5 | 1.5 | 1.5 |

The results of the evaluations of the obtained compositions are shown in Table I-3.

TABLE I-3

|  | Example I-5 | Example I-6 | Example I-7 | Example I-8 | Comparative Example I-1 |
|---|---|---|---|---|---|
| Tensile stress (100%) | 110 | 109 | 108 | 109 | 100 |
| Tensile stress (300%) | 110 | 111 | 111 | 114 | 100 |
| Rebound resilience | 105 | 102 | 107 | 105 | 100 |
| Low heat build-up | 111 | 105 | 112 | 109 | 100 |
| Permanent set | 128 | 112 | 132 | 123 | 100 |
| Low-temperature storage elastic modulus E' (−30° C.) | 184 | 191 | 187 | 187 | 100 |
| tan δ (50° C.) | 106 | 103 | 107 | 105 | 100 |

The numerical values in Table I-3 are expressed as an index number with respect to each item, on the condition that each value of property of Comparative Example I-1, in which UBEPOL BR150L made by Ube Industries, Ltd. (conjugated diene polymer polymerized using a Co-based catalyst) was used, is taken as the standard (100). The property is better as the numerical value is greater.

As shown in Table I-3, the compositions of Examples I-5 to I-8 which comprise the polybutadienes obtained in Examples I-1 to I-4, respectively, have better mechanical strength, rebound resilience, low heat build-up, permanent set, low-temperature properties (low-temperature storage elastic modulus), and low fuel consumption (tan δ (50° C.)) than the composition of Comparative Example I-1 which comprises UBEPOL BR150L.

Example J-1

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) gadolinium (Gd(dpm)$_3$) in cyclohexane (0.005 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table J-1.

Example J-2

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.4 ml of a solution of tris(2,2,6,6-tetramethyl-3,5-heptanedionato) gadolinium (Gd(dpm)$_3$) in cyclohexane (0.005 mol/L) was added thereto, and then 1.0 ml of a solution of triphenylcarbenium tetrakis(pentafluorophenyl)borate in toluene (0.004 mol/L) was added thereto. The polymerization was performed at 50° C. for 25 minutes, and then 0.4 ml of a solution of 3-glycidoxypropyl trimethoxy silane (GPTMS) as a modifying agent in cyclohexane (0.005 mol/L) was added thereto, and the modification reaction was performed at the same temperature for 10 minutes. Then 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table J-1.

Example J-3

Modified polybutadiene was synthesized in the same way as in Example J-2, except that the amount of the solution of 3-glycidoxypropyl trimethoxy silane (GPTMS) in cyclohexane (0.005 mol/L) as the modifying agent added was changed to 2.0 ml. The polymerization results are shown in Table J-1.

Example J-4

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.63 ml of a solution of triphenylcarbenium tetrakis(pentafluorophenyl)borate in toluene (0.004 mol/L) was added thereto, and then 0.13 ml of a solution of tris(2,2,6,6-tetramethyl-3,5-heptanedionato)terbium (Tb(dpm)$_3$) in cyclohexane (0.01 mol/L) was added thereto. The polymerization was performed at 50° C. for 25 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table J-1.

Example J-5

The interior of a 1.5 L autoclave was purged with nitrogen, and a solution of 250 ml of cyclohexane solvent and 250 ml of butadiene was placed in the autoclave. And then, 1.5 ml of a solution of triethyl aluminum (TEAL) in cyclohexane (2 mol/L) was added thereto. Subsequently, 0.63 ml of a solution of triphenylcarbenium tetrakis(pentafluorophenyl)borate in toluene (0.004 mol/L) was added thereto, and then 0.13 ml of a solution of tris(2,2,6,6-tetramethyl-3,5-heptanedionato)terbium (Tb(dpm)$_3$) in cyclohexane (0.01 mol/L) was added thereto. The polymerization was performed at 50° C. for 25 minutes, and then 0.26 ml of a solution of 3-glycidoxypropyl trimethoxy silane (GPTMS) as a modifying agent in cyclohexane (0.005 mol/L) was added thereto, and the modification reaction was performed at the same temperature for 10 minutes. Then 3 ml of an ethanol solution containing an anti-oxidant was added thereto, and the pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table J-1.

Example J-6

Modified polybutadiene was synthesized in the same way as in Example J-5, except that the amount of the solution of 3-glycidoxypropyl trimethoxy silane (GPTMS) in cyclohexane (0.005 mol/L) as the modifying agent added was changed to 1.3 ml. The polymerization results are shown in Table J-1.

Example J-7

The interior of a 1.5 L autoclave was purged with nitrogen, and a solution of 300 ml of cyclohexane solvent and 300 ml of butadiene was placed in the autoclave. And then, 1.8 ml of a solution of triethyl aluminum (TEAL) in cyclohexane (2 mol/L) was added thereto. Subsequently, 1.1 ml of a solution of triphenylcarbenium tetrakis(pentafluorophenyl)borate in toluene (0.004 mol/L) was added thereto, and then 0.42 ml of a solution of tris(2,2,6,6-tetramethyl-3,5-heptanedionato)dysprosium (Dy(dpm)$_3$) in cyclohexane (0.005 mol/L) was added thereto. The polymerization was performed at 50° C. for 20 minutes, and then 3 ml of an ethanol solution containing an anti-oxidant was added thereto, to terminate the polymerization. The pressure inside the autoclave was released, and then ethanol was poured into the polymerization solution and the polybutadiene was collected. And then, the collected polybutadiene was dried under vacuum at 80° C. for 3 hours. The polymerization results are shown in Table J-1.

Example J-8

The interior of a 1.5 L autoclave was purged with nitrogen, and a solution of 300 ml of cyclohexane solvent and 300 ml of butadiene was placed in the autoclave. And then, 1.8 ml of a solution of triethyl aluminum (TEAL) in cyclohexane (2 mol/L) was added thereto. Subsequently, 1.1 ml of a solution of triphenylcarbenium tetrakis(pentafluorophenyl)borate in toluene (0.004 mol/L) was added thereto, and then 0.42 ml of a solution of tris(2,2,6,6-tetramethyl-3,5-heptanedionato)dysprosium (Dy(dpm)$_3$) in cyclohexane (0.005 mol/L) was added thereto. The polymerization was performed at 50° C. for 20 minutes, and then 0.42 ml of a solution of 3-glycidoxypropyl trimethoxy silane (GPTMS) as a modifying agent in cyclohexane (0.005 mol/L) was added thereto, and the modification reaction was performed at the same temperature for 10 minutes. Then 3 ml of an ethanol solution containing an anti-oxidant was added thereto, to terminate the polymerization. The pressure inside the autoclave was released, and then ethanol was poured into the polymerization solution and the modified polybutadiene was collected. And then, the collected modified polybutadiene was dried under vacuum at 80° C. for 3 hours. The polymerization results are shown in Table J-1.

TABLE J-1

| | Catalyst | Catalyst concentration (µM) | GPTMS (µM) | Yield (g/L) | Catalytic activity (g/mmol-Cat/h) | Cis (%) | Trans (%) | Vinyl (%) | Mn/10$^4$ | Mw/10$^4$ | Mw/Mn | GPC-RI area ratio |
|---|---|---|---|---|---|---|---|---|---|---|---|---|
| Example J-1 | Gd(dpm)$_3$ | 4.0 | 0 | 68.4 | 41,256 | 94.8 | 4.3 | 0.9 | 18.0 | 54.4 | 3.02 | 1.00 |
| Example J-2 | Gd(dpm)$_3$ | 4.0 | 4 | 67.4 | 40,656 | 94.7 | 4.4 | 0.9 | 17.7 | 53.5 | 3.02 | 0.99 |
| Example J-3 | Gd(dpm)$_3$ | 4.0 | 20 | 66.8 | 40,296 | 94.9 | 4.2 | 0.9 | 16.5 | 50.6 | 3.07 | 0.94 |
| Example J-4 | Tb(dpm)$_3$ | 2.5 | 0 | 61.0 | 58,867 | 95.4 | 3.6 | 1.0 | 16.0 | 47.6 | 2.99 | 1.00 |
| Example J-5 | Tb(dpm)$_3$ | 2.5 | 2.5 | 69.0 | 66,566 | 95.2 | 3.8 | 1.0 | 17.3 | 55.4 | 3.19 | 0.96 |
| Example J-6 | Tb(dpm)$_3$ | 2.5 | 12.5 | 61.0 | 58,867 | 95.5 | 3.5 | 1.0 | 16.2 | 48.9 | 3.01 | 0.93 |
| Example J-7 | Dy(dpm)$_3$ | 3.5 | 0 | 60.1 | 51,800 | 95.4 | 3.7 | 1.0 | 15.5 | 48.4 | 3.12 | 1.00 |
| Example J-8 | Dy(dpm)$_3$ | 3.5 | 3.5 | 61.4 | 52,929 | 95.2 | 3.8 | 1.0 | 14.5 | 47.4 | 3.26 | 0.99 |

Example J-9

A compounded rubber was produced in accordance with the compounding formulation shown in Table J-2, using the polybutadiene synthesized according to Example J-1, by performing the first compounding in which SBR, silica (Nipsil AQ made by Tosoh Silica Corporation), a silane coupling agent (Si69 made by Evonik-Degussa), zinc oxide, stearic acid, an anti-oxidant (Antigene 6C made by Sumitomo Chemical Co., Ltd.) and an oil were added to the polybutadiene, and the mixture was kneaded in a plastomill; and then performing the second compounding in which a vulcanizing accelerator 1 (Nocceler CZ made by Ouchi Shinko Chemical Industrial Co., Ltd.), a vulcanizing accelerator 2 (Nocceler D made by Ouchi Shinko Chemical Industrial Co., Ltd.) and sulfur were added thereto in a roll. Furthermore, the compounded rubber was molded and press-vulcanized at 150° C. according to the desired properties, and the properties of the resulting vulcanizate were determined. The results of the determination of various properties of the composition are shown in Table J-3.

Example J-10

A compounded rubber was produced, molded and press-vulcanized, and the properties of the resulting vulcanizate were determined in the same way as in Example J-9, except that the modified polybutadiene synthesized according to Example J-2 was used, instead of the polybutadiene synthesized according to Example J-1. The results of the determination of various properties of the composition are shown in Table J-3.

Example J-11

A compounded rubber was produced, molded and press-vulcanized, and the properties of the resulting vulcanizate were determined in the same way as in Example J-9, except that the modified polybutadiene synthesized according to Example J-3 was used, instead of the polybutadiene synthesized according to Example J-1. The results of the determination of various properties of the composition are shown in Table J-3.

Example J-12

A compounded rubber was produced, molded and press-vulcanized, and the properties of the resulting vulcanizate were determined in the same way as in Example J-9, except that the polybutadiene synthesized according to Example J-4 was used, instead of the polybutadiene synthesized according to Example J-1. The results of the determination of various properties of the composition are shown in Table J-3.

Example J-13

A compounded rubber was produced, molded and press-vulcanized, and the properties of the resulting vulcanizate were determined in the same way as in Example J-9, except that the modified polybutadiene synthesized according to Example J-5 was used, instead of the polybutadiene synthesized according to Example J-1. The results of the determination of various properties of the composition are shown in Table J-3.

Example J-14

A compounded rubber was produced, molded and press-vulcanized, and the properties of the resulting vulcanizate were determined in the same way as in Example J-9, except that the modified polybutadiene synthesized according to Example J-6 was used, instead of the polybutadiene synthesized according to Example J-1. The results of the determination of various properties of the composition are shown in Table J-3.

Example J-15

A compounded rubber was produced, molded and press-vulcanized, and the properties of the resulting vulcanizate were determined in the same way as in Example J-9, except that the polybutadiene synthesized according to Example J-7 was used, instead of the polybutadiene synthesized according to Example J-1. The results of the determination of various properties of the composition are shown in Table J-3.

Example J-16

A compounded rubber was produced, molded and press-vulcanized, and the properties of the resulting vulcanizate were determined in the same way as in Example J-9, except that the modified polybutadiene synthesized according to Example J-8 was used, instead of the polybutadiene synthesized according to Example J-1. The results of the determination of various properties of the composition are shown in Table J-3.

Comparative Example J-1

A compounded rubber was produced, molded and press-vulcanized, and the properties of the resulting vulcanizate were determined in the same way as in Example J-9, except that UBEPOL BR150L made by Ube Industries, Ltd. (conjugated diene polymer polymerized using a Co-based catalyst) was used, instead of the polybutadiene synthesized according to Example J-1. The results of the determination of various properties of the composition are shown in Table J-3.

The compounding formulations are shown in Table J-2. The numerical values in Table J-2 are expressed in terms of "parts by mass".

TABLE J-2

| | Example J-9 | Example J-10 | Example J-11 | Example J-12 | Example J-13 | Example J-14 | Example J-15 | Example J-16 | Comparative Example J-1 |
|---|---|---|---|---|---|---|---|---|---|
| Example J-1 | 30 | | | | | | | | |
| Example J-2 | | 30 | | | | | | | |
| Example J-3 | | | 30 | | | | | | |
| Example J-4 | | | | 30 | | | | | |
| Example J-5 | | | | | 30 | | | | |
| Example J-6 | | | | | | 30 | | | |
| Example J-7 | | | | | | | 30 | | |
| Example J-8 | | | | | | | | 30 | |
| BR150L | | | | | | | | | 30 |
| SBR | 70 | 70 | 70 | 70 | 70 | 70 | 70 | 70 | 70 |
| silica | 65 | 65 | 65 | 65 | 65 | 65 | 65 | 65 | 65 |
| silane coupling agent | 5.2 | 5.2 | 5.2 | 5.2 | 5.2 | 5.2 | 5.2 | 5.2 | 5.2 |
| oil | 25 | 25 | 25 | 25 | 25 | 25 | 25 | 25 | 25 |
| zinc oxide | 3 | 3 | 3 | 3 | 3 | 3 | 3 | 3 | 3 |
| stearic acid | 1 | 1 | 1 | 1 | 1 | 1 | 1 | 1 | 1 |
| anti-oxidant | 1 | 1 | 1 | 1 | 1 | 1 | 1 | 1 | 1 |
| vulcanizing accelerator 1 | 1.7 | 1.7 | 1.7 | 1.7 | 1.7 | 1.7 | 1.7 | 1.7 | 1.7 |
| vulcanizing accelerator 2 | 2 | 2 | 2 | 2 | 2 | 2 | 2 | 2 | 2 |
| powdered sulfur | 1.4 | 1.4 | 1.4 | 1.4 | 1.4 | 1.4 | 1.4 | 1.4 | 1.4 |

The results of the evaluations of the obtained compositions are shown in Table J-3.

TABLE J-3

| | Example J-9 | Example J-10 | Example J-11 | Example J-12 | Example J-13 | Example J-14 | Example J-15 | Example J-16 | Comparative Example J-1 |
|---|---|---|---|---|---|---|---|---|---|
| Catalyst metal | | Gd | | | Tb | | Dy | | Co |
| Modifying agent concentration (μM) | 0 | 4 | 20 | 0 | 2.5 | 12.5 | 0 | 3.5 | 0 |
| Tensile stress (100%) | 104 | 113 | 102 | 108 | 106 | 109 | 107 | 110 | 100 |
| Tensile stress (300%) | 106 | 117 | 109 | 115 | 115 | 119 | 115 | 120 | 100 |
| Tensile strength at break | 105 | 100 | 105 | 106 | 104 | 102 | 104 | 103 | 100 |
| Rebound resilience | 103 | 102 | 102 | 102 | 102 | 103 | 103 | 103 | 100 |
| Lambourn abrasion (20% Slip) | 107 | 100 | 106 | 102 | 106 | 104 | 106 | 109 | 100 |
| Filler dispersibility | 115 | 111 | 108 | 116 | 119 | 123 | 124 | 125 | 100 |
| Low-temperature storage elastic modulus E' (−30° C.) | 133 | 125 | 134 | 125 | 128 | 129 | 135 | 138 | 100 |
| tan δ (30° C.) | 105 | 105 | 105 | 103 | 104 | 104 | 104 | 105 | 100 |
| tan δ (50° C.) | 100 | 100 | 101 | 100 | 101 | 101 | 100 | 100 | 100 |

The numerical values in Table J-3 are expressed as an index number with respect to each item, on the condition that each value of property of Comparative Example J-1, in which UBEPOL BR150L made by Ube Industries, Ltd. (conjugated diene polymer polymerized using a Co-based catalyst) was used, is taken as the standard (100). The property is better as the numerical value is greater.

As shown in Table J-3, the compositions of Examples J-9 to J-16 which comprise the polybutadienes obtained in Examples J-1, J-4 and J-7 and the modified polybutadienes obtained in Examples J-2, J-3, J-5, J-6 and J-8, respectively, have better tensile strength, rebound resilience, filler dispersibility, low-temperature properties (low-temperature storage elastic modulus), and low fuel consumption (tan δ (30° C.)) than the composition of Comparative Example J-1 which comprises UBEPOL BR150L. As for the tensile strength at break, the abrasion resistance, and the low fuel consumption (tan δ (50° C.)), the compositions of the Examples also have equal or better characteristics.

The invention claimed is:
1. A catalyst for a conjugated diene polymerization, comprising
a metal compound (A1) containing terbium, lanthanum, dysprosium, holmium, erbium, or thulium;
an ionic compound (B) consisting of a non-coordinating anion and a cation; and
an organic metal aluminum compound (C),
wherein the metal compound (A1) is a non-metallocene metal compound represented by the following general formula (1-1):

(1-1)

wherein $R^1$, $R^2$, and $R^3$ each represent a hydrogen atom, or a substituent containing 1 to 12 carbon atoms;
O represents an oxygen atom; and
$M^1$ represents a terbium atom (Tb), a lanthanum atom (La), a dysprosium atom (Dy), a holmium atom (Ho), an erbium atom (Er), or a thulium atom (Tm).

2. The catalyst for a conjugated diene polymerization according to claim 1, wherein the organic aluminum compound (C) is an trialkyl aluminum compound or an organic aluminum hydride compound.

3. The catalyst for a conjugated diene polymerization according to claim 1, wherein the ionic compound (B) is a boron-containing compound.

4. A process for producing a conjugated diene polymer, comprising polymerizing a conjugated diene compound in the presence of the catalyst for a conjugated diene polymerization according to claim 1.

5. The process for producing a conjugated diene polymer according to claim 4, wherein the conjugated diene compound is polymerized in the presence of a compound selected from the group consisting of (1) hydrogen, (2) a metal hydride compound, and (3) an organic metal hydride compound as a molecular weight regulator.

6. The process for producing a conjugated diene polymer according to claim 4, wherein the conjugated diene compound is 1,3-butadiene.

7. A process for producing a modified conjugated diene polymer, comprising
    polymerizing a conjugated diene compound in the presence of a catalyst which comprises:
        a metal compound (A2) containing terbium, lanthanum, dysprosium, praseodymium, holmium, erbium, or thulium,
        an ionic compound (B) consisting of a non-coordinating anion and a cation, and
        an organic aluminum compound (C), and then
    modifying an obtained conjugated diene polymer with a modifying agent,
    wherein the metal compound (A2) is a non-metallocene metal compound represented by the following general formula (1-2):

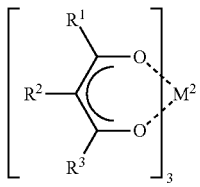

(1-2)

wherein $R^1$, $R^2$, and $R^3$ each represent a hydrogen atom, or a substituent containing 1 to 12 carbon atoms;
    O represents an oxygen atom; and
    $M^2$ represents a terbium atom (Tb), a lanthanum atom (La), a dysprosium atom (Dy), a praseodymium atom (Pr), a holmium atom (Ho), an erbium atom (Er), or a thulium atom (Tm).

8. The process for producing a modified conjugated diene polymer according to claim 7, wherein the modifying agent is an aromatic compound having a polar functional group or an organosilicon compound having an alkoxy group.

9. The process for producing a modified conjugated diene polymer according to claim 8, wherein the aromatic compound having a polar functional group is at least one selected from the group consisting of a halogenated benzyl compound, an aromatic aldehyde compound, and an aromatic carbonyl compound.

10. The process for producing a modified conjugated diene polymer according to claim 7, wherein the conjugated diene polymer is a polybutadiene having cis-1,4-structure in an amount of 90% or more.

11. The process for producing a modified conjugated diene polymer according to claim 8, wherein the organosilicon compound having an alkoxy group is an alkoxysilane compound containing a cyclic ether.

12. A process for producing a polybutadiene, comprising
    performing cis-1,4-polymerization of 1,3-butadiene in the presence of a catalyst; and then
    performing syndiotactic-1,2-polymerization in a polymerization system, wherein the catalyst comprises
        a metal compound (A2) containing terbium, lanthanum, dysprosium, praseodymium, holmium, erbium, or thulium;
        an ionic compound (B) consisting of a non-coordinating anion and a cation; and
        an aluminum compound (C),
    wherein the metal compound (A2) is a non-metallocene metal compound represented by the following general formula (1-2):

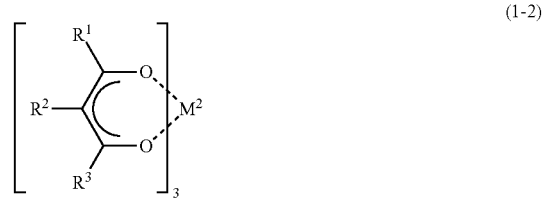

(1-2)

wherein $R^1$, $R^2$, and $R^3$ each represent a hydrogen atom, or a substituent containing 1 to 12 carbon atoms;
    O represents an oxygen atom; and
    $M^2$ represents a terbium atom (Tb), a lanthanum atom (La), a dysprosium atom (Dy), a praseodymium atom (Pr), a holmium atom (Ho), an erbium atom (Er), or a thulium atom (Tm).

13. The process for producing a polybutadiene according to claim 12, wherein the catalyst for the syndiotactic-1,2-polymerization is a catalyst system comprising a sulfur compound.

* * * * *